United States Patent [19]
Andrews et al.

[11] Patent Number: 6,036,827
[45] Date of Patent: Mar. 14, 2000

[54] ELECTROLYZER

[75] Inventors: Craig C. Andrews, College Station; Oliver J. Murphy, Bryan, both of Tex.

[73] Assignee: Lynntech, Inc., College Station, Tex.

[21] Appl. No.: 08/884,112

[22] Filed: Jun. 27, 1997

[51] Int. Cl.[7] .................................................. C25B 9/00
[52] U.S. Cl. ...................... 204/252; 204/253; 204/257; 204/258; 204/266
[58] Field of Search ........................... 204/252, 263–266, 204/283, 282, 253, 257, 237

[56] References Cited

U.S. PATENT DOCUMENTS

| | | |
|---|---|---|
| 3,311,097 | 3/1967 | Mittelstaedt . |
| 3,420,052 | 1/1969 | Miller . |
| 3,719,457 | 3/1973 | Nagamatsu . |
| 3,729,936 | 5/1973 | De Palma et al. . |
| 3,761,229 | 9/1973 | Schwartz . |
| 3,779,014 | 12/1973 | Nohira et al. . |
| 3,782,115 | 1/1974 | Johnson . |
| 4,332,219 | 6/1982 | Gonzalez . |
| 4,368,696 | 1/1983 | Reinhardt . |
| 4,499,864 | 2/1985 | Lovercheck et al. . |
| 4,615,775 | 10/1986 | de Nora et al. ............ 204/252 X |
| 4,685,430 | 8/1987 | Ap . |
| 4,763,610 | 8/1988 | Thomas . |
| 4,865,818 | 9/1989 | Merry et al. . |
| 4,939,902 | 7/1990 | Retallick . |
| 4,985,210 | 1/1991 | Minami . |
| 5,130,109 | 7/1992 | Wan . |
| 5,155,995 | 10/1992 | Kinnear et al. . |
| 5,163,290 | 11/1992 | Kinnear . |
| 5,184,462 | 2/1993 | Schatz . |
| 5,207,734 | 5/1993 | Day et al. . |
| 5,259,190 | 11/1993 | Bagley et al. . |
| 5,263,318 | 11/1993 | Oota et al. . |
| 5,272,871 | 12/1993 | Oshima . |
| 5,419,121 | 5/1995 | Sung et al. . |
| 5,813,222 | 9/1998 | Appleby . |

FOREIGN PATENT DOCUMENTS

| | | |
|---|---|---|
| 73 14944 | 12/1974 | France . |
| 2246218 | 3/1974 | Germany . |
| 2 387 357 | 11/1978 | Germany . |
| 4208609 A1 | 3/1992 | Germany . |
| 4208609A1 | 3/1992 | Germany . |
| 41 03 668 A1 | 8/1992 | Germany . |
| 4103668A1 | 8/1992 | Germany . |
| 44 20 715 A1 | 1/1995 | Germany . |
| 62-045922 | 2/1987 | Japan . |
| 2-086915 | 3/1990 | Japan . |
| 4214183A1 | 4/1992 | Japan . |
| 4-318214 | 11/1992 | Japan . |
| 4318214 | 11/1992 | Japan . |
| 6-033748 | 2/1994 | Japan . |
| 6033748 | 2/1994 | Japan . |
| 93/06850 | 7/1993 | WIPO . |
| WO96/11330 | 4/1996 | WIPO . |

OTHER PUBLICATIONS

Youji Kanada, Masaharu Hayasi, Motonobu Akaki, and Shunzou Tsuchikawa, "Hydrogen Added After–Burner System," 1996, Society of Automotive Engineers, Inc., pp. 89–94 (No Date).

*Primary Examiner*—Donald R. Valentine
*Attorney, Agent, or Firm*—Streets & Associates; Jeffrey L. Streets

[57] ABSTRACT

The present invention provides a method and apparatus for chemically heating a catalyst bed by feeding hydrogen to the catalyst. The invention also provides a method and apparatus for thermally conditioning a catalyst in order to enhance the conversion of unacceptable emissions (emanating from an internal combustion engine) into water and other acceptable emissions. In one aspect of the invention, hydrogen is supplied from an electrolyzer or other hydrogen source and injected into the monolith of a catalytic converter to more rapidly bring the catalyst to a light-off temperature.

16 Claims, 28 Drawing Sheets

Modes of Operation for an Ideal CHC System

FIG. 15

PRE-START
- Safety monitoring
- System status
- Sleep

START
- System status
- Converter temperature

PRE-HEAT
- Start air pump
- Release $H_2$ until:
  - time
  - temperature
  - volume (pressure)
- Safety monitoring
- System status REST
- Safety monitoring
- System status RESTORE $H_2$ SUPPLY
- Electrolyze
- Control current draw
- Safety monitoring
- System status
- Monitor:
  - Pressure
  - Temperature SYSTEM MAINTENANCE
- Recover cathode water
- System status
- Safety monitoring

RETURN TO PRE-START

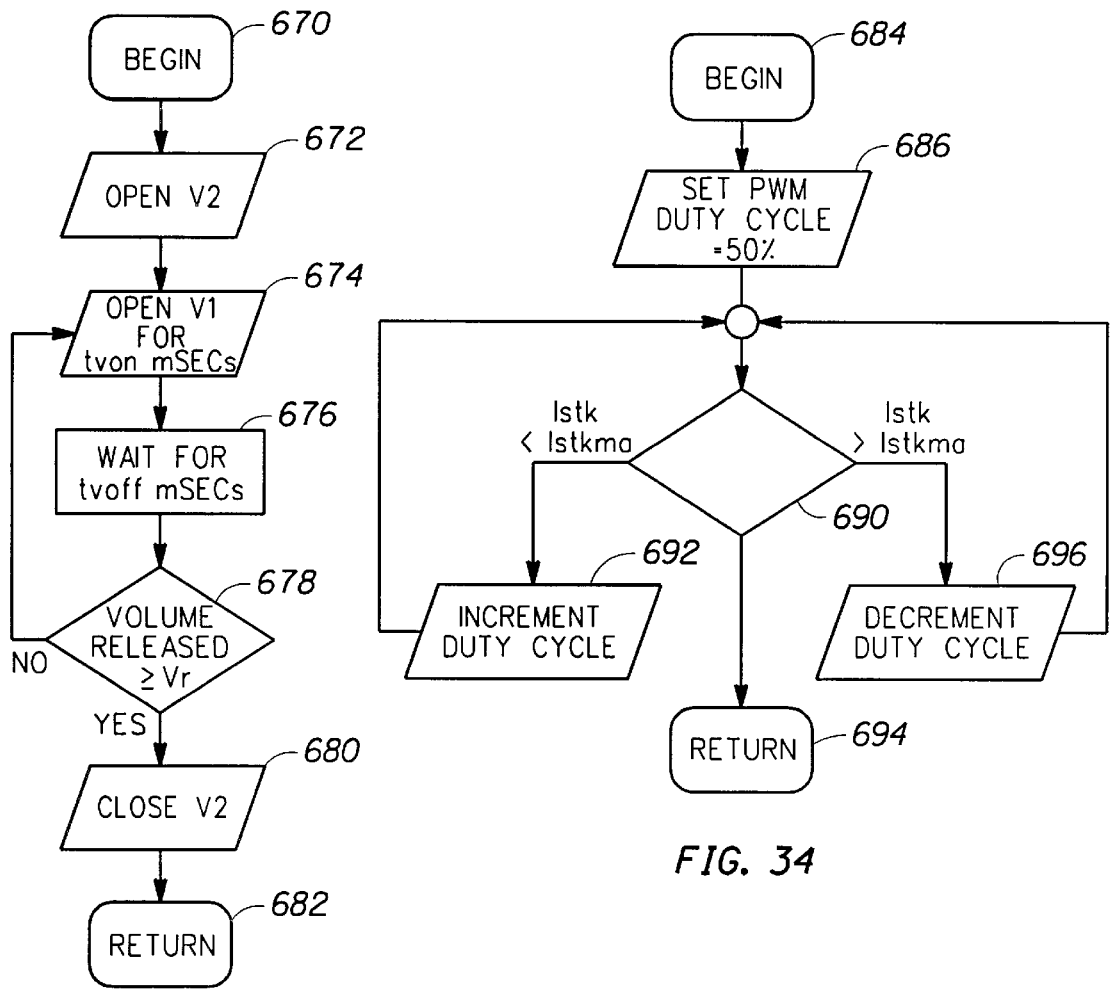
FIG. 33
FIG. 34
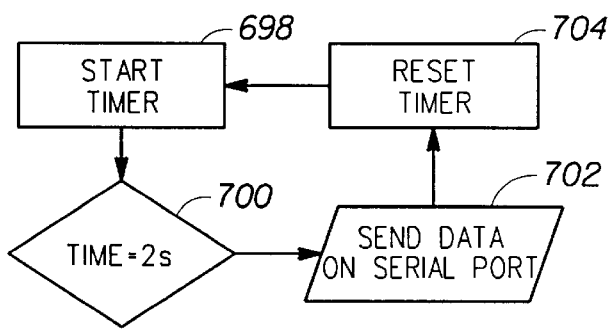
FIG. 35

ELECTROLYZER

BACKGROUND OF THE INVENTION

1. Field of the Invention

The present invention relates generally to the field of catalysis for the reduction of emissions from internal combustion engines. More particularly, the present invention relates to a method and apparatus for producing hydrogen and oxygen, storing hydrogen and delivering hydrogen into a catalytic converter on a vehicle in order to heat the catalyst through catalytic combination of the hydrogen with oxygen provided or from the air or stored oxygen. This spontaneous catalytic combination releases sufficient heat to rapidly bring the catalytic converter to operating temperatures.

2. Background of the Related Art

The control and suppression of unwanted emissions created by the operation of an internal combustion engine is a primary consideration for engine designers and vehicle manufacturers because of nearly world-wide governmental requirements regarding acceptable emission levels. Over eighty percent (80%) of the unacceptable emissions or pollutants created by internal combustion engines equipped with catalytic converters occur during cold start operations. These pollutants are emitted for a period of one to three minutes after cold engine starting, in large part because that is the time period required for the catalyst to reach an efficient operating temperature. Therefore, even though the engine exhaust is flowing through the catalytic converter, until the exhaust heats the catalytic converter to its operating range from engine start up, the engine emissions are only slightly catalyzed during that time period.

In order to meet governmental emission standards for internal combustion engine exhaust a catalytic converter is located in the exhaust stream of the engine. The converter typically includes a canister holding a suitable catalyst, such as a three-way catalytic converter (TWC) catalyst monolith, that will oxygenate unburned, unacceptable components in the exhaust stream including hydrocarbons (HC), their partially oxidized derivatives such as aldehydes and carbon monoxide (CO), and at the same time reducing nitrogen oxides ($NO_x$), after almost stoichiometric fuel burn with oxygen in the cylinders of the engine. The exhaust gas is passed through the catalyst monolith, thereby completing the oxygenation of unburned HC and CO, and the reduction of $NO_x$ in the exhaust to convert these unacceptable emissions into acceptable emissions. Certain unacceptable emissions in the exhaust stream, including unburned hydrocarbons and carbon monoxide, require an oxidation reaction to destroy them so that they end up as the corresponding oxides, e.g., water and carbon dioxide. On the other hand, $NO_x$ requires a reduction reaction to develop $N_2$ and $O_2$. In fact, the $O_2$ product of this reduction contributes to the oxidation of the HC and CO in the exhaust.

TWC catalysts are currently formulated and designed to be effective over a specific operating range of both lean and rich fuel/air conditions and a specific operating temperature range. These particular catalyst compositions enable optimization of the conversion of HC, CO, and $NO_x$. This purification of the exhaust stream by the catalytic converter is dependent on the temperature of the exhaust gas and the catalytic converter works optimally at an elevated temperature, generally at or above about 300° C. Light-off temperature is generally defined as the temperature at which fifty percent (50%) of the emissions from the engine are being converted as they pass through the catalyst. The time period between "cold start" and reaching the light off temperature is generally referred to as the light-off time.

The conventional method of heating the catalytic converter is to heat the catalyst by contact with high temperature exhaust gases from the engine. This heating, in conjunction with the exothermic nature of the oxidation reaction occurring at the catalyst, will bring the catalyst to light-off temperature. However, until the light-off temperature is reached, the exhaust gas passes through the catalyst relatively unchanged. In addition, the composition of the engine exhaust changes as the engine heats from the cold start temperature, and the catalyst monolith is typically designed to work best with the composition of the exhaust stream produced at the normal elevated engine operating temperature.

There have been several attempts to shorten or avoid the light-off time of the catalytic converter. Current techniques employ one or more of the following methods: electrical heating of the exhaust gases and/or of the catalytic converter itself; thermal insulation; multi-chambered configurations of the catalytic converter; and/or placing the catalytic converter adjacent to the engine for heating. All of these methods have drawbacks and limitations.

Placing the catalytic converter almost immediately adjacent to the engine is not desirable because of the tendency to overheat the catalyst with resulting accelerated degradation of the catalyst. Thermal insulation is also not a desirable option because of the same problems, especially during operation under maximum operating temperature ranges.

Electrical heating of catalytic converters ("EHC") has been a popular proposed method of attempting to preheat the catalyst monoliths. Limitations on the equipment and process, however, affect the utility of this method. The primary limitation on electrical preheating is the electrical energy required by the heater. The typical car battery is not a practical power source to supply the electrical power because the electrical load on the vehicle battery during the period required may exceed the rated battery output. In any event, the load placed on a typical 12 volt vehicle battery will shorten the lifetime of the battery. Also, there is a measurable delay between the time the operator of the vehicle places the ignition switch in the "on" position and the time the heater brings the catalyst to light-off temperature.

Typically, in the interval between start up and light-off, the exhaust stream is oxygen deficient. Because the catalyst requires oxygen to complete the catalytic reaction, supplemental air must be blown over the catalyst. Even when using a secondary air flow to overcome oxygen deficiency, the secondary air flow must be closely controlled to avoid an excess of oxygen, in which case the catalytic converter is less effective in reducing $NO_x$. However, it should be noted that $NO_x$ contributes a very small portion of unacceptable emissions when an engine is cold; most of the cold start emissions that must be dealt with comprise HC, CO and the like.

An alternative to battery powered electrical heating has been to decrease the strain on the power supply by supplying the power directly from an alternator rather than directly from the vehicle battery. An alternator powered, electrically heated catalyst ("APEHC") still requires a 5 to 10% increase in battery capacity to cope with the EHC start-up scenario. Even with the APEHC system, there is still a concern with respect to battery capacity because electric heating is needed for an extended period of time, i.e., more than 25–30 seconds. In addition, the maximum alternator power output required in the APEHC system requires a complicated switching mechanism and an altered alternator speed between 2,000 and 4,500 rpm during the heating up time period, and the alternator must be oversized.

The multi-chamber configurations of catalytic converters generally conform to one or two theories. In one multi-chamber configuration, a small portion of catalyst known as a "starter catalyst" is positioned upstream from the primary catalyst. This "starter catalyst" is generally closer to the exhaust manifold. This location, in conjunction with a smaller thermal mass associated with its smaller size and materials of construction, causes the catalyst to heat much more quickly than a single catalyst. This configuration, however, is generally unacceptable because the starter catalyst in the exhaust stream creates a higher back pressure which reduces the overall engine efficiency and robs the engine of power output.

Another method of providing multiple chambers in the exhaust flow includes a first catalyst having low temperature characteristics used only during cold start conditions, and, after the catalyst temperature rises to a certain elevated level, the exhaust gas flow is switched to pass through the conventional catalytic converter configuration. A variation of this approach is to run all cold start emissions through a separate absorber (such as a zeolite or a metal sieve-type substance) where unacceptable emissions are captured and later released back into the exhaust stream. This method, however, is impractical because of the complicated switching mechanism used to divert flow to the absorber, the size and space requirements of the absorber, and the impracticality of releasing the unacceptable emissions from the absorber back into the exhaust stream.

Finally, one additional method for reducing cold start emissions runs the engine excessively rich in the cold start condition and ignite the resulting super-rich mixture to directly heat the catalyst. This approach has proved wholly unreliable and has other serious drawbacks, including reduced engine and catalyst life.

To date, there has not been a catalytic converter heating system which gives almost instantaneous heating of the catalytic converter without the inherent drawbacks stated above. Thus, there remains a need for an improved catalytic converter system that reduces ineffective catalytic action immediately after cold start-up of an engine. Such a system must be simple and must not reduce the rated lifetime of the engine, the catalytic converter, or the battery components of the vehicle.

SUMMARY OF THE INVENTION

The present invention provides an on-board system for the generation of hydrogen, comprising an electrolyzer having an anode in communication with a water reservoir, a cathode, and a proton exchange membrane disposed between the anode and the cathode; a source of electrical current having a positive terminal coupled to the anode and a negative terminal coupled to the cathode; and a controller in electronic communication with the source of electrical current. The system may also comprise a hydrogen storage vessel having an inlet in communication with the cathode and an outlet in communication with a catalytic converter. Preferably, the cathode comprises a cathode flowfield and cathode product outlet communicating with an upper portion of the cathode flowfield. In one embodiment, an upwardly sloping passage may be incorporated to provide communication between the cathode product outlet and the hydrogen storage vessel and a bubble detector disposed adjacent the upwardly sloping passage to detect the production of gases by the electrolyzer. It is also preferred that the system include a check valve disposed in fluid communication between the cathode and the hydrogen storage vessel to prevent backflow from the hydrogen storage vessel to the cathode.

The water reservoir, such as a dedicated reservoir, a windshield wiper fluid reservoir or a hydrogen storage vessel, may communicate with the anode through an anode flowfield and/or through the proton exchange membrane. The source of electrical current may comprise a battery or an alternator. The hydrogen storage vessel preferably includes a pressure and a water recycle line communicating water from the hydrogen storage vessel to the water reservoir.

The invention also provides an automobile, comprising an internal combustion engine having an exhaust system; a catalytic converter disposed within the exhaust system; an electrolyzer having an anode in fluid communication with a water reservoir, a cathode, and a proton exchange membrane disposed between the anode and the cathode; a source of electrical current having a positive terminal coupled to the anode and a negative terminal coupled to the cathode; and a pressure vessel in communication with the cathode. The automobile will preferably further comprise a controller in electronic communication with the source of electrical current, a source of oxygen gas in communication with the catalytic converter and a flow control member disposed between the pressure vessel and the catalytic converter for delivering a cathode product to the catalytic converter. wherein the flow control member provides pulsed flow of the cathode product. In one embodiment, the automobile will include an ignition system in electronic communication with the internal combustion engine and the flow control member.

The invention further provides a method of monitoring the performance of an electrolyzer, comprising the step of detecting gas bubbles passing through an electrolyzer outlet passage or channel.

The invention also provides an apparatus for pulsed delivery of hydrogen from a pressurized hydrogen source to a vehicle exhaust system, comprising a gas passageway communicating between the hydrogen source and the exhaust system; first and second isolation valves disposed in the gas passageway, the second valve being downstream from the first valve; and a region between the first and second isolation valves having a defined volume. Alternatively, the invention provides an apparatus for pulsed delivery of hydrogen from a pressurized hydrogen source to a vehicle exhaust system, comprising a turnstile valve disposed in a conduit between the hydrogen source and the exhaust An electrolyzer is also provided, the electrolyzer comprising a first electrode compartment comprising substantially incompressible components; a second electrode compartment comprising a compressible member; and a flexible membrane disposed between the first and second electrode compartments. This electrolyzer is particularly advantageous where the first electrode compartment operates at a lower pressure than the second electrode compartment. This differential pressure may occur where the first electrode is an anode and the second electrode is a cathode. In one embodiment, the substantially incompressible components include an anode flowfield and a porous anodic electrocatalyst substrate. Particularly, the anode compartment may comprises a flattened expanded metal flowfield and the cathode compartment may comprise a non-flattened expanded metal flowfield. Furthermore, the anode flowfield and porous anodic electrocatalyst may be molded into a cell frame. The electrolyzer is beneficial for assuring that the proton exchange membrane does not deform under fluid pressure forcing the proton exchange membrane against the rigid, porous electrocatalyst substrate.

Another aspect of the invention provides a hydrogen delivery system of the vehicle comprising a controller for controlling the performance of the system. The controller sends the command signals to cause the system to release hydrogen and provide oxygen to the vehicle's exhaust system or catalytic converter.

The controller sends a command to a valve or system of valves in the delivery system to open the valve or valves. This command may be a sequence of commands or signals that cause the valves to cycle in such a way as to deliver hydrogen according to one of several delivery modes. The modes may be time, volume, or converter temperature dependent. Further, the modes may include a continuous delivery, packetized delivery, pulsed delivery or continuously varying delivery of hydrogen.

The hydrogen delivery system may have sensors placed in appropriate parts of the system for sensing various parameters of the system and sending signals to the controller indicating the value of these parameters. If the parameters fall within a certain window, then the system is working properly. Otherwise, some error may have occurred in the system, and an appropriate response may have to be executed, which may just present a warning indicator, or may actually shut down the system.

The vehicle may generate one or more trigger signals to the controller to instruct the controller to cause the release of hydrogen. Additional signals, such as temperature sensors, may instruct the system to slow or stop the release of hydrogen.

The controller also sends the command to the hydrogen generating part, or electrolyzer, of the system to turn on hydrogen generation. A signal from the hydrogen storage vessel that the vessel is full may prompt the controller to turn the hydrogen generator off. Additional signals, such as low battery voltage or high power demand on the engine, may temporarily signal the system to stop electrolyzing. Examples would be to slow or stop generation when the vehicle is at idle with the air conditioner turned on, or when the vehicle is passing or accelerating. Likewise, the system could be designed to increase the hydrogen production rate to take advantage of vehicle energy when coasting or the like.

BRIEF DESCRIPTION OF THE DRAWINGS

So that the features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 15 is a flowsheet showing the modes of operation for an ideal chemically heated catalyst (CHC) system.

FIG. 33 is a flow chart showing the procedure that the system goes through to release hydrogen in timed pulses for a specified volume of hydrogen.

FIG. 34 is a flow chart showing the procedure that the system goes through to set the current delivered to the stack of cells.

FIG. 35 is a flow chart showing the procedure that the system goes through to periodically update the parameters in the system.

DETAILED DESCRIPTION OF THE PREFERRED EMBODIMENT

Figure 1:
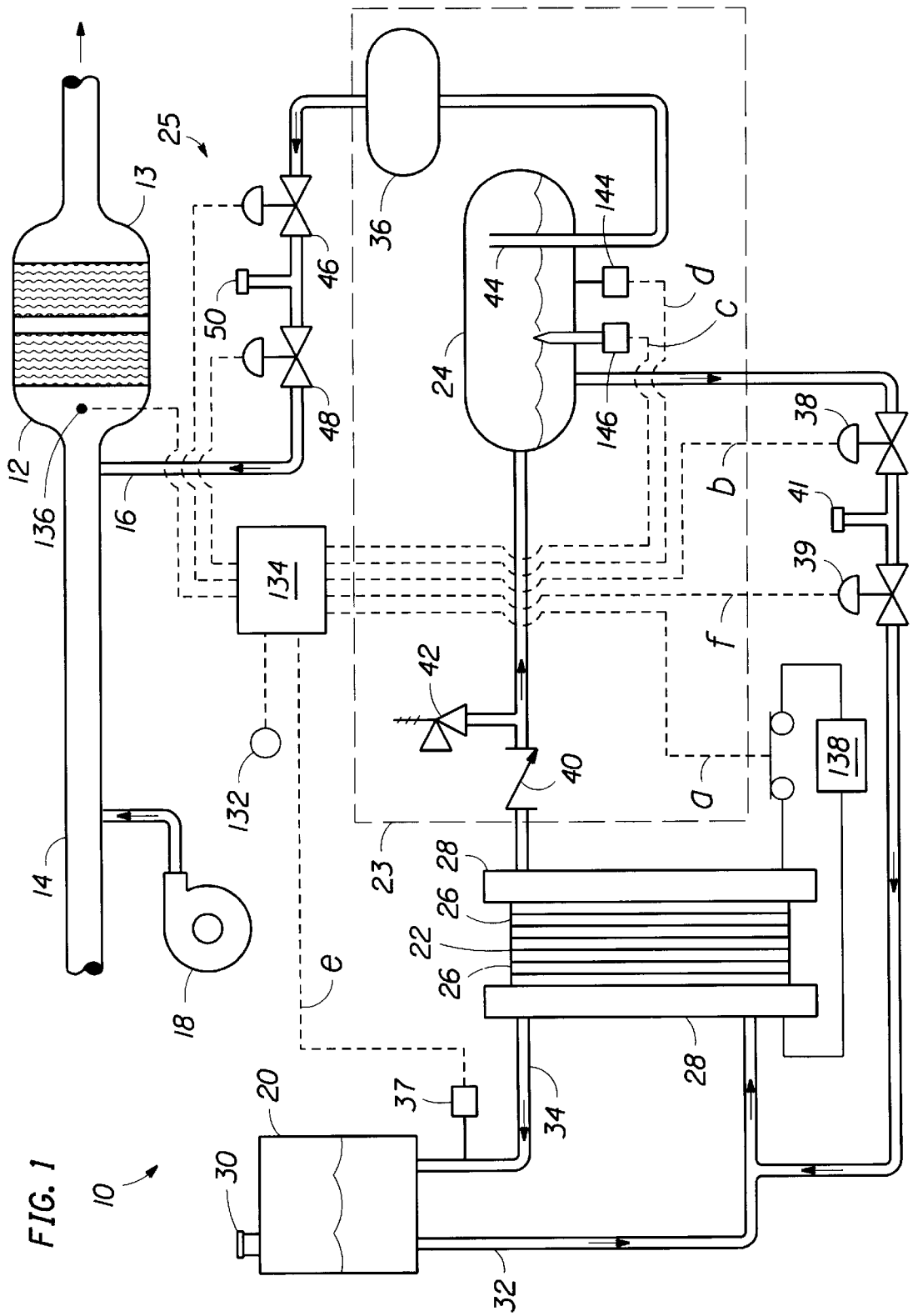
FIG. 1 is a schematic diagram of a hydrogen production and delivery system of the present invention for heating a catalytic converter.

The present invention provides a method and apparatus for chemically heating a catalyst bed by feeding hydrogen to the catalyst. The invention also provides a method and apparatus for thermally conditioning a catalyst in order to enhance the conversion of unacceptable emissions (emanating from an internal combustion engine) into water and other acceptable emissions. In one aspect of the invention, hydrogen is supplied from an electrolyzer or other hydrogen source and injected into the monolith of a catalytic converter to more rapidly bring the catalyst to a light-off temperature.

In another aspect of the invention, an apparatus is provided for producing, storing and delivering hydrogen to an automotive catalytic converter. The apparatus is simple and compact and includes a minimal number of moving parts. The apparatus includes a water source, an electrolyzer, a hydrogen storage vessel, and a valve for controlled delivery of the hydrogen to the catalytic converter. The apparatus preferably also includes an oxygen/water separator in communication with the anode flowfield, a hydrogen/water separator in communication with the cathode flowfield, and/or a check valve to prevent backflow of hydrogen from the storage vessel to the cathode flowfield. It may also be preferred to include an oxygen source in communication with the catalytic converter to facilitate the oxidation of hydrogen. The electrolyzer must be electronically coupled to a power source and the electrolyzer may be operated in various manners.

In yet another aspect of the invention, the electrolyzer and water reservoir are provided in a relationship that allows the oxygen gas bubbles generated in the anode to rise out of the electrolyzer and into the water reservoir and/or oxygen/water separator. The water reservoir preferably also serves as an oxygen/water separator wherein the oxygen may be released or stored and the water may be recycled to the anode. By disposing the water reservoir inlet above the anode flowfield or manifold outlet and providing a flow line that has a substantially continuous upward slope, the natural buoyancy of the gas bubbles lifts water from the anode and causes a natural circulation of water into and out of the anode. This arrangement may eliminate the need for a water pump, yet provides for water delivery and cooling to the anode and cathode.

In a further aspect of the invention, the flow line between the anode flowfield outlet and the water reservoir inlet is equipped with a bubble detector which indicates that there is sufficient water being supplied to the anode. The bubble detector may be used alone or in combination with other sensors to verify proper production, collection, delivery and integrity of the system or its components. A similar bubble detector could be placed between the cathode flowfield and the hydrogen storage tank.

Another aspect of the invention provides for water level management in the system to avoid hydrogen leaks. The hydrogen storage tank preferably includes a water level sensor in order to maintain at least a minimum amount of water in the bottom of the vessel where various instruments and pipes interface with the vessel. Similarly, it is preferred that the anode and cathode manifolds be configured so that the electrolyzer is always full of water. The presence of water assists in maintaining a seal between adjacent components.

A further aspect of the invention provides a hydrogen delivery system designed to supply pulses of hydrogen gas to the catalytic converter or any other desired component of the automobile, such as the engine. The hydrogen delivery system comprises a pair of valves with a region therebetween having a known volume. The region is filled with hydrogen under pressure by opening the first hydrogen valve communicating with the hydrogen storage vessel. The first valve is then closed and the second valve is opened to release the pressurized hydrogen into the catalytic converter, exhaust manifold or engine, as desired. While the region may be of any useful volume and configuration, a typical automobile will preferably have a region suitable to contain about 5 cubic centimeters (cc) at about 400 pounds per square inch (psi), which is released as about 100 cc at about 1 atmosphere (atm). The invention also provides for a turnstile valve as an alternative to the hydrogen delivery system just described. It is believed that the turnstile valve may be more reliable. A third delivery design may consist of a solenoid value for on/off control in series with a variable flow restriction valve for flow control.

Another aspect of the invention provides for a hydrogen flow path to be maintained under pressure to prevent the infiltration of oxygen therein. While minute amounts of oxygen may enter the system or small amounts of hydrogen may leak out of the system, the invention maintains safe hydrogen and oxygen concentrations throughout the system.

The invention also provides for the use of a low carbon-containing alcohol, e.g., methanol, ethanol or propanol, in the water throughout the system in order to depress the freezing point of the water. An alcohol, such as methanol, may be provided in any useful concentration, but preferably at an alcohol:water molar ratio of between zero and about 1:1. The alcohol is carried with the water throughout the system and may be oxidized at the anode to carbon dioxide gas ($CO_2$), six hydrogen ions (H+), and six electrons (e−). The hydrogen ions, or protons, and electrons are recombined at the cathode to form three molecules of molecular hydrogen ($H_2$).

The invention further provides an electrolytic cell and method of making an electrolytic cell having a flowfield and catalyst substrate molded together within a common frame. While typical cell components are merely held together under pressure between two end plates, a one piece, molded cell would enhance the performance and extend the life of an electrolytic cell in applications in which the cathode and anode are operated at different pressures, particularly at high differential pressures approaching 400 psi or more.

The invention preferably includes a check valve between the electrolyzer and the hydrogen storage vessel. The check valve prevents the pressurized hydrogen in the vessel from flowing back into the electrolyzer, specifically the cathode. Therefore, if the electrolyzer has any small leaks, the electrolyzer may depressurize down to atmospheric pressure without a substantial loss of hydrogen.

FIG. 1 is a schematic flow diagram of a system 10 of the present invention installed on a vehicle to deliver hydrogen to the exhaust system. The vehicle includes a catalytic converter 12 located in an exhaust line 14 from a vehicle's exhaust manifold, as shown. The exhaust line 14 is provided with hydrogen from a hydrogen inlet line 16 and, preferably, air from an air pump 18. The air pump could be any suitable air source for injecting air into the exhaust line at suitable pressure and volumetric flow rate to achieve any desired air/hydrogen ratio mixture. The air pump may be replaced by a venturi wherein the pressurized hydrogen gas provides a motive force sufficient to draw in ambient air.

The system 10 includes a water reservoir 20, an electrolyzer 22, a hydrogen storage vessel 24 and a hydrogen delivery system 25. The electrolyzer 22 may preferably comprise a plurality of stacked identical cells 26 between end plates 28. The water reservoir 20 preferably serves not only as a water storage chamber but also as a separator for oxygen gas and water and means of dissipating heat. The reservoir 20 may be a vehicle's windshield washer fluid storage container, but is preferably a dedicated reservoir/separator, optionally allowing collection and storage of oxygen via port 30. Water flows by gravity drain or is pumped from the reservoir 20 to the anodes of the electrolyzer 22 via a supply line 32. As the anodes produce oxygen, the oxygen and entrained water rises naturally back to the reservoir 20 via a return line 34.

A bubble detector 37 is preferably disposed adjacent or around the return line 34 in order to sense the passage of gas bubbles therein. A suitable type of bubble detector is an optical transmission type detector. The electronic signal from the bubble detector 37 is preferably transmitted to a controller 134 and the signal indicates that at least certain aspects of the electrolyzer 22 are operating properly. Conversely, if the signal indicates the absence of gas bubbles in the return line 34, then the electrolyzer 22 may have a problem, such as a ruptured proton exchange membrane (PEM), depleted or blocked water supply, etc. Furthermore, the controller 134 receiving the signal from the bubble detector 37 may analyze the number of gas bubbles passing through the line 34 over a period of time as some indication of the electrolyzer's operating efficiency.

The hydrogen produced at the cathodes of the electrolyzer 22 is delivered under pressure to a hydrogen storage system 23 comprising a hydrogen storage vessel 24 alone or in communication with one or more additional hydrogen storage vessels 36. The use of more than one hydrogen storage vessel is not necessary to the operation of the invention, but may be desirable to provide sufficient storage capacity while making accommodation for space limitations on board the vehicle. The storage vessel may be made from various materials, such as aluminum, carbon steel, stainless steel or a noncorrosive plastic material. It is preferred that the hydrogen storage vessel 24 or combination of vessels 24,36 have a total hydrogen storage capacity that is sufficient to heat up the catalyst to a light off temperature at least one time. By storing such amount, the rate of hydrogen production from the electrolyzer can be reduced substantially below the rate of hydrogen consumption by the catalytic converter during the start up period. Furthermore, the electrolyzer may be controlled to refill the storage vessel with hydrogen at various times, preferably when the vehicle is operating efficiently.

The system preferably also includes a water recycle line with valves 38, 39 to capture and reuse most of the entrained water from the hydrogen exiting the electrolyzer 22, a check valve 40 to prevent back flow of hydrogen from the storage vessel 24 into the electrolyzer 22, and a pressure relief valve 42 to protect the system against over pressurization. Because the storage vessel 24 may be designed to operate at a much higher pressure than the water reservoir 20 or the supply line 32, the mere opening of the recycle valve 38 causes water to flow out of the vessel 24. Valves 38 and 39 are alternately cycled to allow small, well controlled amounts of water out of the cathode reservoir. As valve 38 opens, water flows into the tubing between the valves and compresses the headspace in the vertical stub 41. Valve 38 closes and valve 39 opens allowing the compressed hydrogen in the stub 41 to push the captured water into the anode reservoir. The recycle valves 38 and 39 are preferably controlled to maintain the water level in the vessel 24. A preferred water level will be high enough to cover most or all of the pipe and instrument couplings along the bottom of the vessel yet not so high that the hydrogen storage capacity of the vessel is wasted.

Figure 36:
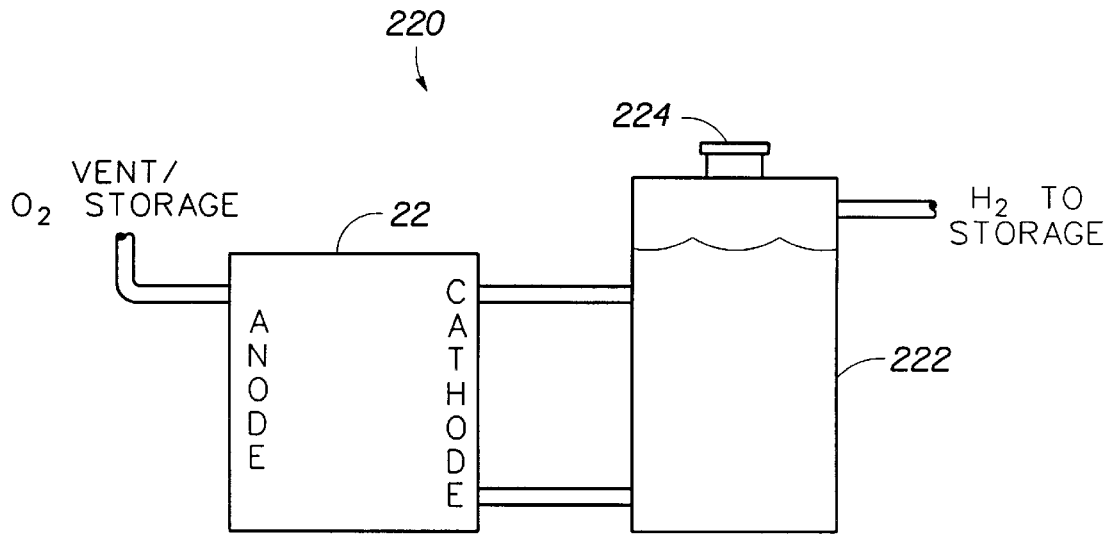
FIGS. 36 and 37 are schematic diagrams of two alternate embodiments of the system of FIG. 1, wherein the water recovery system in the vessel is eliminated.
Figure 37:
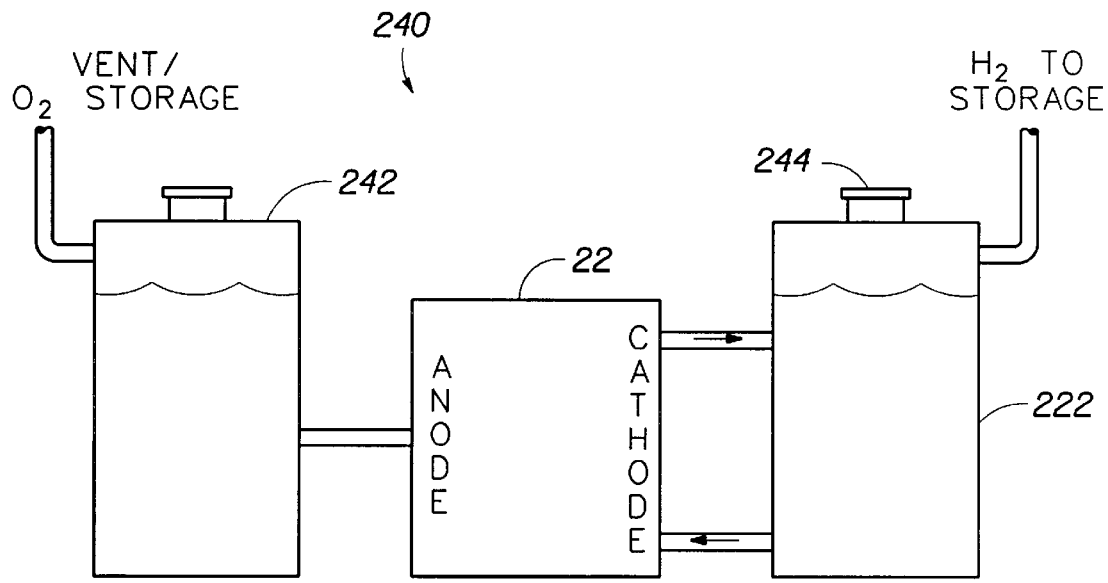

FIGS. 36 and 37 are schematic diagrams of two alternate embodiments of the system of FIG. 1, wherein the water recovery system in the vessel 24 is eliminated. Both alternate systems 220, 240 utilize a proton exchange membrane with the cell 22 which, when operated at sufficiently low current density, will provide the necessary reaction water to the anode when that water is provided at the cathode. The system 220 of FIG. 36 includes a pressurized cathode (hydrogen) reservoir 222 with means 224 for releasing the pressure and refilling the reservoir with water. Alternatively, the reservoir 222 could be filled using pressurized water, which would allow manufacturing control over filling if the system requires specialized equipment.

To eliminate the complexity and safety issues involved, the system 240 shown in FIG. 37 uses an anode reservoir 242 and a cathode reservoir 244. This system 240 still utilizes osmotic movement of the water from the cathode to the anode in normal operating mode but new water is provided at the anode (at ambient pressure) and this water is transferred to the cathode via electroosmosis during the initial operation of the electrolyzer 22 after filling the anode reservoir 242. Once all the anode water is depleted, electroosmosis between the reservoirs 242,244 ceases and, once again, all process water is provided through the cathode.

Referring back to FIG. 1, the hydrogen is delivered out of the storage vessel 24, preferably through a standpipe 44, or from the top of the vessel 44 or 36 in accordance with the operation of a hydrogen delivery system 25. The hydrogen delivery system 25 determines the manner in which the hydrogen is introduced into the catalytic converter and may be as simple as a single solenoid valve. While hydrogen may be introduced through various valves or orifice plates as a slow, continuous stream, it has been found (as described in relation to FIG. 10) that introduction of hydrogen pulses or packets to the catalytic converter provides similar heating, yet requires less hydrogen. One preferred delivery system 25 for providing hydrogen pulses or packets comprises a first hydrogen valve 46, a second hydrogen valve 48 and a central region 50 disposed between the first and second valves 46,48 having a defined volume. The central region 50 is filled with pressurized hydrogen from the storage vessel 24, 36 by opening the first hydrogen valve 46 communicating with the hydrogen storage vessel 24, 36. The first hydrogen valve 46 is then closed and the second hydrogen valve 48 is opened to release the pressurized hydrogen from the central region 50 into the catalytic converter 12, exhaust manifold 14 or engine, as desired. While the region 50 may be of any useful volume and configuration, a typical automobile will preferably have a region suitable to contain about 5 cubic centimeters (cc) at about 400 pounds per square inch (psi), which is released as about 100 cc at about 1 atmosphere (atm). Alternatively, the hydrogen delivery system 25 may comprise a turnstile valve. It is believed that the turnstile valve may be more reliable over a period of extended use.

The ignition switch 132 is preferably electronically coupled to a controller 134 which controls the operation of the hydrogen valves 46, 48 of the hydrogen delivery system 25. In one preferred method of operation, the hydrogen valves 46, 48 provide pulses of hydrogen to the manifold 14 until the temperature sensor 136 reads a temperature equal to or greater than the light-off temperature. The temperature sensor provides feedback to the controller so that adjustments in the manner of operating the hydrogen valves 46, 48 can be made. It should be recognized that any number of temperature sensors could be used and that the controller may take account of any number of conditions in determining the appropriate operation of the valves 46, 48, or other hydrogen delivery systems 25 such as a rotary valve. It is anticipated that refinements in the hydrogen delivery may include pulses of varying frequency and/or volume over time to compensate for increasing catalytic converter temperature or decreasing pressure in the hydrogen storage reservoir.

The electrolyzer 22 receives power from a source 138. It is preferred that the electrolyzer produce hydrogen when the hydrogen pressure in or near the hydrogen storage vessel 24, as indicated by pressure sensor 144, falls below a setpoint pressure between about 100 psig and about 400 psig. It should be recognized that the power to the electrolyzer 22 should be turned off when the pressure exceeds a high pressure setpoint, such as 400 psig. It should also be recognized that many other conditions may be considered in controlling the electrolyzer 22, such as signals from the engine management unit, the length of time that the vehicle has been running, the characteristics of the power supply and the volume of the storage vessel. The other conditions mentioned may be relevant to the efficient operation of the vehicle and the timely replenishment of the hydrogen supply for use during the next cold start. However, in order for the system to account for multiple conditions, it is preferred that the system communicate with a microprocessor controller 134, whether the controller is dedicated to the system 10 or provided as part of the vehicle (such as the engine management controller,) or some combination of controllers.

The microprocessor controller 134 may also be used to monitor and control the water level in hydrogen storage vessel 24. The hydrogen storage vessel 24 is preferably equipped with a water level sensor 146, most preferably a sensor without any moving parts such as an optical sensor. When the water level is too high, the water outlet valve 38 is opened so that the pressure in the vessel 24 will drive water out of the vessel into the reservoir 20 or supply line 32. When the water level is within an acceptable range, the valve 38 is closed. Again, it is preferred to maintain a sufficient level of water in the vessel 24 in order to provide additional protection against hydrogen leaks. Other various control schemes and considerations may be employed as will be readily recognized by those with skill in the art which are within the scope of the present invention. For example, the microprocessor may also be programmed to carry out timed control functions apart from responding to sensory inputs, and may also serve various safety functions.

Figure 2:
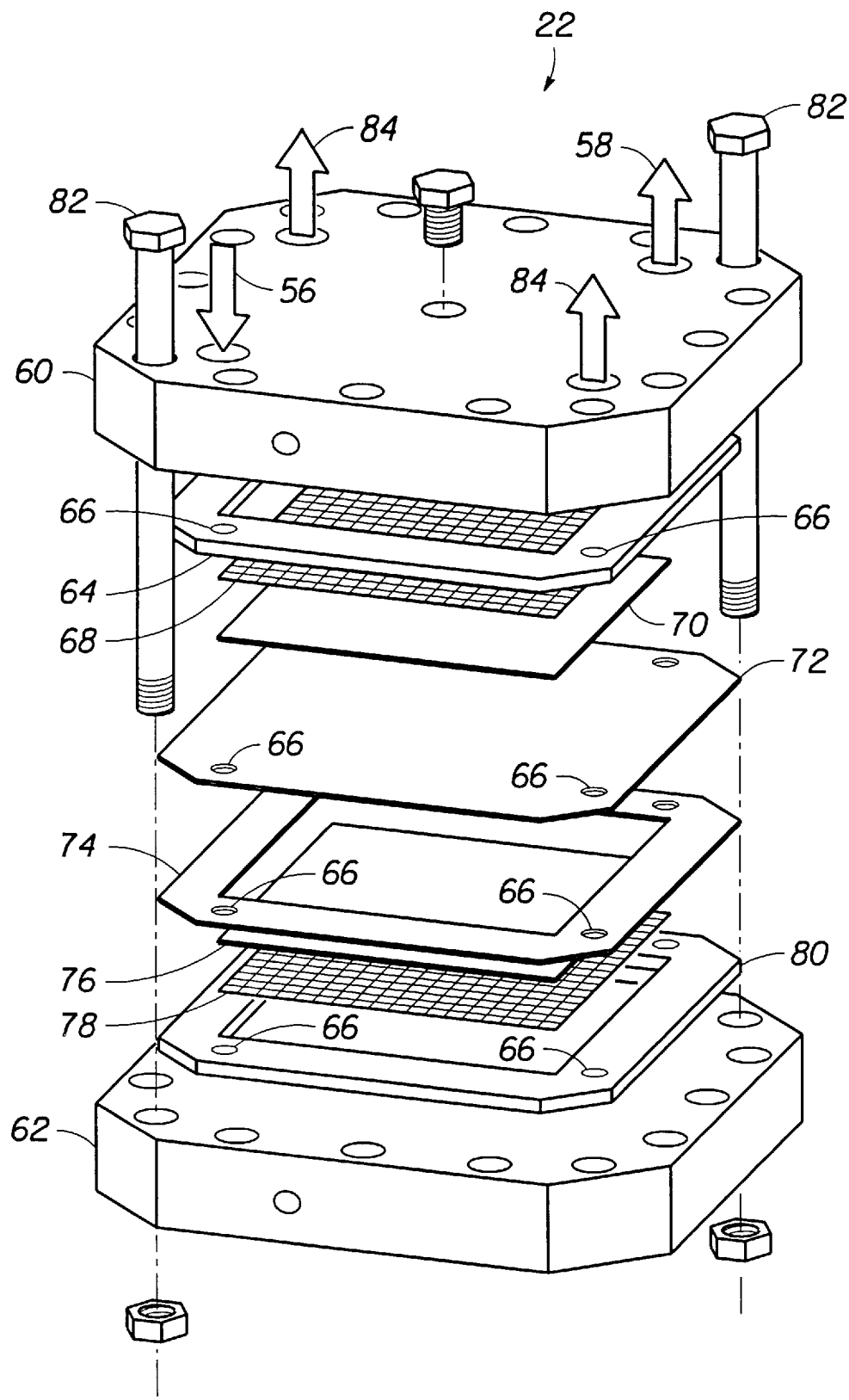
FIG. 2 is an exploded view of a preferred electrolyzer that may be employed in the present invention.

FIG. 2 is an exploded view of a preferred electrolyzer 22 that may be employed in the present invention. In the following description of the electrolyzer 22, the materials of construction referred to as "preferred" are the materials actually used in a test device to prove that the invention would work for its intended purpose. In commercial production models of the present invention, where possible, less expensive materials may be used throughout, such as carbon steel replacing titanium where possible, and plastics, such as polypropylene, where heat and stress will permit the use of such materials.

The electrolyzer 22 may be referred to herein as a proton exchange membrane (PEM) electrolyzer. The proton exchange membrane 72 may itself prove corrosive in this environment in contact with certain substances, thus requiring the careful selection of the material of construction of the electrolyzer. For example, the PEM 72 should only come in contact with carbon, graphite, valve metals (such as titanium or tantalum), noble metals (such as platinum or palladium) or gold. However, those of skill in the art will readily recognize where less exotic materials than those listed in the following discussion that are located away from the PEM material itself and the oxygen electrode catalyst can be readily employed without penalty. For example, graphite will be the material of choice in certain structural elements, and not some obvious candidates such as copper, aluminum, or iron, which can corrode thus forming ions that can poison the anode and/or cathode electrocatalysts.

The electrolyzer 22 includes an anodic electrocatalyst substrate and/or current collector 70 and a flattened "expanded" titanium flow field 68 held within an anodic cell frame 66 made of polychlorotrifluoroethylene (PCTFE) sheet (such as KEL-F available from the 3M Company, St. Paul, Minn.). The preferred anode substrate and/or current collector is a thin sheet of porous titanium made by sintering small diameter titanium spheres and is available from AstroMet, Cincinnati, Ohio. A more preferred anode substrate and/or current collector is a thin sheet of porous titanium made by sintering small diameter titanium fibers and is available from Porous Metal Products, Jacksboro, Tex.

The electrolyzer 22 further includes a cathode substrate and/or current collector 76 and an expanded stainless steel flow field 78 retained in a cathodic cell frame 80 formed of polysulfone. The preferred cathode substrate and/or current collector is a carbon paper consisting of pressed carbon fibers or a carbon cloth made from a weave having a cathodic electrocatalyst layer on one side containing polytetrafluoroethylene (PTFE)-bonded high surface area colloidal platinum or palladium, supported on carbon black or preferably an electrolessly deposited or electroplated thin film of platinum or palladium, most preferably having a platinum or palladium loading of at least 0.1 mg/cm$^2$. Alternatively, the cathode may be constructed using a semi-compressible stainless steel felt, suitably supported, having high porosity and sufficient catalytic activity.

The various components of the PEM electrolyzer are stacked together and retained with a plurality of tie rods 82, preferably 16 such tie rods. Stainless steel tubes, such as SS316, are then screwed into four threaded ports on one of the titanium end plates. The ports are the anode water inlet port 56, the anode water/oxygen outlet port 58, and a pair of cathode hydrogen/water outlet ports 84. To minimize electrical contact resistance between components, the titanium end plates 60 and 62 and the expanded titanium metal current collectors 68 and 78 may be electroplated with a thin film of gold or noble metals, such as platinum.

The cathode and the anode of the electrolyzer are of special construction. The cathodic electrode structure for hydrogen evolution may be fashioned from a commercially available fuel cell gas diffusion layer on a carbon cloth backing (such as ELAT available from E-TEK, Inc., Natick, Mass.), which acts as a support for the active hydrophilic electrocatalyst layer. This active layer contains high surface area colloidal platinum (about 100 $m^2/g$), supported on carbon black (between about 10 and about 50 wt % Pt on C), yielding a platinum loading of at least about 0.1 $mg/cm^2$. The cathodic electrode structure may be hot-pressed onto one side of a segment of a precleaned PEM material. Hot-pressing of the cathodic electrode and PEM is preferably carried out between the plates of a hot-press elevated to about 200° C. for about 60 seconds, and using a force of about 15,000 pounds.

One suitable anodic electrocatalyst layer contains mixed iridium and ruthenium dioxides at a molar ratio of about 1:1. The layer is prepared by dissolving iridium and ruthenium chlorides in about 8 ml of concentrated HCl and heating the mixture to almost dryness. The resulting chlorides are then dissolved in isopropanol to make an ink-line coating. A porous titanium plate (such as a 0.05" thick plate available from Astro Met of Cincinnati, Ohio) is etched in 12% $HBF_4$ for about 60 seconds and rinsed with isopropanol. This substrate is then coated with the ink-like mixture and the solvent evaporated under low heat of about 90° C. This coating and drying procedure is repeated several times, then the electrode is heated in a furnace at 400° C. for 10 minutes in ambient air. The coating, drying, and furnace treatment is repeated twice more, but with a final baking time of two hours instead of 10 minutes. A preferred anodic electrocatalyst consists of high surface area platinum-ruthenium metal alloy powder having an atomic ration of 1:1, platinum:ruthenium and which is available from E-TEK, Inc., Natick, Mass. A more preferred anodic electrocatalyst consists of high surface area platinum-ruthenium oxide ($Pt-RuO_x$) powder having an atomic ratio of 1:1, platinum:ruthenium. The synthesis of the $Pt-RuO_x$ electrocatalyst employs anhydrous chloride salts of platinum and ruthenium. Quantities of the two salts are utilized such that the Pt-Ru atomic ratio is 1:1. The salts are ground together with $NaNO_3$ using a mortar and pestle until a homogenous powder is obtained. The resulting mixture is then deposited in a crucible, placed into a 500° C. oven, and fired in ambient atmosphere for 10 minutes. After heating, the crucible is removed from the oven and allowed to cool to room temperature. A shiny black crystalline solid is observed in the crucible which consists of the desired $Pt-RuO_x$ product dispersed in a salt matrix. To dissolve the salt and liberate the insoluble catalyst product from the matrix, the crucible is placed into a beaker of distilled/deionized water for 24 hours. The product is then isolated using vacuum filtration, washed with copious amounts of deionized water, and dried in a heated vacuum oven.

To ensure that surface atoms of platinum and ruthenium in the Pt-RuOx crystallites are activated completely, the catalyst is subjected to a heated reduction step. The catalyst is placed into a cool ceramic heating tube which is housed in a muffle furnace and equipped for the external supply of gaseous reactant. Initially, argon is allowed to flow for one hour in the tube to remove potential oxidizing species from the ceramic. Hydrogen is then introduced into the ceramic tube and the temperature of the furnace/ceramic tube is increased slowly to 200° C. This environment is maintained for six hours. The resulting catalyst is a very fine powder which displays catalytic activity toward methanol oxidation in the presence of air.

An even more preferred anodic electrocatalyst consists of a homogenous mixture of high surface area iridium and ruthenium oxides with either high surface area platinum-ruthenium metal alloy powder or high surface area $Pt-RuO_x$. In each case, the mole ratio of iridium and ruthenium oxides to platinum-ruthenium metal alloy or to $Pt-RuO_x$ should preferably be 1:1.

The anodic eletrocatalysts described above are applied to one side of a proton exchange membrane in the form of a catalyst ink that is prepared using the following procedure. The catalyst is first dispersed into distilled water using a water:catalyst ratio of approximately 1:1 by weight. The mixture is then sealed into an appropriate container to prevent solvent evaporation and agitated using high energy sonication for one hour or more until complete dispersion is achieved. Following dispersion and wetting of the catalyst, a quantity of commercially-available, dissolved ionomer, solution, such as the 5 wt % Nafion® solution available from Solution Technologies, Mendenhall, Pa., is added to the dispersion such that the final concentration of ionomer is approximately 15 wt %.

This mixture is resealed into a container to minimize evaporation and subjected to high energy sonication until a homogenous, well-dispersed catalyst ink is achieved. The ink is applied directly to the surface of a dry membrane as a single layer or as a multilayer coating using a brush technique. For multilayer coatings, the solvent of the previously applied layer is evaporated to dryness prior to the application of the next coat. The procedure could be modified to make use of other coating application techniques such as air spraying or spin coating which are more amenable to mass production.

After the catalyst ink has been applied successfully to one side of the membrane the membrane and electrode (M&E) assembly is subjected to a hot press step. In this step, the electrodes and membranes are fused under elevated temperature and pressure in a hydraulic press equipped with resistively-heated platens. To press the M&E, a "press package" is created which consists of the M&E and various insulative and support layers to facilitate the release of the M&E from the package after the press step. In this package, the M&E assembly is sandwiched typically between two thin Teflon sheets to protect the electrode surface(s), and this sandwich is placed between two thin, flat metal plates that provide support and heat transfer between the platens and the M&E during the press step. The complete M&E, Teflon, and metal plate press package is positioned quickly between the two pre-heated platens (ca. 150 to 200° C.), and pressure (1000 to 1500 psi) is applied to the package for 60 to 120 seconds to finish the M&E fabrication process.

For the longest component lifetime it is important to prevent the movement of internal electrolyzer components as the cathode (hydrogen) pressure is changed. This is accomplished by selecting an anode flowfield and a porous electrocatalyst substrate that are noncompressible and selecting cathode components which provide sufficient elasticity such that the PEM is pressed firmly against the anode regardless of the cathode pressure.

In the preferred structure the anode flowfield consists of flattened "expanded" metal and the cathode flowfield includes at least one piece of non-flattened (as expanded) metal to provide compression.

An alternative flow field would be perforated corrugated steel. The corrugates could be designed to provide more rigidity on the low pressure side and more elasticity and resiliency on the high pressure side of the membrane.

In mass production, where components such as the cell frames are molded, the anode flowfield components could be molded into the cell frame. This would increase the rigidness of the noncompressible side as well as simplify assembly.

Figure 3:
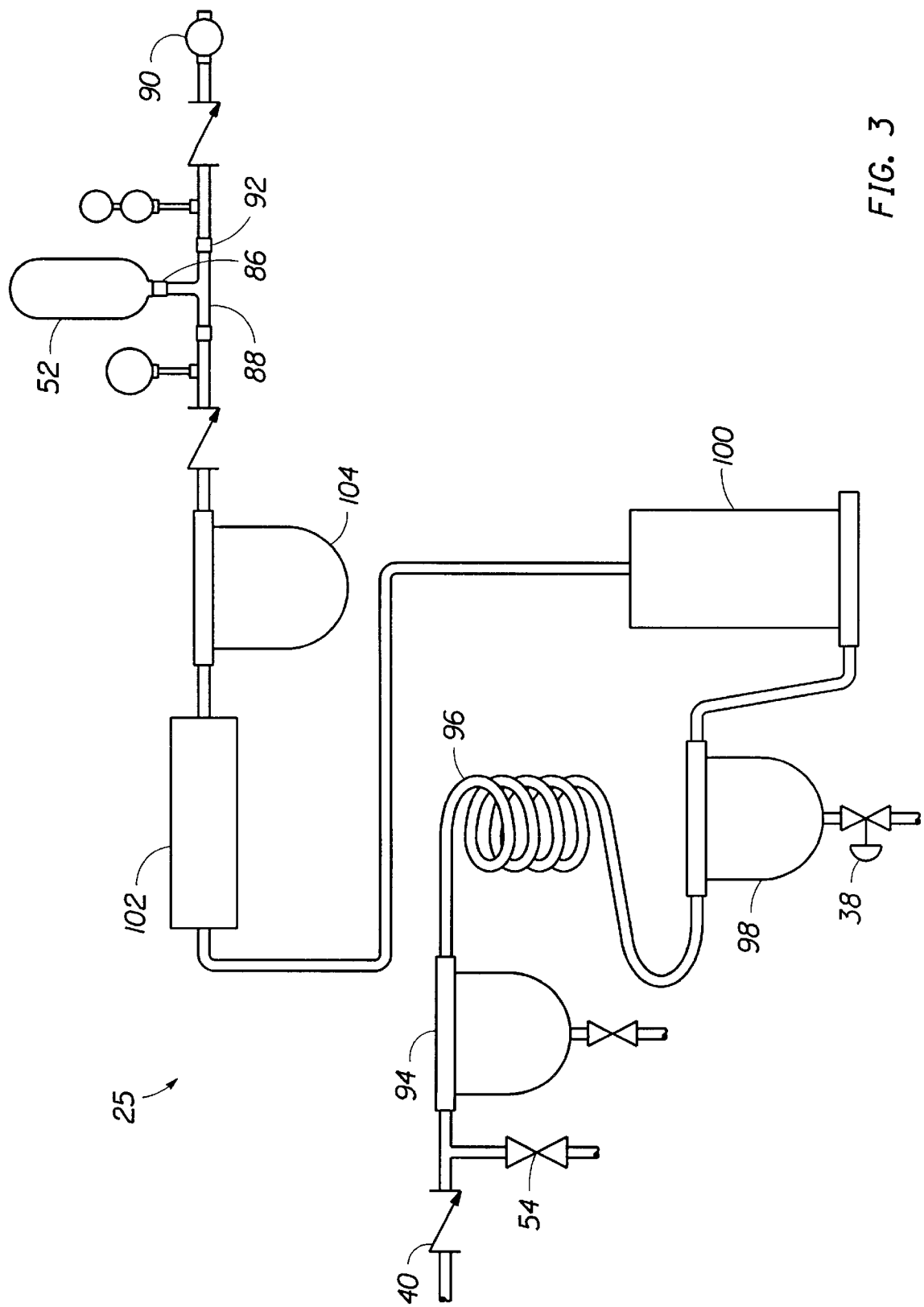
FIG. 3 is a schematic of an alternate hydrogen storage system of the present invention.

FIG. 3 is an alternative hydrogen storage system 25 which utilizes a metal hydride type storage vessel 52. Prior to operation, the system 25 of FIG. 3 permits purging all air from the storage system with an inert gas, such as nitrogen, by attaching a nitrogen gas feed line at a purge gas inlet 54 downstream of the check valve 40. During the purging operation, the metal hydride vessel 52 is detached at a quick disconnect 86. This operation effectively seals both the vessel 52 and a gas line 88, to keep the purge gas out of the vessel 52. The remainder of the system 25 is then purged from the purge gas inlet 54 through a back pressure regulator 90.

To charge the system 25 with hydrogen, a needle valve 92 between the storage vessel 52 and the back pressure regulator 90 is shut. Hydrogen gas generated by the electrolyzer (See FIG. 1) is preferably processed through a four-stage process to remove entrained water (liquid or vapor) and any oxygen contaminant from the hydrogen stream before storage in the vessel 52. The first step involves removal of a small amount of entrained liquid water coming from the electrolyzer in the hydrogen gas. The entrained liquid water is removed without a pressure loss by means of the entrained liquid water trap 94. The second step involves cooling the hydrogen gas stream from the electrolyzer temperature to ambient in a condensing coil 96. The electrolyzer typically operates at between about 20 and about 60° C. above ambient, with the exact temperature depending on specific electrolyzer operating conditions. This second step condenses a substantial portion of the water vapor in the hydrogen gas stream. This condensed water could absorb a significant amount of alcohol, which may be present during operation using windshield washer fluid as the electrolyzer reactant feed. The condensate is collected in a condensate collector 98 and removed through the drain valve 38.

At this point, the hydrogen gas stream is still saturated with water vapor, but now at a lower temperature. This saturated gas stream is next passed into a zeolite-filled gas drier 100. This drier absorbs water vapor and any alcohol vapor present when using a windshield washer fluid feed. Any oxygen contaminant present in the hydrogen gas stream is then eliminated in a catalytic recombiner or oxygen eliminator 102 to reduce it to water. Final clean-up of the hydrogen gas stream is accomplished in a second zeolite absorber bed in a polishing drier 104. The polishing drier removes traces of water produced by the catalytic recombiner 102.

The hydrogen storage system 25 of FIG. 3 is designed for relatively short term operation. The system 25 may be designed for longer term operations, for example 100,000 miles or more, utilizing other methods of water removal known in the art. A satisfactory metal hydride hydrogen storage unit is available from Hydrogen Consultants of Littleton, Colo. Such an available unit can store 30 liters of hydrogen which can be delivered at 30–45 psig, with recharging using hydrogen gas at 100–200 psig. Still, the most preferred hydrogen storage means is a pressure vessel, such as vessel 24 of FIG. 1, made of a composite structure, involving the use of aluminum or ferrous-based alloys. A suitable hydrogen storage vessel of this type is available from Harless Specialties of Irwin, Pennsylvania.

Figure 4:
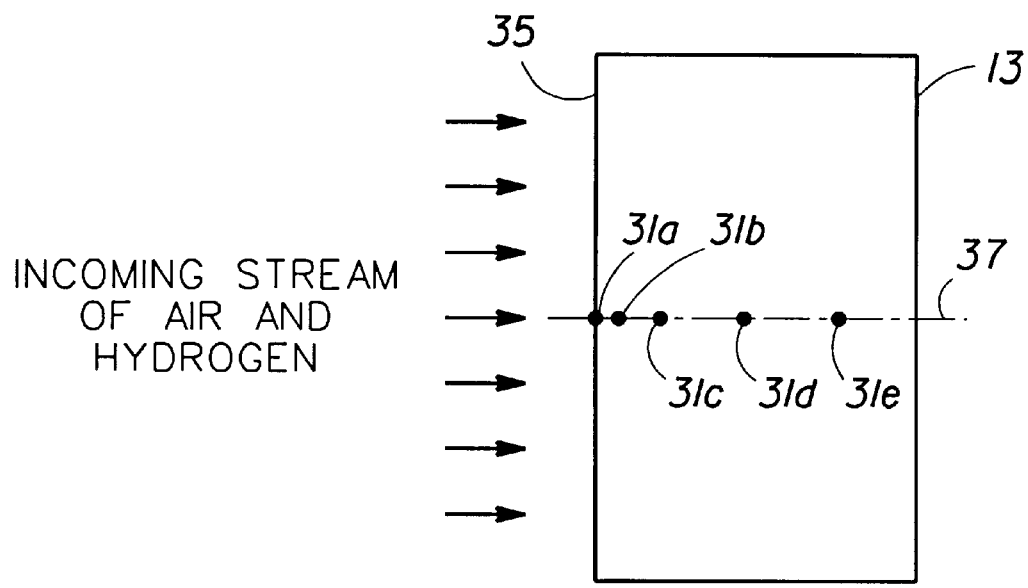
FIG. 4 is a cross-sectional side view of a catalytic converter monolith showing air and hydrogen flow in the axial direction.

FIG. 4 is a simplified cross-sectional view of a catalytic converter monolith showing air and hydrogen flow in the axial direction through the monolith 13. The temperature of the monolith is measured with a thermocouple at points 31(a)–(e) along the central axis, with point 31(a) being on the front face where the gases first contact the catalyst and the other points 31(b)–(e) located at positions successively further into the monolith. The results of these temperature measurements at 40 liters per minute (1 pm) total gas flow rate containing 3%, 5%, 8.5% and 17% hydrogen is shown in FIGS. 6(a)–(d). FIGS. 6(a)–(d) are graphs of the catalyst temperature measured at axial positions within the monolith as indicated in FIG. 4.

Figure 5:
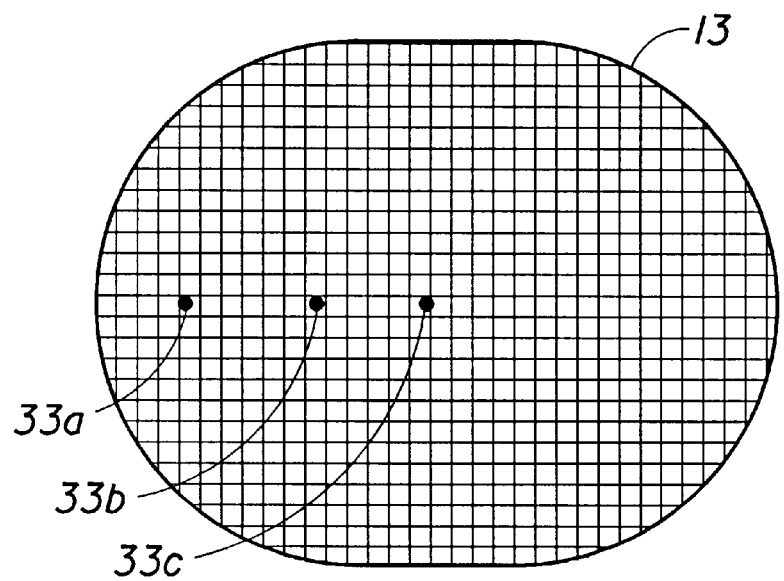
FIG. 5 is a cross-sectional front view of the catalytic converter monolith in FIG. 4.
Figure 6A:
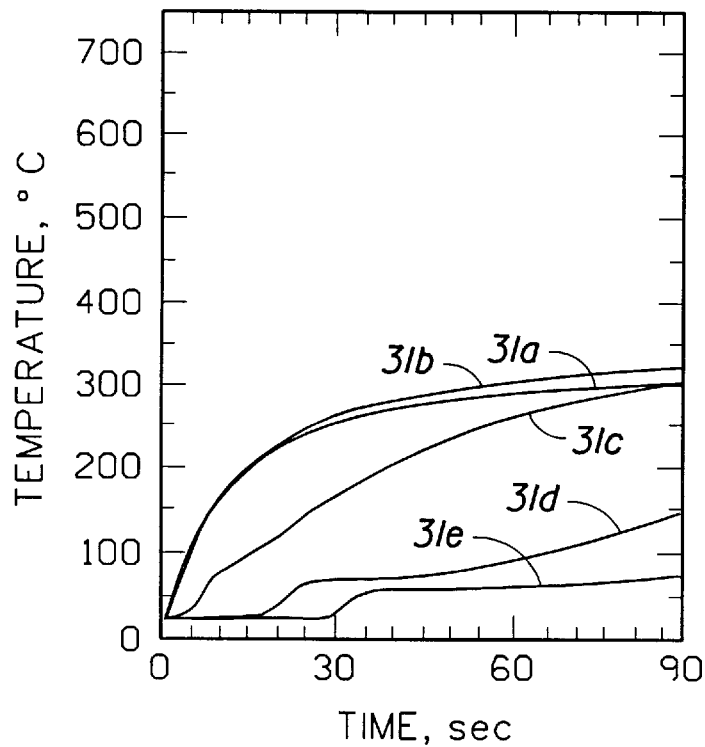
FIGS. 6(A–D) are graphs of the catalyst temperature measured at axial positions within the monolith as indicated in FIG. 4.
Figure 6B:
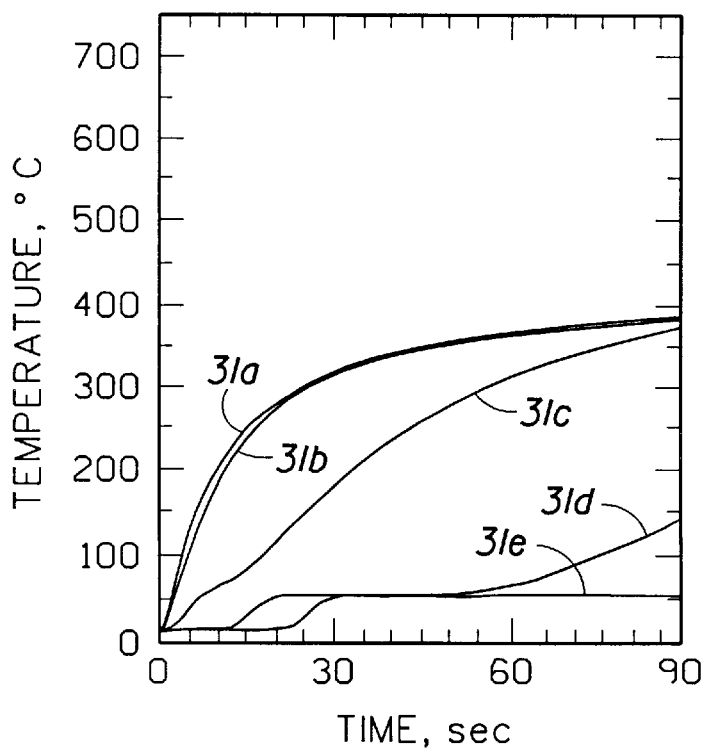
Figure 6C:
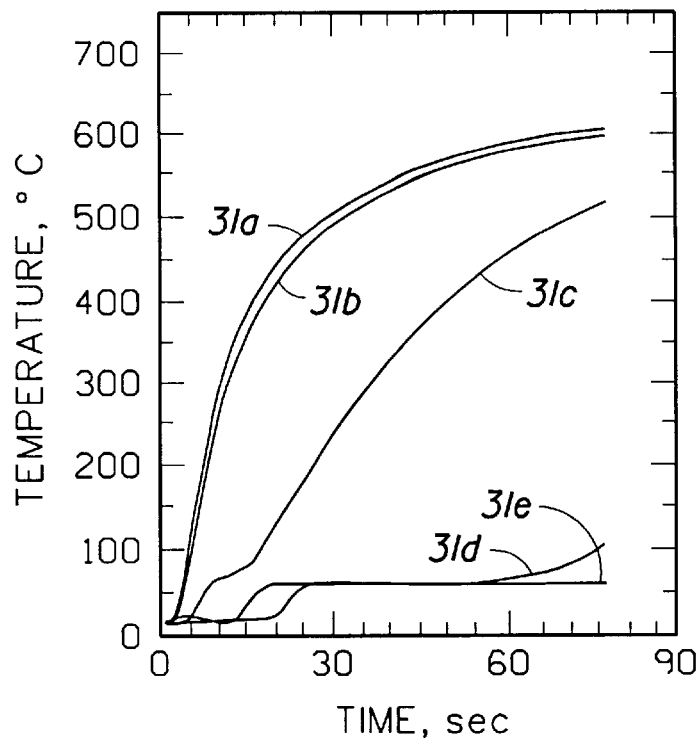
Figure 6D:
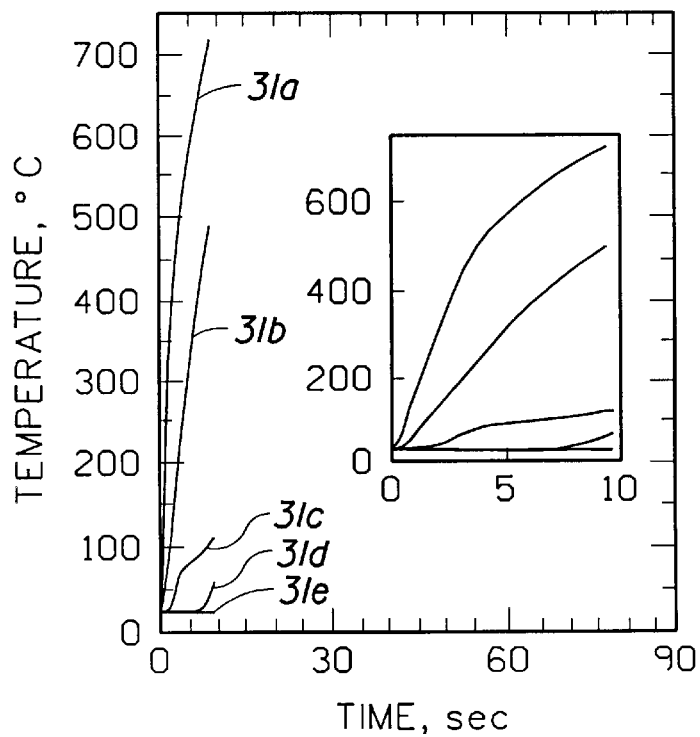
Figure 7A:
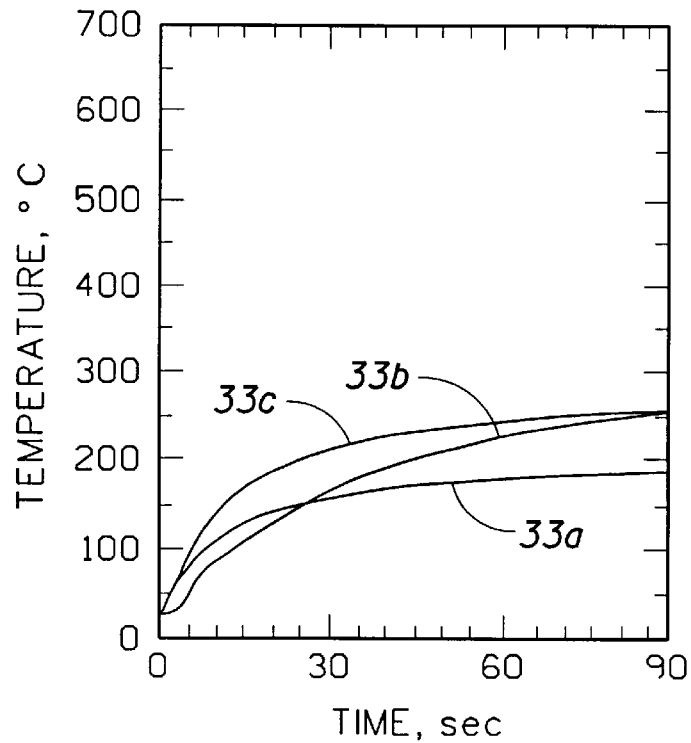
FIGS. 7(A–D) are graphs of the catalyst temperature measured at radial positions within the monolith as indicated in FIG. 5.
Figure 7B:
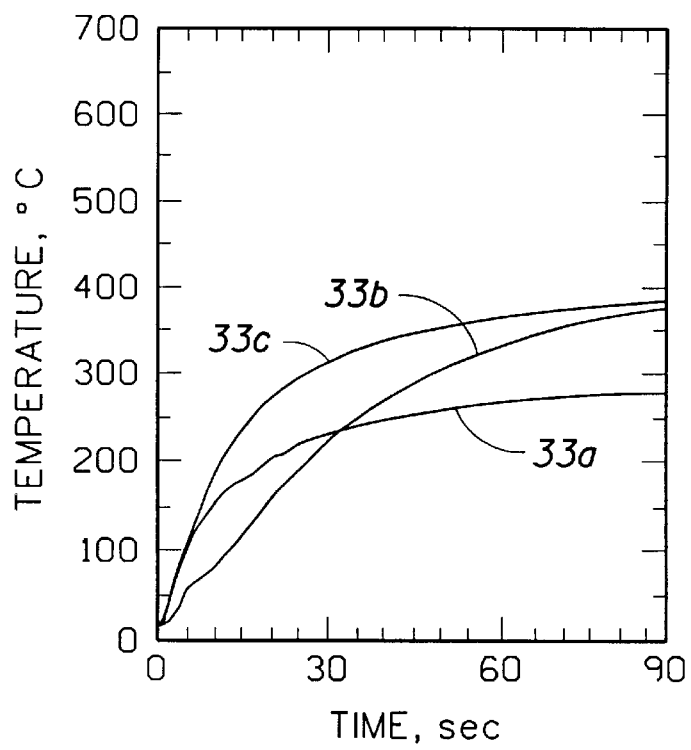
Figure 7C:
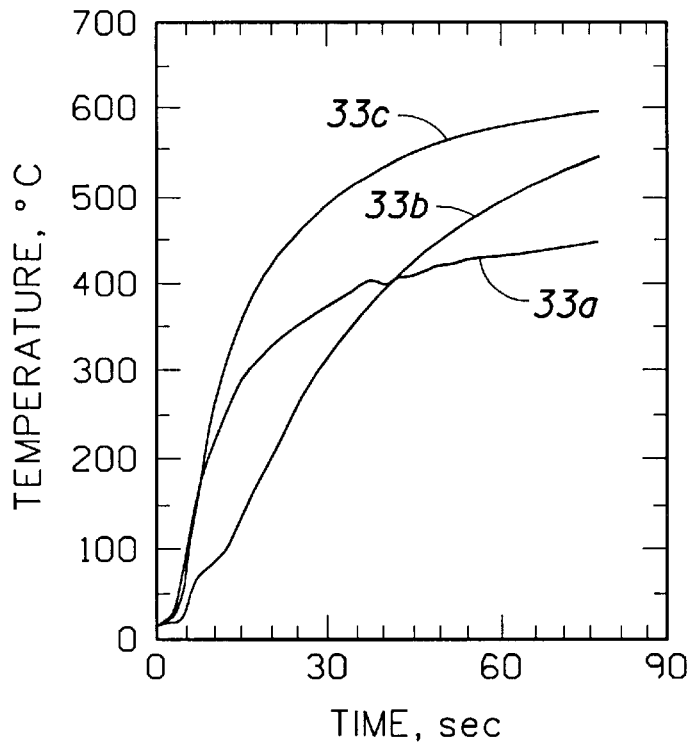
Figure 7D:
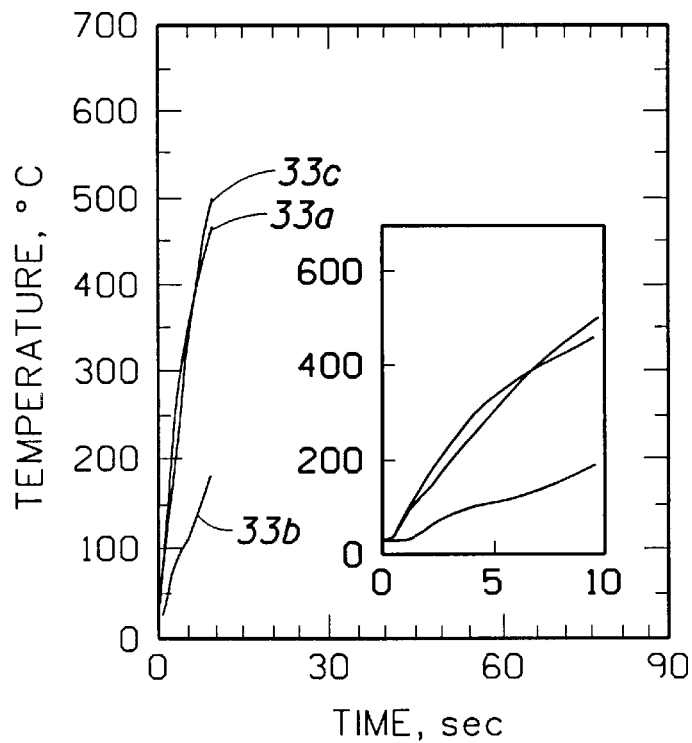

Now referring to FIG. 5, a simplified cross-sectional view of the catalytic converter monolith 13 of FIG. 4 is presented. The temperature of the monolith 13 is measured with a thermocouple at points 33(a)–(c) along the monolith radius, with point 33(c) being in the center of the monolith and the other points 31(b) and (a) located at greater distances from the center. The results of these temperature measurements at 40 liters per minute (lpm) total gas flow rate containing 3%, 5%, 8.5% and 17% hydrogen is shown in FIGS. 7(a)–(d). FIGS. 7(a)–(d) are graphs of the catalyst temperature measured at radial positions within the monolith as indicated in FIG. 5.

The face of the monolith should be noted as the beginning of the active catalyst sites, not the physical front of the brick. Using this definition, the face will move as the catalyst ages.

It has been found that the introduction of a relatively small percentage of hydrogen in an air stream within a typical automobile exhaust system provides nearly spontaneous heating of a major portion of a face 35 (see FIG. 4) of the catalyst material almost immediately following ignition in the internal combustion engine providing the exhaust gas. This heating along the face 35 of the converter is fortuitous because it has been found that the most effective site for providing local heating is along and near the upstream face 35 of the catalyst monolith 13. In fact, where the monolith 13 is made of a material that heats slowly when used in association with the present invention, the face 35 may comprise a more reactive catalytic material to bring the entire catalytic converter to light-off more quickly. In addition, the heat supplied by the spontaneous combination of hydrogen with oxygen or air in the presence of the catalyst monolith 13 produces only a small quantity of water as a product of the reaction, which does not degrade the performance of the catalytic converter.

The air flow rate through the monolith 13, depending on engine size and tuning parameters, typically falls in the range between about 40 and about 400 liters per minute (lpm). The ideal range is between 80 and 300 lpm, depending on engine size. Effective concentrations of hydrogen for these flow rates are between about 1 and about 28 volume percent, with a preferred range between about 5 and about 18 volume percent. The most preferred range of hydrogen concentration, again depending on engine size, is between about 8 and about 15 volume percent. For example, at an air flow rate of about 150 lpm across the catalytic converter, the ideal range of hydrogen concentration in that flow is between about 12 and about 13 volume percent. Under those conditions, light-off temperature at the face 35 is reached in about one second. At an air flow rate of about 90 lpm and a hydrogen concentration between about 8.5 and about 11 volume percent, light-off is achieved in about two seconds.

The energy consumption to heat the catalyst varies depending on the air flow rate and the concentration of hydrogen. For example, at an air flow rate between about 30 and about 50 lpm and a hydrogen concentration between about 10 and about 11½ volume percent, the chemical energy required to heat the monolith to light-off is approximately 1.5 Watt-hours. An electrically heated catalyst (EHC) unit requires between about 10 to about 15 Watt-hours to heat the same monolith at the air flow rate of 30 to 50 lpm.

The present invention is also suitable for use in low ambient temperature conditions, for example where the outside temperature is as low as −7° C. or lower. Depending on the active catalyst compositions used, these extremely low temperatures may cause the amount of time required to achieve light-off to double. In those conditions, it may be desirable to add a small electrical heater, which would be much smaller than an EHC heater and require only about 200 Watts of power, in order to achieve the results similar to those achieved at typical ambient temperatures.

Figure 8:
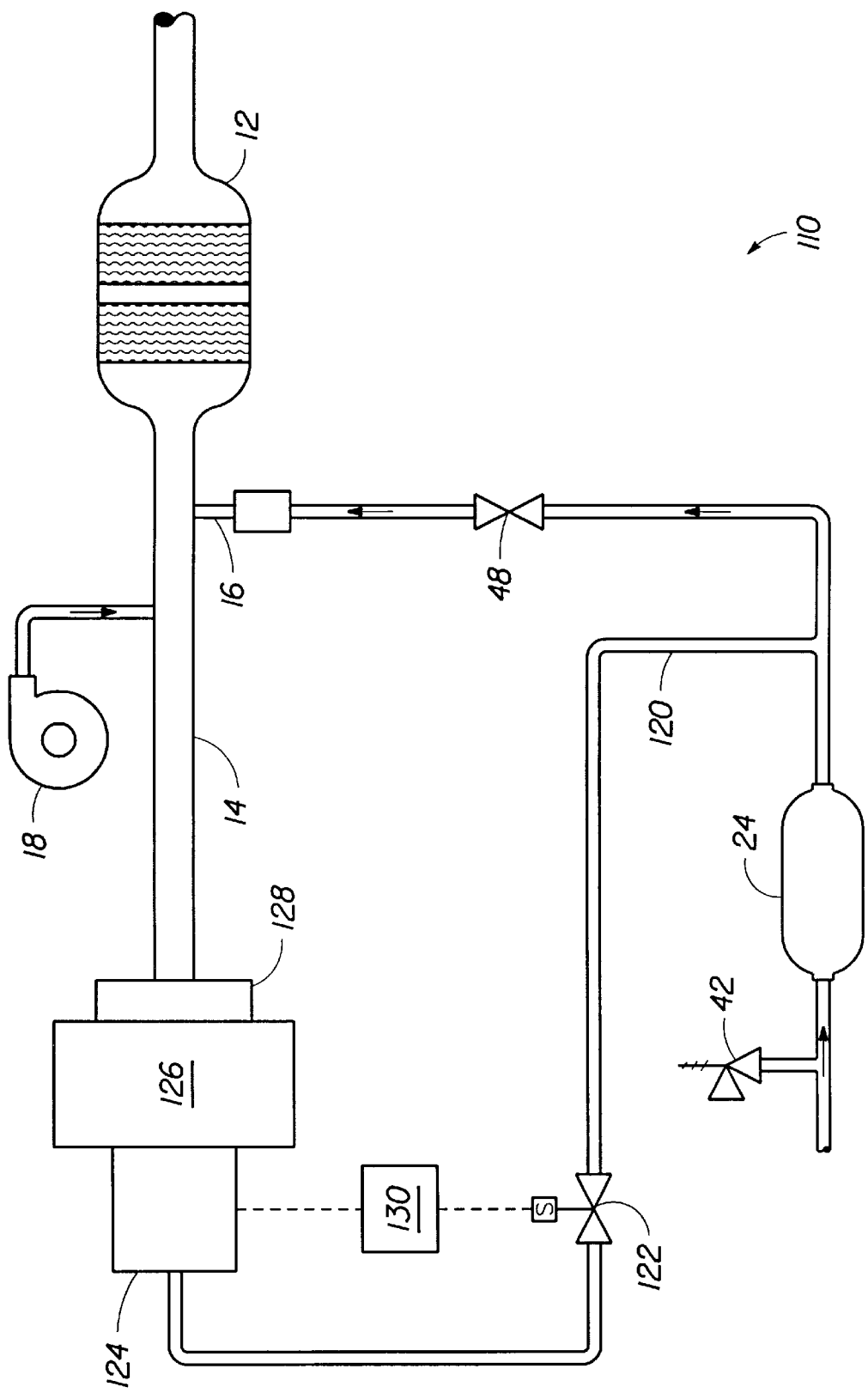
FIG. 8 is a schematic diagram of a system for the combustion of hydrogen in an internal combustion engine.

Now referring to FIG. 8, one aspect of the invention provides an on-board hydrogen ignition assist system 110. A source of hydrogen, such as the electrolyzer described above or any suitable means, fills the hydrogen storage cylinder 24. An ignition supply line to a control valve 122 controls the supply of hydrogen into an engine ignition 124. The engine ignition 124 includes the fuel, air, and electrical components for an internal combustion engine 126. Thus, the hydrogen can be supplied at any convenient location so that it is injected into the cylinders of the engine 126. For example, hydrogen under pressure can be supplied to the intake manifold where there is already a fuel/air mixture (during the inlet cycle), or the hydrogen can be mixed with air before it goes to the engine's fuel injection system, or other means.

The system 110 of FIG. 8 turns the internal combustion engine 126 into a hydrogen fuel injected engine for the first few seconds of start-up, before any gasoline is introduced into the engine. This way, the catalytic converter can be brought to light-off temperature before the engine begins producing undesirable emissions. Then, when gasoline is finally injected into the system, the catalytic converter has already been heated to a more efficient operating temperature, preferably the light off temperature.

Expended fuel gases are collected in an output manifold 128 and flow into the exhaust line 14. An ignition controller 130 provides control signals to the control valve 122 for the introduction of hydrogen to the engine ignition 124 to coordinate hydrogen introduction during cold start operations. The on-board hydrogen ignition assist system 110 functions with or without the hydrogen delivery system 25 for introducing hydrogen directly into the catalyst monolith, but the system 110 is preferably used in combination with hydrogen delivery to the catalyst. When using both systems 25, 110, the hydrogen generation and on-board storage can be used for both.

Figure 9:
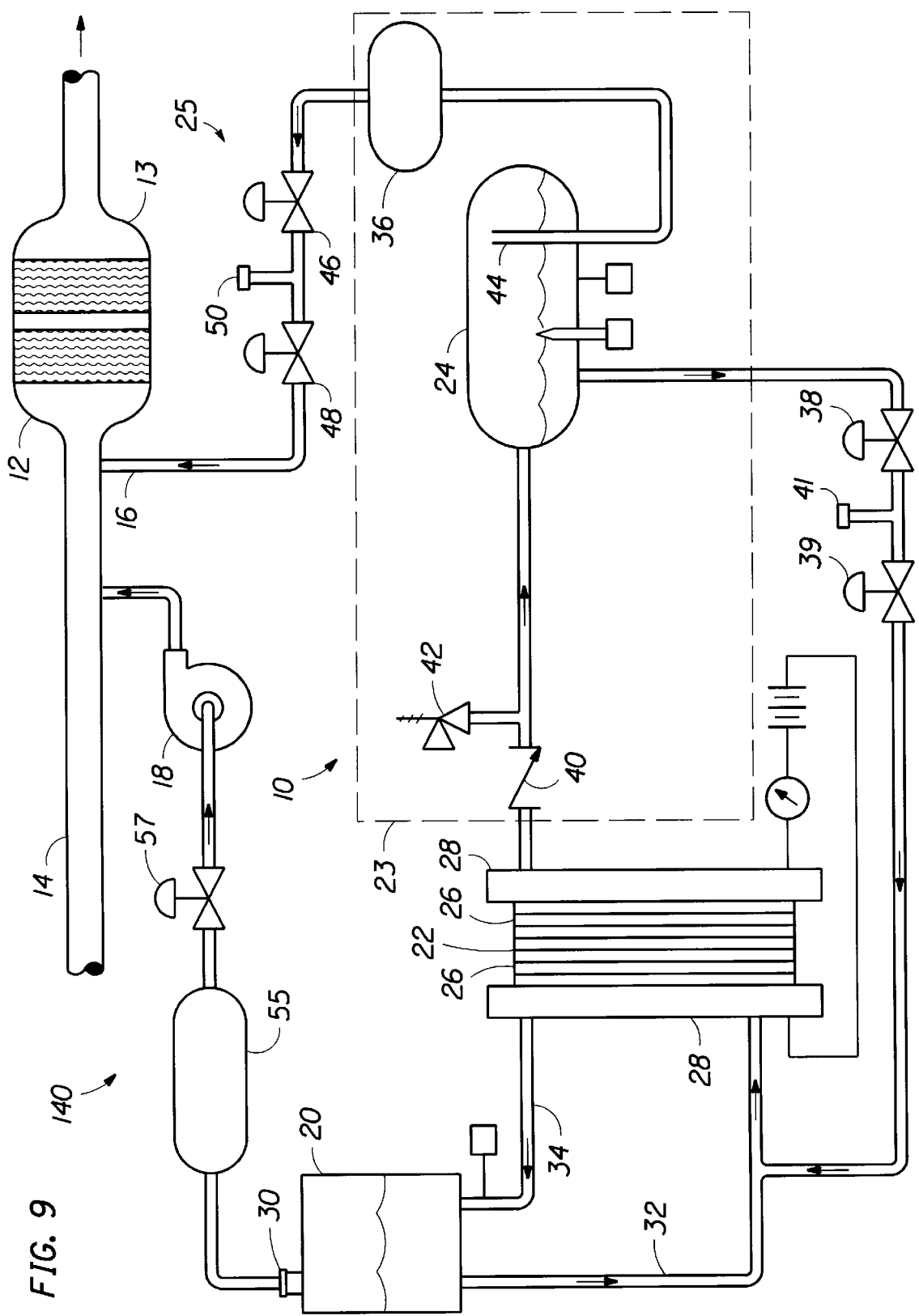
FIG. 9 is a schematic diagram of a system having oxygen recovery and storage equipment and means for injecting oxygen into the catalytic converter.

Another aspect of the invention provides oxygen recovery from the electrolyzer. FIG. 9 is a schematic diagram of a system 140 providing equipment for oxygen recovery, storage and injection into the catalytic converter. The oxygen separated from water in the water reservoir 20, passes through the port 30 and is collected in a storage vessel or cylinder 55. During ignition, and perhaps during all operation of the vehicle, the oxygen may be released from the vessel 55 by opening a valve 57 and input into the intake of the air pump 18. In this manner, the oxygen enriches the air and provides more efficient combustion of the hydrogen or exhaust gases within the catalytic monolith 13. It should be recognized that the pump 18 of FIGS. 1 and 9 may be replaced with a venturi for drawing air into the catalytic converter.

Figure 10A:
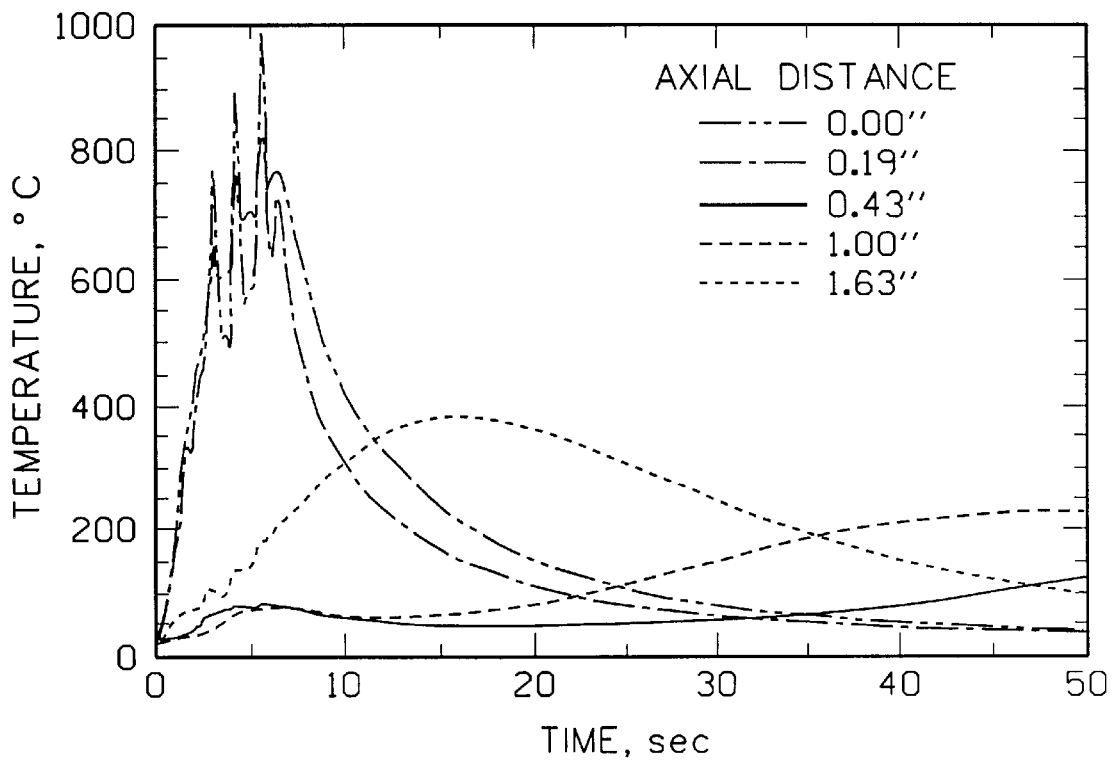
FIGS. 10(a–b) are graphs of the catalyst temperature at various axial and radial distances in the catalyst monolith over a period of 50 seconds using a pulsed release of hydrogen into an air stream.

Now referring to FIGS. 10(a) and (b), graphs are provided showing the catalyst temperature at various axial distances and radial distances in the catalyst monolith over a period of 50 seconds using a pulsed release of hydrogen into an air stream. The graphs show the temperature rise in the catalytic converter monolith at an air flow rate of 90 lpm and pulsed hydrogen flow controlled by a microprocessor. The pulsed hydrogen flow was provided by opening the hydrogen release valves 46 and 48 (see FIG. 1) for 0.01 seconds and closing the valves for 0.66 seconds, successively 10 times.

Figure 10B:
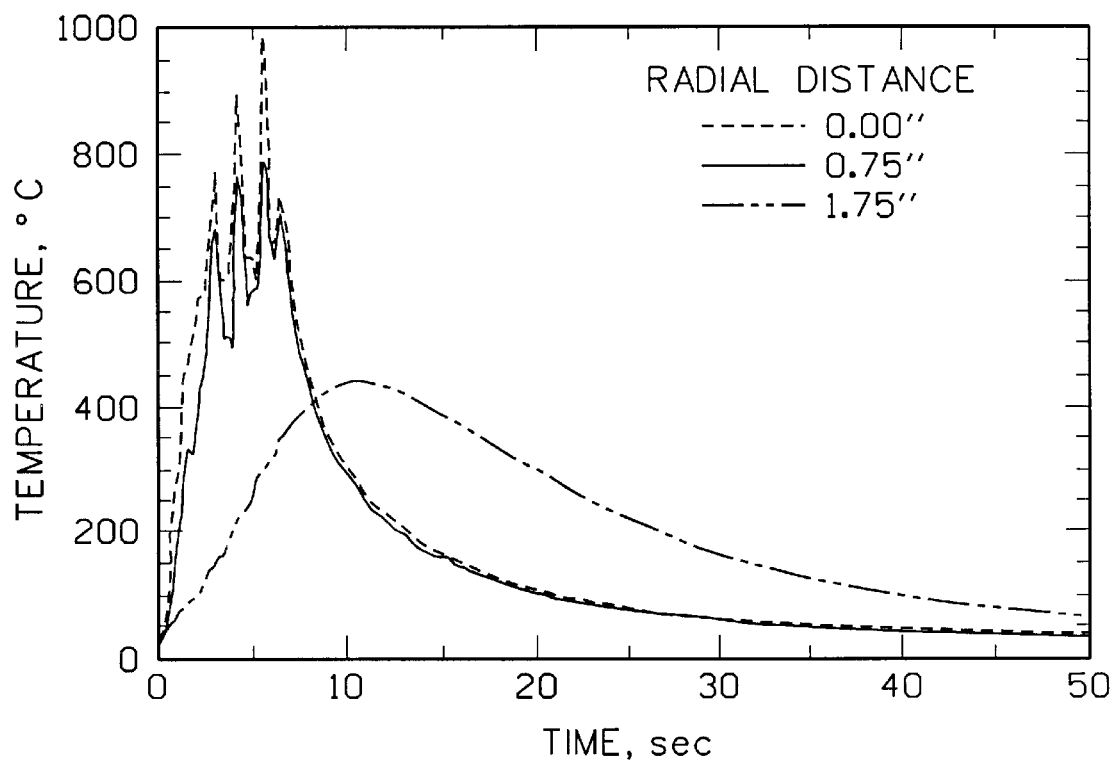

Comparing the temperature profiles of FIG. 10(a) with those of FIGS. 6(a)–(d) and the temperature profile of FIG. 10(b) with those of FIGS. 7(a)–(d) it is shown that light-off temperatures of between about 400° C. and about 600° C. can be readily attained even with pulsed hydrogen flow. One advantage of pulsed flow is the better utilization of the hydrogen and therefore conservation of the hydrogen supply.

Figure 11:
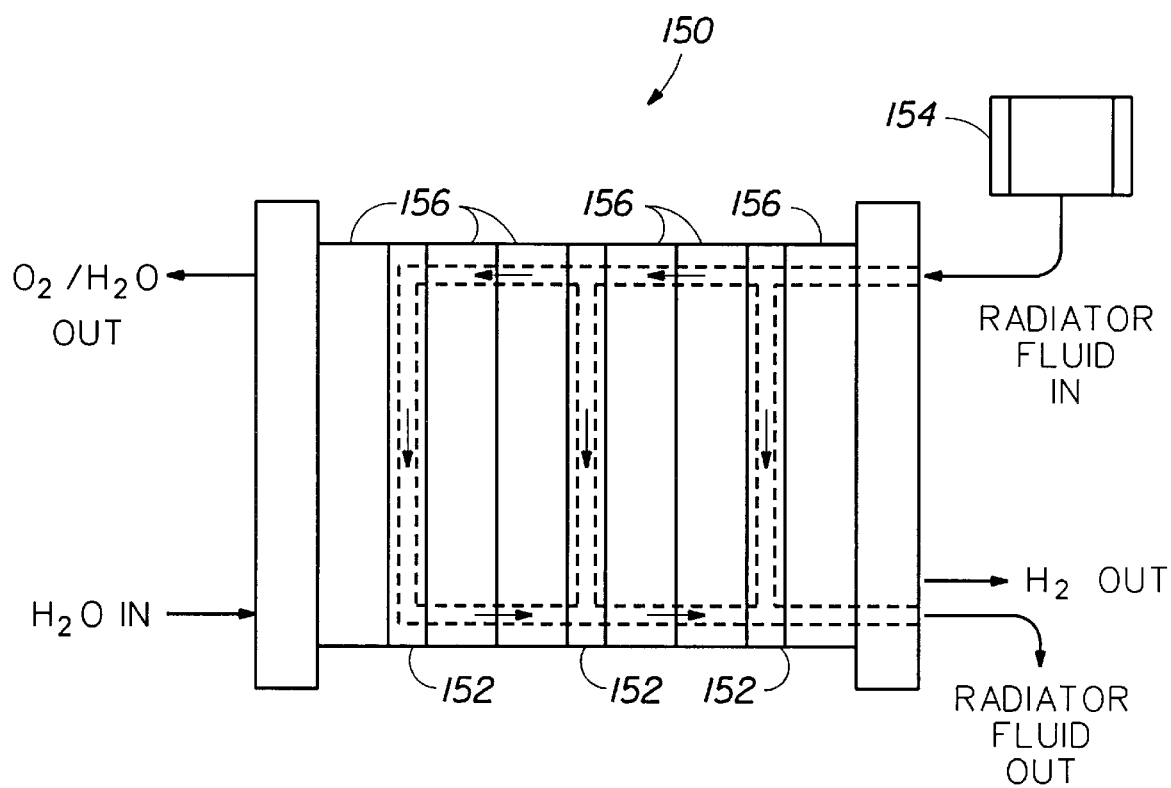
FIG. 11 is a schematic diagram of an electrolyzer having dummy cells for heating or cooling the electrolyzer using liquid from a vehicle radiator.

FIG. 11 is a schematic diagram of an electrolyzer 150 having non-gas producing cells 152 used for heating or cooling the electrolyzer using liquid from a vehicle radiator 154. These cells 152 may be comprised of plates providing a passage for the radiator fluid between electrolytic cells 156 in order to absorb or deliver heat to the electrolyzer. Because electrolyzers operate most efficiently at elevated temperatures, the radiator may be used to warm the electrolyzer in cold weather conditions. Alternately, the radiator fluid may be used to cool the electrolyzer after an extended period of use.

Figure 12A:
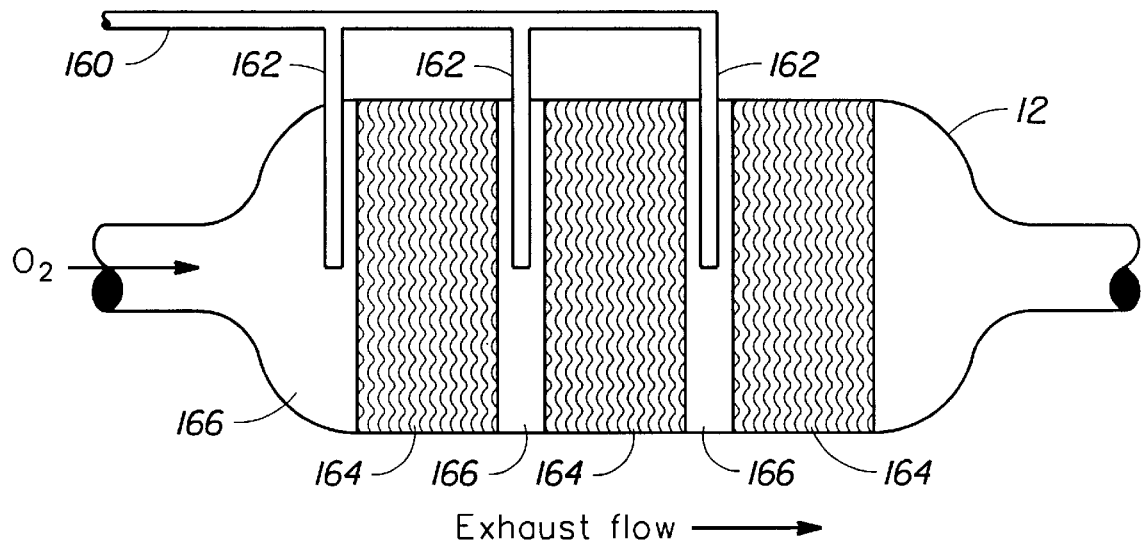
FIGS. 12(a–b) are catalyst monoliths having hydrogen injection distributors.
Figure 12B:
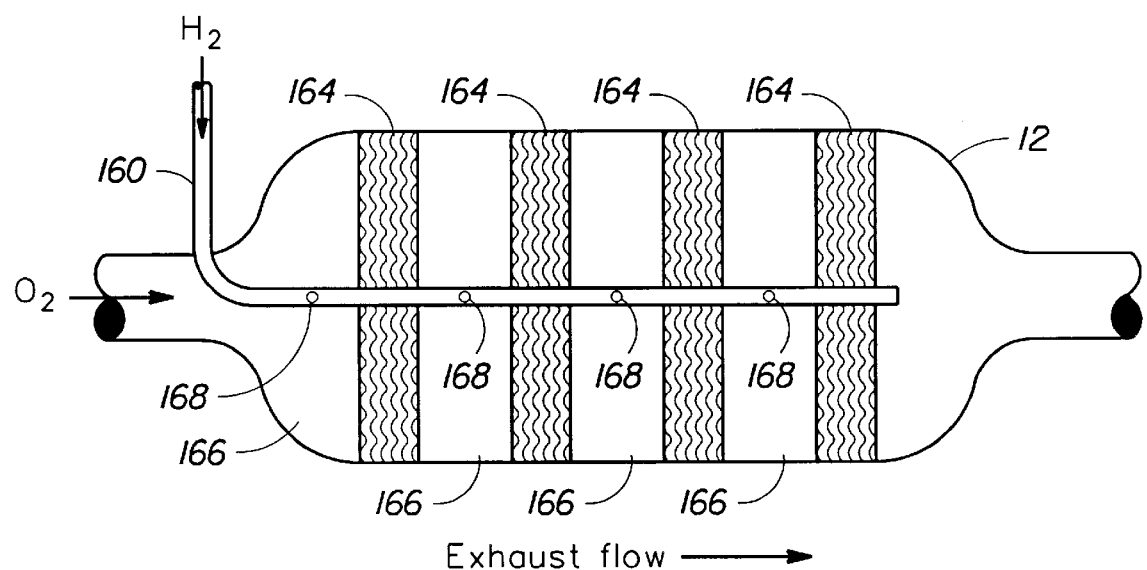

FIGS. 12(a) and (b) are two catalytic converters 12 having different hydrogen injection means 160. In each of the figures, the converters 12 have multiple monoliths 164 separated by a region 166 for hydrogen introduction and diffusion. In FIG. 12(a), the injection means 160 is primarily external to the converter 12 with a plurality of injection tubes 162 delivering hydrogen into the gaps 166. Conversely, in FIG. 12(b) the injection means 160 passes through the monoliths 164 with a plurality of holes or ports 168 for hydrogen delivery into the gaps 166. In a very similar manner, air or air/oxygen may be introduced in multiple locations to improve mixing, distribution, or hydrogen and oxygen combination characteristics such as uniformity across the face of the catalyst.

Figure 13:
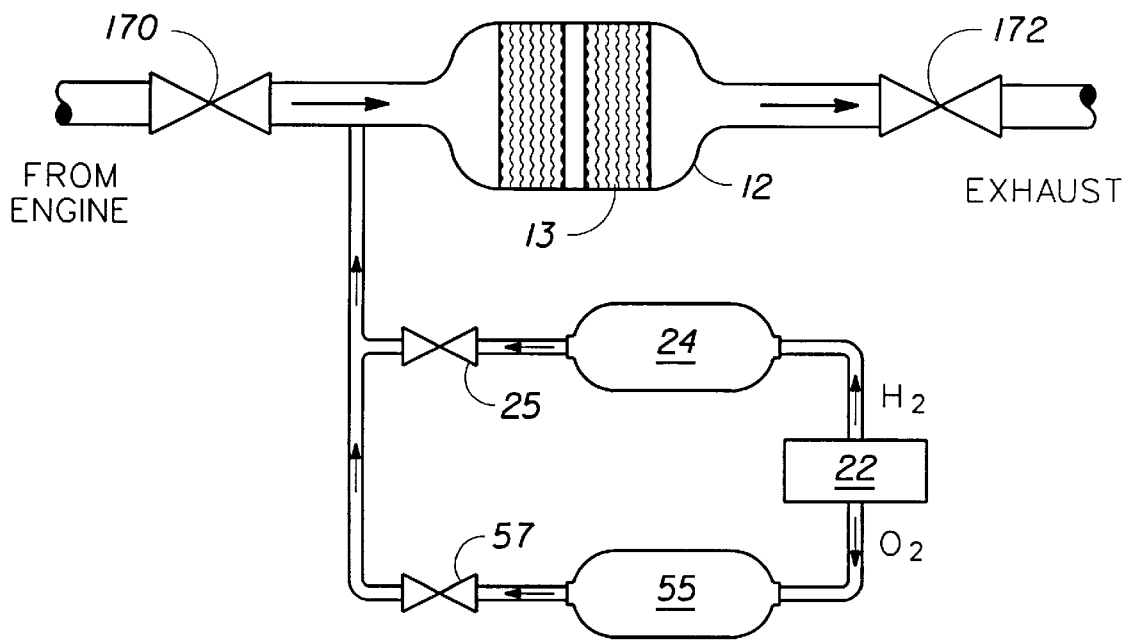
FIG. 13 is a schematic diagram of a catalytic converter having isolation valves allowing hydrogen or oxygen to diffuse evenly throughout the monolith before delivery of another gas to provide a combustible mixture.
Figure 14A:
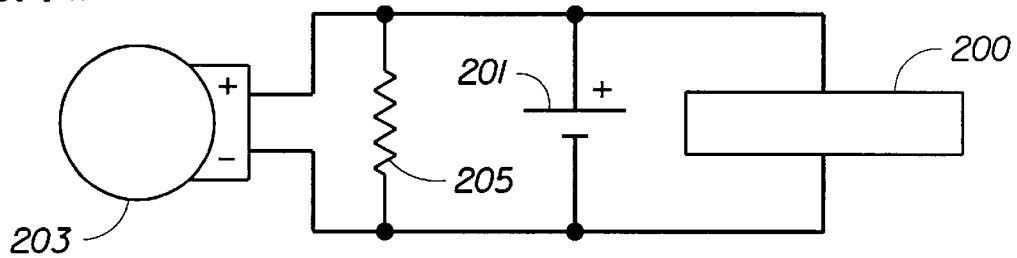
FIGS. 14 (a–e) are schematic diagrams of alternative electrical systems for providing electrical power to the electrolyzer.
Figure 14B:
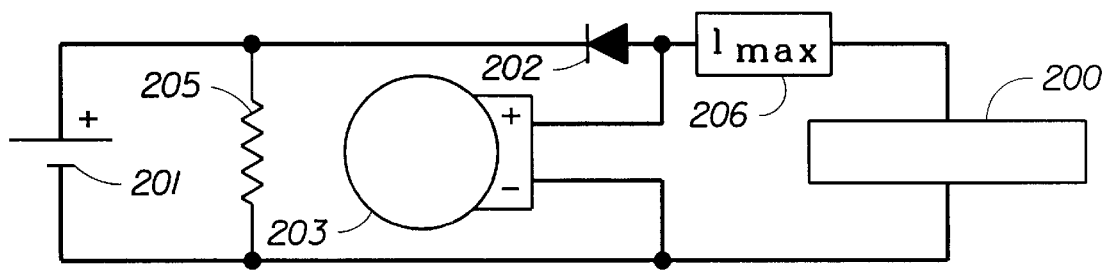
Figure 14C:
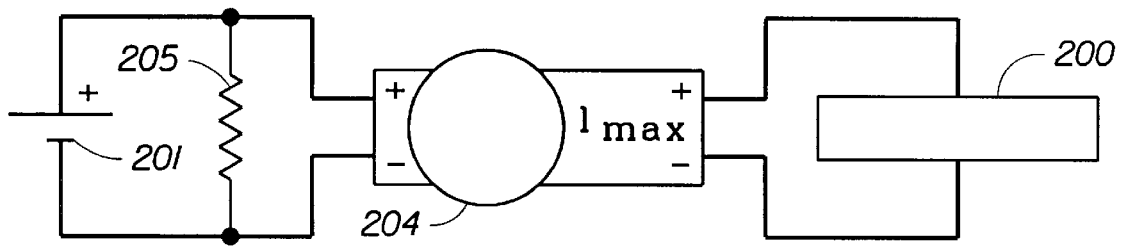
Figure 14D:
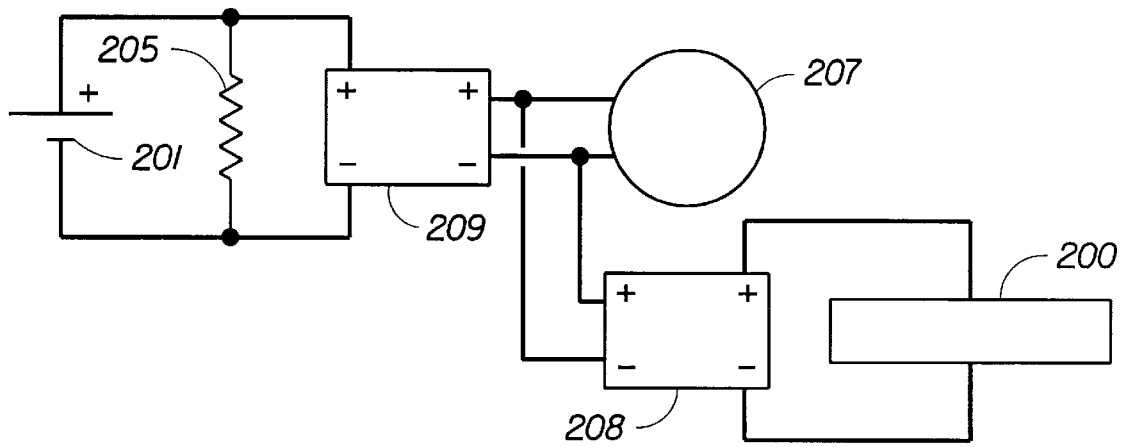
Figure 14E:
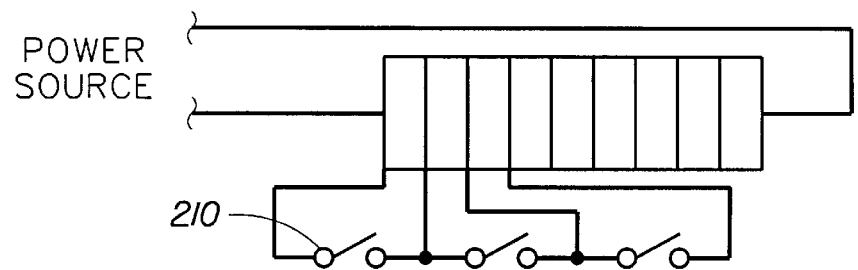

FIG. 13 is a schematic diagram of a catalytic converter 12 having an upstream isolation valve 170 and a downstream isolation valve 172. When the valves 170, 172 are closed, hydrogen can be injected into the monolith 13 and allowed to diffuse evenly throughout the monolith. After only a fraction of a second for diffusion, the valve 172 is opened and oxygen is delivered to provide a combination mixture. Alternatively, because oxygen is a larger molecule and diffuses more slowly, it may be similarly advantageous to first diffuse oxygen into the isolated monolith, then introduce hydrogen while opening valve 172.

Now referring to FIG. 14(a)–(e) which are schematic diagrams outlining four possible topologies for the powering of the electrolyzer system 200. In FIG. 14(*a*) the primary source of electrolyzer power is drawn directly from the vehicle battery 201 as well as from the alternator 203. FIG. 14(*b*) eliminates the electrical draw on the battery 201 by placing diode 202 between the alternator 203 and the battery 201. Diode 202 allows current flow from the alternator to the battery and other vehicle loads 205 but stops current flow from the battery to the electrolyzer 200. the current limiting circuit 206 protects the electrical system from over currents that could be drawn by the electrolyzer as the electrolyzer resistance changes. FIG. 14(*c*) is shown having an alternator 204 having an additional winding in which the magnetic circuit provides current limiting to the electrolyzer 200. This second winding would also allow higher voltages to be delivered to the electrolyzer 200, allowing the number of cells within the stack to be increased. FIG. 14(*d*) shows a system in which the vehicle alternating current is drawn from the alternator 207 before the vehicle regulator 209 and a separate current control/regulator 208 provides electrical power to the electrolyzer 200. This topology is able to current limit the electrolyzer load and provide higher voltages to the electrolyzer while using a conventional alternator.

FIG. 14(*e*) shows a method of controlling the electrolyzer current while maintaining overall electrical conversion efficiency. In this mode of operation, the full potential of the vehicle's electrical system is placed across the electrolyzer 200. Individual cells are then bypassed by external mechanical or solid state switches 210, to lower the effective resistance of the electrolyzer, in steps, until a current close to the desired current is achieved. Cells may be switched in and out as desired to maintain the current within a window.

The apparatus of the present invention, described above, may be operated in any number of ways as will be recognized by those in the art. One preferred mode of operating a system of the present invention, including an electrolyzer, is described in FIG. 15. FIG. 15 is a flowsheet showing the modes of operation for an ideal chemically heated catalyst (CHC) system.

Control System and On-Board Diagnostics

Figure 16:
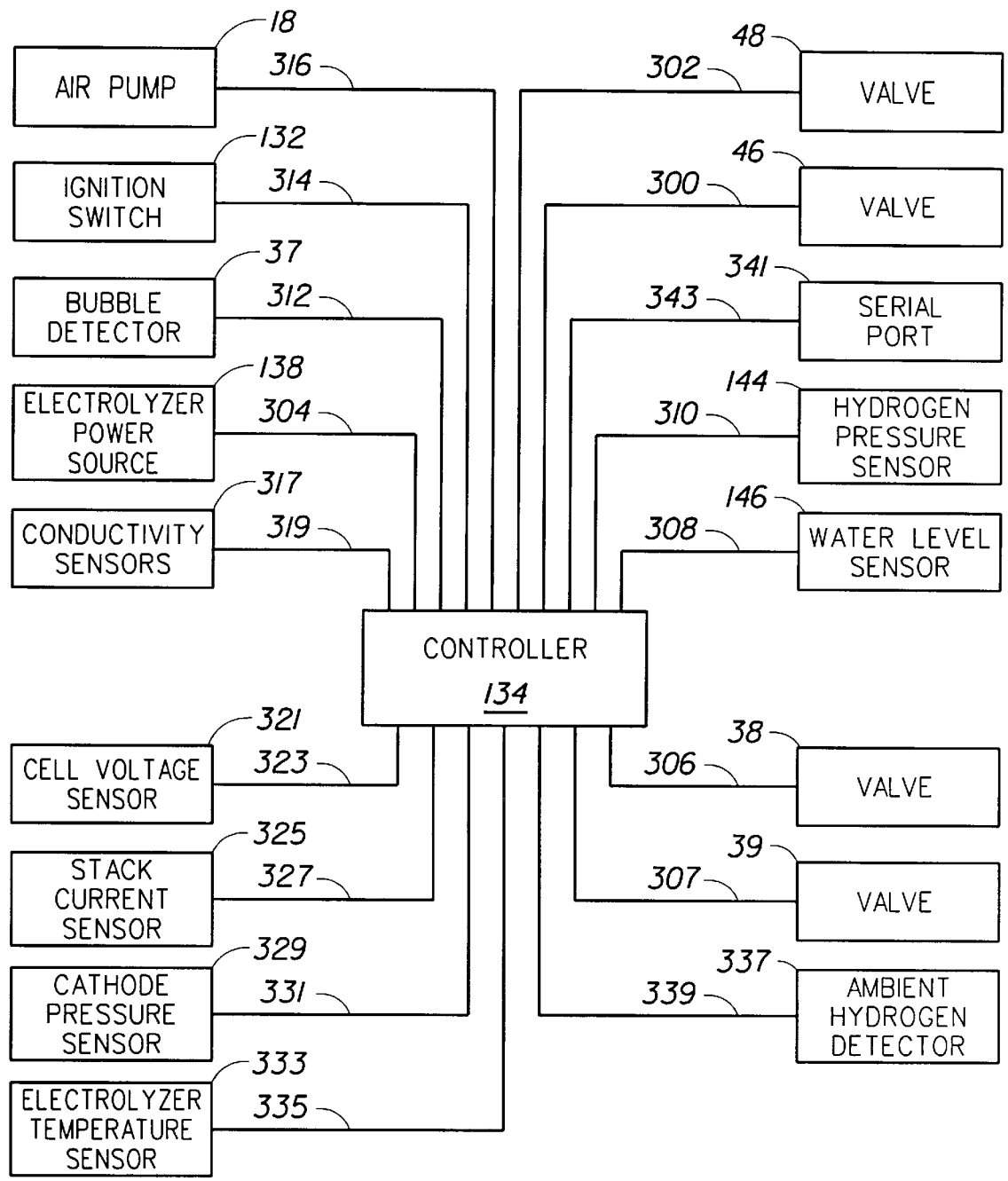
FIG. 16 is a block diagram of a control system for a hydrogen production and delivery system of the present invention.

The Control System and the On-Board Diagnostics are illustrated in FIG. 16. The controller 134 may be the vehicle's existing built-in controller system, i.e., engine management unit, or it may be a separate microprocessor controller system, or even just a state machine. At a minimum the controller 134 would need to have a processing unit (state machine), I/O pins or ports, and a memory. The memory system may be an EEPROM or other suitable system. The controller 134 may also have various registers for storing data.

A preferred controller 134 has multiple outputs for sending control signals to operate various parts of the hydrogen delivery system 10 (shown in FIG. 1), such as the hydrogen release subsystem 25, the hydrogen storage subsystem 23, and the hydrogen generation subsystem 20, 22, 138. The controller 134 also has multiple inputs for receiving sensor information and other signals to control its own operation. These inputs may actually go into controller 134, or they may be distributed to the engine management unit, any other controllers or any combination of controllers in the vehicle as appropriate. The control outputs from controller 134 include lines 300, 302 to dual valve subsystem 46, 48 for controlling the turning on and turning off of the valves 46, 48, thus controlling the delivery of hydrogen to the exhaust manifold 14, catalytic converter 12 or engine as desired.

Controller 134 also has a control output line 304 to the electrolyzer power source 138 for controlling the supply of power to the electrolyzer 22.

The controller 134 has control output lines 306, 307 to the valves 38, 39 in order to control when to open and close valves 38, 39 in order to recycle the water in storage vessel 24. Controller 134 also has a sensor input line 308 from water level sensor 146. The input from water level sensor 146 tells controller 134 to cycle valves 38, 39 when the water level is too high and the water needs to be removed from the cathode and recycled to the anode. Alternative means of water recovery would include a float valve, electroosmosis, wicking, or operation of the stack with the anode dry and water provided by the cathode.

Controller 134 has a sensor input line 310 from hydrogen pressure sensor 144. A high or low signal from sensor 144 will tell controller 134 when to turn off or on the electrolyzer 22 through control output line 304 to electrolyzer power source 138. The controller 134 also has a sensor input line 312 from bubble detector 37, an input signal line 314 from ignition switch 132, and an output control line 316 to air pump 18 to control the turning on and off of air pump 18.

The electrolyzer 22 may be provided with multiple performance verifications and abnormal performance indicators for on-board diagnostics. Some of these sensors are not shown in FIG. 1 for ease of viewing the drawing and because a skilled person will readily understand where these sensors need to be placed. However, FIG. 16 shows these elements in an abstract block diagram. Controller 134 may be used to collect, store and interpret the data from these sensors and performance indicators and take appropriate corrective action including shutting the system 10 down and/or warning the driver. When these operating parameters fall within acceptable ranges they indicate that the production and storage of hydrogen is proceeding normally. The importance of some of these parameters, and the devices and methods used to determine some of the parameters, and the acceptable ranges for some of them will now be discussed.

Conductivity sensors 317, perhaps two independent sensors placed at different heights within the anode reservoir, are used to measure the conductivity of the anode water and send a signal indicative thereof on sensor input line 319 to controller 134. These sensors will also establish the water level since a dry conductivity sensor shows abnormally high resistance.

A cell voltage sensor 321 may be placed in electrolyzer 22 to measure the voltage drop across each cell or stack of cells 26 and send a signal indicative thereof on sensor input line 323 to controller 134. A stack voltage measurement may provide the controller 134 with the voltage drop occurring across all of the cells within the electrolyzer stack 26. Under normal operation, this voltage will fall within a narrow range that is characteristic of the electrolyzer 22, the temperature of the stack, the stack current, and the anode feed fluid (e.g., alcohol concentration).

Stack current sensor 325, like cell voltage sensor 321, may be placed in electronic communication with electrolyzer 22 to measure the current through the stack of cells 26 and send a signal indicative thereof on sensor input line 327 to controller 134. The stack current may be measured for both performance verification as well as feedback for limiting the maximum current demand of the electrolyzer 22.

Anode gas generation may be indicated by a bubble detector 37 in the anode return line 34 to the water storage reservoir 20. This bubble detector should indicate gas generation within a window related to the current. Additionally, this detector will detect any gas leakage from the cathode to the anode when the electrolyzer is off.

A cathode pressure sensor 329 may be placed in fluid communication with the cathode of electrolyzer 22 to measure the pressure of the gas at the cathode and send a signal indicative thereof on sensor input line 331 to controller 134. The change in cathode pressure may provide a direct reading of the hydrogen production rate.

A cathode water recovery system 38, 39, 146 may quantify the amount of water passing through the membrane in electrolyzer 22 from the anode to the cathode due to electroosmosis. The operation of the two valves 38, 39 will recover a known volume of water that controller 134 could keep track of to determine whether the volume of water that has passed through electrolyzer 22 is within acceptable limits.

An electrolyzer temperature sensor 333 may be placed within electrolyzer 22 to measure the temperature of electrolyzer 22 and send a signal indicative thereof on sensor input line 335 to controller 134. An electrolyzer, or stack, temperature measurement may be an abnormal operation indicator that will typically fall within a range around the ambient temperature during normal operation. Abnormal operation of the electrolyzer will result in extreme temperature readings, such as temperatures greater than about 100° C.

An ambient hydrogen detector 337 may be placed near the delivery system 10 to detect the presence of abnormally high levels of hydrogen in the ambient atmosphere and send a signal indicative thereof on sensor input line 339 to controller 134.

Improper readings in any of these measurements may indicate more than one possible failure mode having differing effects on safety and performance as will now be described.

A loss of water in the anode will stop hydrogen production, but should not cause any permanent damage to the electrolyzer 22. Such a loss of anode water would normally be indicated by the cell or stack voltage measurement being elevated or current reduced. The loss of anode water could also be indicated by an increase in the stack temperature measurement, or by an indication from the bubble detector 37 of a lack of anode gas bubble generation.

A contamination of the anode water may decrease the efficiency of the electrolyzer and result in higher cell voltages and reduced hydrogen production. Conductivity sensors 317 may indicate contaminated water by a change in or improper level of conductivity.

A small leak in the proton exchange membrane may risk a combination of hydrogen and oxygen in the anode reservoir as well as an increase in the amount of time necessary to produce a given quantity of hydrogen. The ambient hydrogen detector may directly detect the leak of hydrogen if that leak is to outside the electrolyzer or sense the hydrogen coming from the anode reservoir if the hydrogen leak is internal to the electrolyzer. An increase in bubble production in the anode is also indicative of a hydrogen leak as hydrogen escapes through the anode.

A rupture of the membrane may cause a venting of hydrogen gas and should require a shut-down of the hydrogen delivery system 10 to prevent further hydrogen release, which could lead to undesirable concentrations of hydrogen and oxygen. The rupture and leak may be determined by the ambient hydrogen detector 337, a hydrogen pressure drop or low rate of pressure increase in the storage vessel 24, and possibly a reduced cell voltage.

An electrolyzer mechanical leak may leak hydrogen to the ambient atmosphere and increase the time required to generate hydrogen. This leak may be determined by the ambient hydrogen detector 337 or a low rate of pressure rise in the storage vessel 24. Any leak situation will result in the venting of hydrogen into the air where it will readily disperse. The hydrogen storage tank is at elevated pressure, thereby preventing oxygen from leaking into the tank.

A restriction in the flow of water through the anode may limit the production of hydrogen due to overheating. This flow restriction may be indicated by a decrease in gas bubble generation detected at the bubble detector 37 or by a rise in temperature measurement in the electrolyzer 22.

Freezing of the electrolyzer 22 may slow the rate of hydrogen production until the electrolyzer 22 can be thawed. A sufficiently low electrolyzer temperature measurement may indicate freezing, but so may an elevated cell voltage measurement.

A reversal of polarity between the anode and cathode may potentially result in the release of hydrogen, from the system 10. Shut-down of the hydrogen delivery system 10 may be required to prevent the release. The ambient hydrogen detector 337 may indicate this failure, as will the cell voltage measurements, the current measurement and the bubble detector since twice as much hydrogen gas will be produced.

The quantity of stored hydrogen may be measured with any suitable pressure sensor based on the fixed volume of the vessel 24. One good sensor is a silicon strain type pressure sensor. The hydrogen pressure sensor 144 provides the primary data for triggering the shutdown of the electrolyzer 22 when the hydrogen storage vessel 24 is full. The controller 134 is preprogrammed with the desired maximum pressure which it compares with the signal received from sensor input line 310. The sensor 144 also provides the data for triggering the closing of the valves 46, 48 when releasing hydrogen on a volume basis during cold start, because the controller 134 may calculate the volume released from the change in pressure. The volume release methods will be described later.

For data from the hydrogen pressure sensor 144 to be accepted as reliable, the hydrogen delivery system 10 must provide predictable responses to several conditions. For example when no hydrogen is being released from the vessel 24, hydrogen generation should result in a steadily increasing pressure reading in the hydrogen pressure sensor 144 at a rate proportional to the measured stack current. Controller 134 may collect this data and make this comparison.

Additionally, cathode water recovery is performed by transferring fixed quantities of water from the hydrogen storage vessel 24 to the anode water reservoir. Therefore, during each transfer cycle, as the water is removed, the available volume for the hydrogen gas increases, resulting in step drops in pressure, which can be counted by controller 134 to determine the volume of water removed.

Hydrogen released from the hydrogen reservoir or storage vessel 24 during delivery of hydrogen to the vehicle's exhaust system provides the simplest test of whether the delivery system 10 is functioning properly. In other words, hydrogen pressure must drop when the valves 46, 48 are opened, or cycled.

Ambient temperature swings during times when the delivery system 10 is idle provide an opportunity to measure the linearity of the hydrogen pressure sensor 144 since the hydrogen gas follows the ideal gas law. Controller 134 may keep track of corresponding temperatures and pressures and calculate the expected changes.

A drift in absolute accuracy of the hydrogen pressure sensor 144 could possibly result in an over pressure or under pressure of the hydrogen. It is the over pressure that could have catastrophic effects. The drift in accuracy could also result in a proportional drift in the charge and discharge of the reservoir.

A drift in the linearity in the readings of the pressure sensor 144 has the possible effect of an over release of hydrogen as well as an over pressure. It could also result in an under release of hydrogen, but that is just a performance problem, rather than a safety problem. Additionally, there could be a corresponding drift in the charge and discharge of the reservoir 24. This linearity drift may be detected by measuring an unexpected time period required to charge or discharge the storage vessel 24. There would also be an incorrect temperature response of the pressure sensor 144 along the lines of the above described ambient temperature swings.

A total electronic failure of the hydrogen pressure sensor 144 could have the possibility of a hydrogen over pressure, since it is the pressure sensor that provides the primary data for shutting down the electrolyzer 22. Such a failure could result in the complete loss of operation of the hydrogen delivery system 10 even though the signal from the sensor is within normal range. When the sensor 144 indicates no change in the hydrogen pressure under conditions that should produce a change in hydrogen pressure (such as a release or generation of hydrogen) then total electronic failure of the sensor 144 may have occurred.

A mechanical failure of the hydrogen pressure sensor 144 could lead to a hydrogen leak to the ambient atmosphere along with a complete loss of operation of the system 10. The pressure signal may remain within a normal range when it should be abnormal, and this would be detected as a fairly stable hydrogen pressure reading during hydrogen generation or delivery when there should be a significant change.

During CHC operation, or hydrogen delivery, hydrogen may be released into the vehicle's exhaust system and the catalytic converter via two valves 46, 48, e.g., solenoid valves, operated by the CHC control system, or controller 134. In this embodiment, the valves are in series, so both must be opened, either together or alternatingly, before hydrogen is released. Performance verification is concerned with the complete opening, closing, and response time of both valves 46, 48. Hydrogen pressure stability in storage vessel 24, as shown by the hydrogen pressure sensor 144, during idle times may provide the leak rate of both valves 46, 48 in series or of each valve individually if the other valve is left open. An expected hydrogen pressure drop in storage vessel 24 during continuous opening may indicate that each valve 46, 48 is opening as designed. The hydrogen pressure drop may also quantify the response time of each valve 46, 48. The controller 134 may be set for the valves 46, 48 to typically respond to a 25 ms open pulse during which they release a fairly predictable amount of hydrogen gas. Therefore, a significant unexpected drop in hydrogen pressure during gas release would be indicative of a delay in valve response time in either opening or closing.

If either valve 46, 48 is stuck closed, then there is a total failure of the hydrogen delivery system 10, but this failure alone does not present a safety problem, because with no drop in hydrogen pressure, there is no trigger for turning on the electrolyzer, and the system 10 stays in a static state.

If one valve 46, 48 is stuck open, then there is a potential for over release of hydrogen, but the hydrogen delivery system 10 may remain functional in some delivery modes. An unexpected hydrogen pressure drop in vessel 24 may be indicative of this failure.

If both valves 46, 48 are stuck open, then all of the hydrogen will be released into the vehicle's exhaust system. The system 10 will work one final time, albeit inefficiently, and then fail completely. Total pressure loss in storage vessel 24 is a good indicator of this type of failure as is the temperature of the converter and response from the oxygen sensor(s) in the exhaust system.

If a valve 46, 48 is merely slow to respond, then there is the potential for over release of hydrogen. There is also a reduced accuracy during pulsed release, described below. Unexpected pressure drop in storage vessel 24 during pulsed release is the most obvious indicator of this type of failure as is overheating of the catalytic converter.

The existing oxygen and lambda sensors may also provide feedback to the control system. The exhaust face of the sensor contains a highly catalytic surface, such as porous platinum, which will react with the hydrogen and oxygen during the preheating period. The response from the sensor will be a combination of effects including direct heating of the sensor bringing it to operating temperature, reducing the oxygen partial pressure in the exhaust stream due to combination with the hydrogen, and third, reduction of the sensor output voltage due to the presence of the hydrogen in the exhaust stream.

The use of the existing onboard oxygen sensor would allow closed loop control of the CHC system without requiring any additional sensors in this corrosive environment. The oxygen sensor, which is generally heated to operating temperature by the exhaust gas, produces a signal corresponding to the oxygen content within the exhaust gas. A cold oxygen sensor, however, produces a low signal that may easily be discriminated from a sensor at operating temperature.

The release of hydrogen and availability of oxygen from the secondary air pump will have two effects on the oxygen sensor depending upon its temperature. Both effects may be used to establish the operation of the CHC system and used within the feedback to control the hydrogen release.

If the oxygen sensor is at operating temperature, indicated by a signal above a threshold value, and hydrogen is released into the exhaust stream, the signal from the sensor will be depressed due to the presence of hydrogen. The extent of the signal depression during each release pulse will correspond to the quantity of hydrogen released from the CHC system and detected by the oxygen sensor. Self heating oxygen sensors, wherein a resistive heater is placed in the sensor to bring it to operating temperature sooner, could be utilized for closed loop control before the engine has started. The sensor may also be hot when the vehicle has been operated recently enough that the sensor is still hot, providing an opportunity to test the CHC system even when the preheating may not be necessary. Alternatively, this test may be performed after the engine has reached operating temperature and the release of hydrogen is only to verify the operation of the CHC system. In another mode of operation the sensor closest to the engine is monitored during the period of the CHC preheat where the engine is running and the sensor is just coming to operating temperature and providing a signal. During this time the sensor will respond in a sinusoidal or sem-square wave manner as each cylinder fires and the exhaust is swept past the sensor. The release of hydrogen could be timed to the firing of the engine so the difference in signal may be maximized. Additionally, timing the release of hydrogen to the release of exhaust gas may further improve the utilization of the hydrogen in the converter, e.g., releasing the hydrogen between exhaust strokes when the most oxygen is present or utilizing the "back and forth" motion of the exhaust gas in the system while the engine is running.

In a completely different mode of operation, a cold sensor may be rapidly brought to operating temperature due to the presence of hydrogen and oxygen in the exhaust stream. The face of the sensor generally exposed to the exhaust consists of a porous platinum catalyst that will serve as an oxygen-hydrogen combination catalyst. The design of the sensor and the placement of the sensor with respect to the hydrogen inlet(s) and oxygen inlet(s) may be further optimized to provide the best signal and to eliminate any damaging or aging affects due to this mode of heating. During the operation of the CHC system before the cranking of the engine the initially cold sensor will be monitored. As it heats (due to hydrogen-oxygen combination) its signal will correspond to the temperature of the sensor face, and therefore to the amount of hydrogen in the exhaust stream. When the sensor is fully heated its signal will become representative of the oxygen content in the exhaust. As the hydrogen release is varied or pulsed and the oxygen stream is fixed, the sensor will provide a real time signal as to the amount of hydrogen, in part being depressed due to the presence of hydrogen. A sensor located after the first brick (or further downstream) in the converter would respond not the presence of hydrogen (since it will have reacted on the brick) but the lowering of the oxygen concentrations resulting from combination with hydrogen. Following this response will allow the conversion efficiency, albeit only directly for hydrogen but possibly correlated to other gases, of the catalytic converter to be monitored. This downstream sensor will provide a real time response to a release of hydrogen since that release and combination with the secondary air will cause a significant dip in the oxygen content measured by the downstream sensor.

This response from the sensor can be characterized and used to establish the performance of the CHC system (OBD II) as well as used for closed loop feedback during hydrogen release.

Furthermore, on vehicles equipped with sensors before and after the converter, the relative response of these two sensors during preheating and possibly in a special "performance evaluation mode" (when both sensors are at operating temperature) where $H_2$ is released into the exhaust stream during steady state operation of the engine and the calculated difference in hydrogen and oxygen content in the exhaust is compared to the measured values.

The use of the oxygen and lambda sensors may require additional hydrogen injection points so only a partial flow of $H_2$ is seen by the $O_2$ sensor (to prevent the sensor from overheating for example).

In a similar manner, a catalyst coated temperature sensor could be used as a direct measurement of the CHC performance. This sensor would serve as a representative sample of the catalytic converter, providing a temperature response as its surface combines the $H_2$ and $O_2$. It would be more effective at evaluating the actual catalyst temperature on the converter than a temperature sensor simply placed in the air stream responding to hot air.

Another feedback device would be an optical sensor placed so it is exposed to the front surface of the main catalyst. This sensor would respond to the colors of the catalyst face as the system is preheated.

This optical sensor could be used for real time feedback during hydrogen release to minimize the preheating time by maximizing the hydrogen release. The controller would release $H_2$ and slow or stop the release if a portion of the catalyst were to approach the hydrogen light off temperature. $H_2$ release would be controlled to maintain catalyst face temperature as close to but below this light-off temperature. The sensor could be provided with an optical filter that only allows colors near the light off temperature to be detected by the sensor. This would simplify the electronics since all colors below the threshold temperature would be ignored automatically. The sensor could be integrating, i.e., respond to the entire face and produce one signal, or segmented, i.e., provide signals for each area of catalyst. A segmented sensor could be used with multiple injection points to actively modify the hydrogen/oxygen distribution within the converter.

During hydrogen generation in the electrolyzer 22, water is transferred from the anode side of the electrolyzer 22 over to the cathode side due to electroosmosis through the proton exchange membrane. This water eventually collects in the bottom of storage vessel 24 and is withdrawn and/or recovered using one or two valves 38, 39, e.g., solenoid valves. If two valves 38, 39 are used, then they may be plumbed in series and have a captive gas chamber between them. The valves 38, 39 may be opened one at a time with a fixed amount of water being pushed from the reservoir 24 and compressing the headspace in the stub during the first half of the cycle and transferred to the anode water reservoir during the second half of the cycle. This sequence may be continued until only a small amount of water remains in the reservoir 24. The water level is sensed using a sensor 146, e.g., an electro-optic liquid level sensor. Performance verification of this cathode water recovery system is concerned with the complete opening and closing of the valves 38, 39 and of the accurate detection of the water level.

The rate of hydrogen pressure increase during hydrogen generation is dependent upon the hydrogen storage vessel 24 size. Failure of the cathode water recovery system to remove water from the hydrogen storage vessel 24 will result in a smaller effective volume for storing hydrogen and a faster rate of rise of hydrogen gas pressure during electrolysis. A hydrogen pressure drop of known magnitude during water recovery indicates that the valves 38, 39 are cycling correctly. Additionally, the quantity of water recovered must fall within a range that is directly proportional to the quantity of hydrogen generated.

If a valve 38 or 39, or in some cases both valves 38, 39, fail to open, there is no effect on safety, but the hydrogen storage capacity is reduced. This failure may be detected when the hydrogen storage vessel pressure fails to decrease during an attempted water recovery cycle. Additionally, an abnormally high pressure increase during hydrogen generation may indicate this type of failure. The most obvious result is the water level not falling.

If one of the valves 38 or 39 fails to close, there may be a release of hydrogen into the anode water reservoir 20. In this condition, the system 10 may continue under limited operation until maintenance can be performed. A sudden pressure drop as hydrogen gas escapes during a water recovery step may indicate this type of failure. The ambient hydrogen detector 337 may also detect the hydrogen that has escaped.

If the valves 38, 39 leak, then there may be a release of hydrogen into the anode water reservoir, and the system 10 will have to be shut down. A pressure loss during idle mode may indicate this type of failure, and so may the ambient hydrogen detector 337.

If the water level detector 146 fails such that it indicates the vessel 24 to be dry, then storage vessel 24 will just continue to store water, thus reducing the capacity for hydrogen. This failure condition may be indicated by the recovered cathode water volume being outside the appropriate range. Also, the rate of increase of the hydrogen pressure may be abnormal, since the available volume of the hydrogen storage reservoir is reduced.

If the water level detector 146 fails indicating that the vessel 24 is wet, then there may be a release of hydrogen into the anode water reservoir. The system 10 may continue under limited operation until maintenance can be performed. A bubble detector (not shown) in the recovered water path may detect this failure. The ambient hydrogen detector 337 may also detect this failure if hydrogen gas is allowed into the vented anode water tank.

As the eventual source of the hydrogen, it is preferred the quantity and quality of the anode water must be monitored. Water level and quality monitoring is provided by conductivity sensors 317, perhaps having dual conductivity probes mounted at the middle and bottom of the anode reservoir. The temperature of the electrolyzer 22 is a function of the ambient temperature, water quality, water quantity and electrolyzer efficiency. A compromised water delivery system will result in an elevated operating temperature. Water quality is continuously monitored using the conductivity probes. When both conductivity probes are immersed, a direct comparison between the probes provides linearity and relative accuracy measurements. The conductivity sensors also provide a means of measuring the water level.

When all of the anode water is consumed or lost, electrolyzer 22 will be unable to generate hydrogen. High cell voltage measurements and an eventual drop in stack current may indicate this failure mode. A reduced number of gas bubbles detected by the bubble detector 37, slow pressure rise in the storage vessel and a high electrolyzer temperature may also indicate this type of failure.

When anode water flow is interrupted, the electrolyzer 22 may overheat requiring shut-down of the system 10. A high electrolyzer 22 temperature may indicate this failure mode. A reduced rate of gas bubbles occurring at the bubble detector 37 and a temperature dependent cell voltage measurement may also indicate this type of failure.

When the conductivity sensors 317 fail, whether they indicate the reservoir to be wet or dry, the system 10 may continue operation, but with a panel indicator if necessary. In either case, the conductivity must be within certain predetermined limits. Increased cell voltage measurements and increased temperature are indicative of a dry reservoir or a wet reservoir having a high conductivity fluid.

If the conductivity sensors 317 fail or drift, then possible damage may occur to electrolyzer 22 due to poor water quality. There may also be a false panel indicator concerning water quality. Again, the conductivity must be within certain limits. Increased cell voltage measurements and increased temperature may be used to verify or identify poor water quality.

A source of oxygen, in air, for combination with the electrochemically generated hydrogen to preheat the catalytic converter may be provided by means of the electrically activated air pump 18. Performance verification of the hydrogen delivery system 10 preferably includes quantifying the amount of air delivered by the pump. The air pump can be well characterized by providing the air flow as a function of current draw. Measurement of the current supplied to air pump 18 provides the status of the electronics supporting air pump 18 and the quantity of air being delivered to the vehicle's exhaust system. This current may be measured using a shunt or voltage drop across the solid state switch. If there is no air supplied to the exhaust system, then the hydrogen will have nothing with which to combine to preheat the catalytic converter, so the system 10 will have to be shut down.

If there is a blown fuse or other electrical failure of air pump 18 or motor thermal overload of air pump 18, then shut-down of the system 10 may be required. A lack of any current to air pump 18 may indicate this type of failure.

A reduced air flow due to a restriction or back pressure in air pump 18 may mean that there is not enough oxygen to combine with the hydrogen to preheat the catalytic converter 13, so excess hydrogen may be released through the vehicle's exhaust system. This condition may result in reduced heating of the catalytic converter 13. Current draw in air pump 18 may indicate this failure. The ambient hydrogen detector 337 described earlier will not help in this case because it is not positioned to detect hydrogen coming out of the exhaust.

If there is a partial failure of the motor or wiring harness or mechanical failure in air pump 18, then a shut-down of the system 10 will be required. Current draw in air pump 18 may indicate this failure. Other, more conventional means of detecting air flow, e.g., hot wire, vane switches, etc., could also be utilized.

In the present embodiment, there are several flags that indicate problems, or errors, of varying degrees of seriousness within the hydrogen delivery system 10. Various procedures, described below, set these flags and/or take appropriate action, such as flashing an indicator light for the driver, shutting the hydrogen delivery system down, or other appropriate response. When an error is detected, the controller may alert the driver immediately, or may wait to see if the flag goes away after a period of time or following a particular event. For example, the controller may wait for a few driving cycles to see if the flag goes away. A driving cycle includes starting the vehicle, bringing the vehicle up to normal operating conditions, and stopping the vehicle. For another flag, the controller may cause itself to re-initialize and then check to see if the flag is still present. The programmed response depends on the seriousness of the indicated problem. The flags may be kept in any convenient storage, such as an EEPROM, special registers or the memory used by the controller. The error, or total operating history, of the CHC system may be provided using fault codes and interfaces similar to existing SAE standards.

Figure 17:
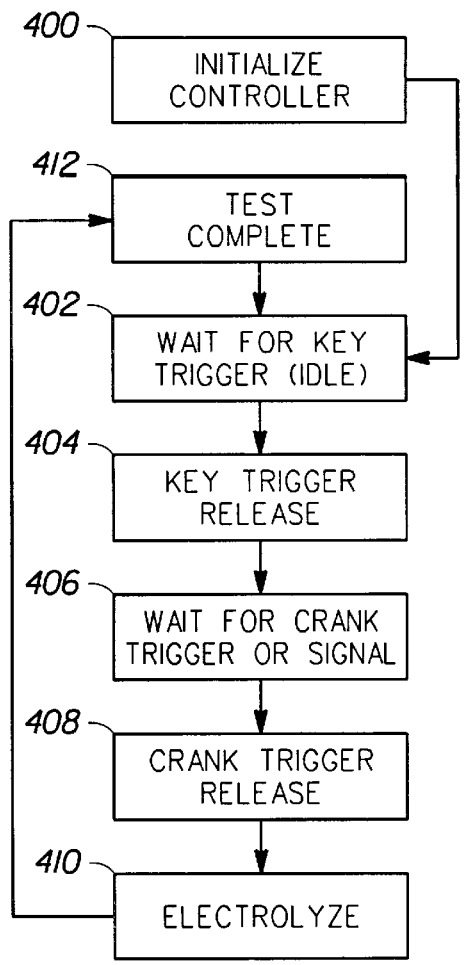
FIG. 17 is a flow chart for the main procedure for a controller system and on-boarddiagnostics for the present invention.

The operation of a controller system and on-board-diagnostics is illustrate in FIG. 17 which shows a general operating flow for the main procedure for a controller system and on-board-diagnostics. There may be concurrently running procedures. In other words, controller 134 may be multithreading, or there may even be another controller. Concurrent threads may be required to monitor the system 10 for any errors. Therefore, although the below described procedures may not show a means to monitor for errors while a procedure is performing a task that could be hampered or made dangerous by an error, the skilled person will understand that concurrent processes are readily apparent that could maintain the system 10 at all times. 5 The first step is to initialize the controller 134 in step 400 to bring the system up to a known state, wherein all controls and flags are initially turned off. This step may be done upon powering up the system when the vehicle's battery is attached to the vehicle, or by a service technician, or after a certain number of driving cycles, or in response to an error.

Control then proceeds to step 402 to wait for a key trigger or key-on signal. This step is also 10 known as the idle state. In this state, the controller 134 is waiting for a signal over input signal line 314 that the engine is about to start, which means that hydrogen delivery may soon be necessary. In the meantime, while the controller 134 is waiting for a key-on signal, it may be monitoring certain system parameters. This step will be described in more detail below with reference to FIG. 18.

Control then proceeds to step 404 wherein the controller 134 checks for a signal indicating 15 that hydrogen is actually to be released. This step will also do the hydrogen release if it is called for. This step will be described in more detail below with reference to FIG. 19.

Control then proceeds to step 406 wherein the controller 134 checks to see if the engine is actually cranking over before proceeding further. This step will be described in more detail below with reference to FIG. 20. 20 Control then proceeds to step 408 wherein the controller 134 checks for another signal to actually release hydrogen. This step will also do the hydrogen release if it is called for. This step will be described in more detail below with reference to FIG. 21. Control then proceeds to step 410 wherein the controller 134 will cause the electrolyzer 22 to produce hydrogen if it is needed to refill the hydrogen vessel 24 after any hydrogen releases in 25 steps 404 and 408. This step will be described in more detail below with reference to FIG. 22. Control then proceeds to step 412, wherein the controller 134 will check to see if the key-on signal is still asserted or if any errors occurred in any of the previous steps. This step will be described in more detail below with reference to FIG. 23.

Figure 18:
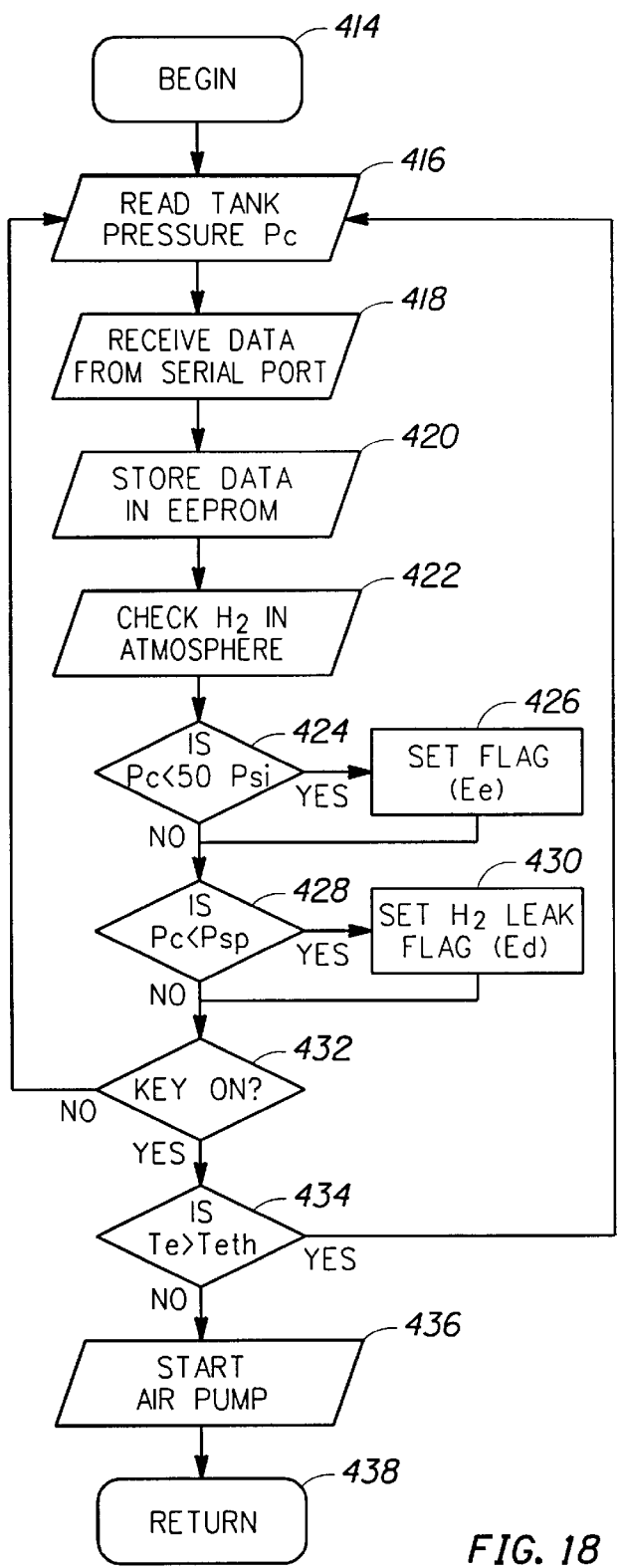
FIGS. 18 is a flow chart for the process that the control system goes through while it is waiting for ignition of the vehicle.

FIG. 18 describes the process that the controller 134 goes through while it is waiting for a key-trigger or key-on signal from the ignition during step 402 of the main procedure. The key trigger is any kind of a pre-indication signal that the driver is likely to try to start the engine soon. For example, it could be a signal that the driver has turned the key in the ignition to the first position, or accessory position. It could be a signal that the driver has turned the key all the way to crank the engine with a delay built in before the engine actually starts to crank.

The controller 134 enters the process at step 414, Begin. Control proceeds to step 416, wherein the controller 134 reads the current tank pressure (Pc) from the hydrogen pressure sensor 144 through sensor input line 310.

Control then proceeds to step 418, wherein the controller 134 receives data from serial port 341. This port can be any type of I/O device, not just a serial port. If controller 134 is part of the vehicle's built-in engine management unit, then that system will have its own serial port which can be used. The I/O device may be whatever link is required for communication with off-board diagnostic equipment. The off-board diagnostic equipment is a machine or computer that a service technician may use to diagnose problems with vehicles brought in for service. If the vehicle is not attached to an off-board diagnostic device, then the controller 134 will receive nothing from serial port 341 in step 418 and the procedure will just continue on past this step. An alternative embodiment could have the procedure on FIG. 18 check to see if the serial port is attached to the offboard diagnostic device before attempting to read data from it. The data that may be read from the serial port may be any information that the off-board diagnostic device or service technician needs to send to the vehicle. For example, the service technician could adjust operating parameters or threshold values that change the performance of the vehicle. In addition to receiving data over the serial port 341, the controller may send data to the off-board diagnostic device. For example, all of the same sensor signals that are described herein could be sent to the off-board diagnostic device for a thorough diagnosis of the error within the vehicle, so that the service technician may make repairs to the vehicle, specifically system 10. Additionally, all of the flag data could be sent to the off-board diagnostic device. The driver of the vehicle may not be able to repair whatever error occurs within the vehicle, so many errors or flags will generate nothing more than a generic warning to the driver that the vehicle needs to be serviced. The service technician, on the other hand, would need very detailed error information, including a mileage log before and after the error or flag, so a considerable amount of data sent may be sent over serial port 341. The flags and sensor data are used in the diagnostic procedures described herein.

Control then proceeds to step 420, wherein the controller 134 stores any data from the serial port 341 in memory. This memory may be an EEPROM, although it is recognized that there are many types of memory devices that could provide data storage.

Control then proceeds to step 422, wherein the controller 134 checks for any hydrogen in the atmosphere, which could indicate a leak in the system 10. This step will be described in more detail below with reference to FIG. 24.

Control then proceeds to step 424, wherein the controller 134 checks to see if the current tank pressure (Pc) is less than 50 psi. The data for the tank pressure (Pc) is read from hydrogen pressure sensor 144. If Pc<50 psi, then the controller 134 will set flag (Ee) in step 426.

After the flag (Ee) is set or if Pc is not less than 50 psi, then control proceeds to step 428, wherein the controller 134 checks to see if the tank pressure (Pc) is less than the tank setpoint pressure (Psp). If the answer is yes, then the controller 134 sets the hydrogen leak flag (Ed) in step 430. The tank setpoint pressure is the pressure to which the storage vessel 24 should be pressurized, and the system should not lose this pressure while idle.

After the flag (Ed) is set or if Pc is not less than Psp, then control proceeds to step 432, wherein the controller checks to see if the key-on, or key trigger, signal is asserted. If not, then control returns to step 416 to begin the above procedure again. Otherwise, control proceeds to step 434.

In step 434, the controller 134 checks to see if the engine temperature (Te) is greater than the engine threshold temperature for hydrogen release (Teth). If Te>Teth, then the vehicle is deemed to have been operated recently so the catalyst will still be at the light-off temperature and does not need hydrogen to be released to heat up the catalyst, so the procedure returns to step 416 to continue waiting and monitoring.

If Te is not greater than Teth, then control proceeds to step 436, wherein the controller 134 sends a signal on output control line 316 to air pump 18 to direct air pump 18 to turn on in anticipation of a hydrogen release in one of the next steps. Control then proceeds to step 438, wherein the procedure returns to the main procedure in FIG. 17 and proceeds to step 404.

Figure 19:
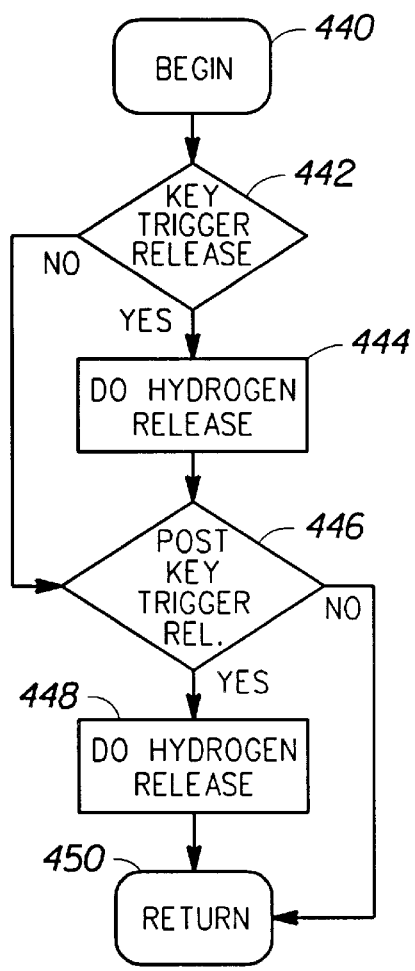
FIG. 19 is a flow chart showing the process that the system goes through to determine if hydrogen is to be released in response to a key trigger release or a post key trigger release.
Figure 21:
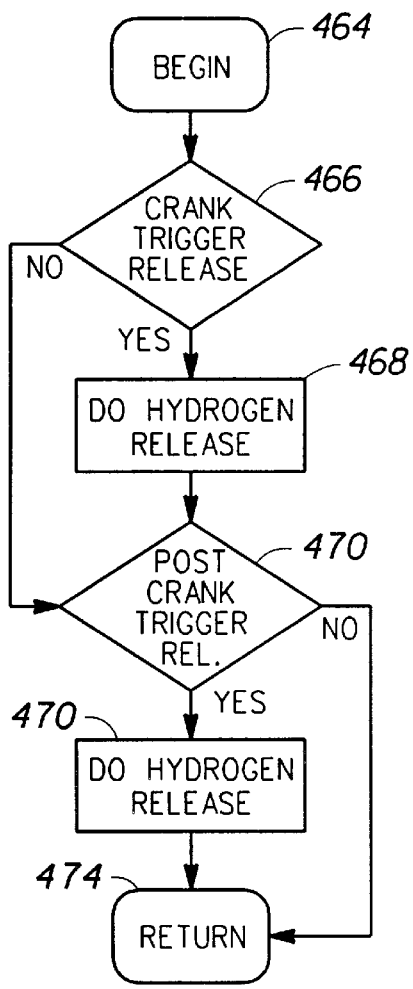
FIG. 21 is a flow chart showing the process that the system goes through to determine if hydrogen is to be released in response to a crank trigger release or a post crank trigger release.

FIG. 19 describes the process that the controller 134 takes the system 10 through in step 404 to determine if hydrogen is to be released in response to a key trigger release or a post key trigger release. The trigger releases may be software generated signals depending on how many release steps the controller is programmed to perform. FIGS. 19 and 21 show a total of four release steps; however, more or fewer steps may actually be programmed into the controller. These figures are merely illustrative of an embodiment of the invention. It may even be possible to change the number of release steps that the controller is programmed to perform, such as through the data received over serial port 341.

The controller 134 enters the process at step 440, begin. Control proceeds to step 442, wherein the controller 134 checks to see if a key trigger release signal has been received.

If there has not been a key trigger release signal, then control proceeds to step 446. Otherwise, control proceeds to step 444, wherein controller 134 orders hydrogen to be released. The hydrogen release step will be described below in more detail with reference to FIG. 25. Control then proceeds to step 446.

In step 446, controller 134 checks to see if a post key trigger release signal has been received. If there has not been a post key trigger release signal, then control proceeds to step 450. Otherwise, control proceeds to step 448, wherein controller 134 orders hydrogen to be released. As stated above, the hydrogen release step will be described below in more detail with reference to FIG. 25. Control then proceeds to step 450 wherein the procedure returns to the main procedure in FIG. 17 and proceeds to step 406.

Figure 20:
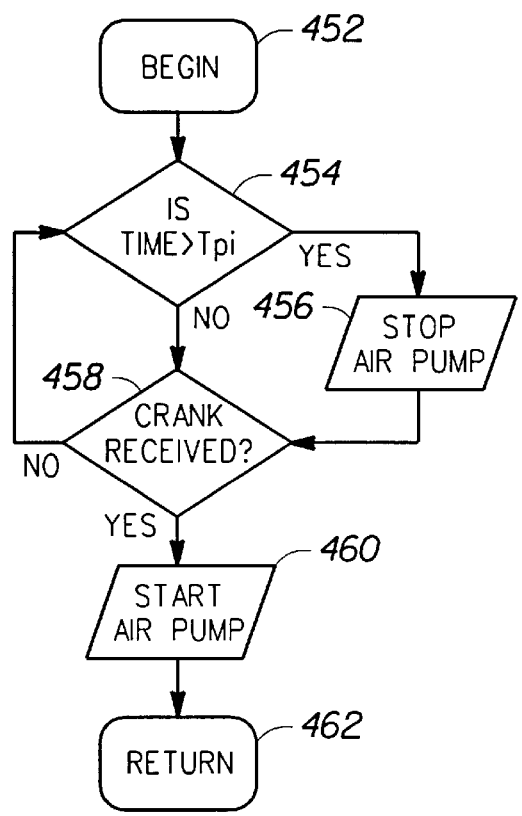
FIG. 20 is a flow chart showing the process that the system goes through while it waits for a crank trigger signal.

FIG. 20 describes the process that controller 134 goes through in step 406 while it waits for a crank trigger signal. Crank trigger is the signal that the driver has turned the key all the way to actually start cranking the engine. Controller 134 enters the process at step 452, begin. Control proceeds to step 454, wherein controller 134 checks to see if the elapsed time since the air pump was started is greater than the air pump idle time (Tpi), e.g., 15 seconds. If so, then controller 134 sends a signal on output control line 316 to air pump 18 to direct air pump 18 to turn off since it is better not to leave the air pump on if the crank trigger signal is taking a long time to arrive.

After the air pump is directed to stop, or if elapsed time is not greater than Tpi, then control proceeds to step 458, wherein controller 134 checks to see if the crank trigger signal has been received. If not, then control returns to step 454 to continue this process while waiting. Otherwise, control proceeds to step 460. An alternative embodiment may have another step if the answer in step 458 was "no", wherein the procedure checks to see if the key-on signal is still asserted. If not, then the driver may have aborted the attempt to start the engine, so the procedure should jump back out to the main procedure. The system may be programmed to perform a limited number of pre-crank hydrogen releases if the driver does not actually start the vehicle. For example, the system would allow the driver to turn the key on and off again three times, releasing hydrogen each time the converter is cold. The system would then not release hydrogen on the fourth attempt. This "false start" counter could be reset by a successful start or timeout period.

In step 460, controller 134 sends a signal on output control line 316 to air pump 18 to direct the air pump 18 to turn on. If the air pump 18 was never turned off because the process never reached step 456, then this signal will have no effect on the air pump 18. Control then proceeds to step 462, wherein the procedure returns to the main procedure and continues at step 408.

FIG. 21 describes the process that the system 10 goes through in step 408 to determine if hydrogen is to be released in response to a crank trigger release or a post crank trigger release. The controller 134 enters the process at step 464, begin. Control proceeds to step 466, wherein the controller 134 checks to see if a crank trigger release signal has been received.

If there has not been a crank trigger release signal, then control proceeds to step 470. Otherwise, control proceeds to step 468, wherein controller 134 orders hydrogen to be released. The hydrogen release step will be described below in more detail with reference to FIG. 25. Control then proceeds to step 470.

In step 470, controller 134 checks to see if a post crank trigger release signal has been received. If there has not been a post crank trigger release signal, then control proceeds to step 474. Otherwise, control proceeds to step 472, wherein controller 134 orders hydrogen to be released. As stated above, the hydrogen release step will be described below in more detail with reference to FIG. 25. Control then proceeds to step 474 wherein the procedure returns to the main procedure in FIG. 17 and proceeds to step 410.

FIGS. 18–21 showed two possible triggers for indicating that hydrogen may soon be required to be released: (1) at key-on, and (2) at crank of the engine. It is possible to conceive of other ways to signal an impending need for hydrogen. For example, the vehicle could even be equipped with a separate trigger button that the driver could manually operate to signal that the vehicle will soon be started.

Figure 22:
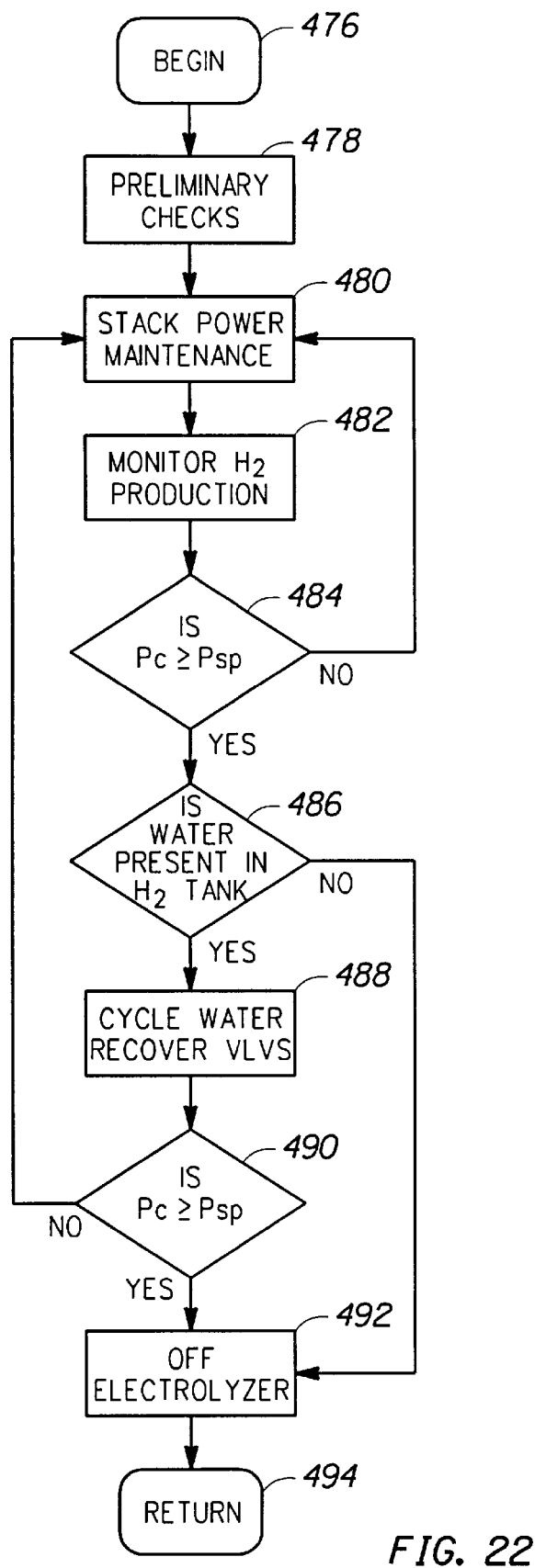
FIG. 22 is a flow chart showing the process by which the system produces hydrogen through electrolysis.

FIG. 22 describes the process by which the system 10 produces hydrogen through electrolysis in step 410. Controller 134 enters the process at step 476, begin. Control proceeds to step 478, wherein the controller goes through a series of preliminary checks to determine certain parameters of the system 10 and the vehicle. These preliminary checks will be described in more detail below with reference to FIG. 26.

Control proceeds to step 480, wherein controller 134 performs a routine to maintain electrical power to the stack of cells 26 within electrolyzer 22. This routine will be described in more detail below with reference to FIG. 27. The first time the procedure goes through this step, it turns on the electrolyzer by sending a signal to start hydrogen generation. In an alternative embodiment, this procedure may also start a timer to time how long it takes to generate hydrogen. An unusually long time period may indicate a problem with the hydrogen generation system.

Control then proceeds to step 482, wherein controller 134 monitors certain parameters in the production of hydrogen. Monitoring of the parameters will be described in more detail below with reference to FIG. 28.

Control then proceeds to step 484, wherein controller 134 reads the current tank pressure (Pc) data over sensor input line 310 from hydrogen pressure sensor 144. Controller 134 compares current tank pressure with the tank setpoint pressure (Psp). If Pc is not greater than or equal to Psp, then control returns to step 480 to continue maintaining the power to the electrolyzer 22 and monitoring the production of hydrogen. If $Pc \geq Psp$, then control leaves this loop and proceeds to step 486. When $Pc \geq Psp$ the storage tank is full.

In step 486, controller 134 checks water level sensor 146 over sensor input line 308 to determine if there is water present in the hydrogen tank, or storage vessel 24. If the water level is too high, then control proceeds to step 488, wherein controller 134 sends a command sequence over control output lines 306, 307 to the water outlet valves 38, 39 to cycle and let some water out of storage vessel 24. The valves 38, 39 are cycled open and closed alternately in order to draw out a packet of water of known volume, so hydrogen will not be accidentally let out, too. This step may be repeated until the water level sensor 146 no longer senses a water level that is too high. Then control proceeds to step 490 wherein controller 134 checks the current tank pressure (Pc) again and compares it with the tank setpoint pressure (Psp). If Pc is still not greater than or equal to Psp, which can happen whenever water is recovered in step 488, then control returns to the hydrogen production loop starting at the maintenance of electrical power to the stack in step 480. Otherwise, if Pc is still greater than or equal to Psp, then control proceeds to step 492, because at that point the hydrogen pressure sensor 144 has provided the signal to the controller 134 that the storage vessel 24 is full.

If when completing step 486 water is not found in storage vessel 24, and the total water transferred is found within an acceptable range, then control proceeds to step 492.

When control reaches step 492, this condition indicates that the pressure of the hydrogen in storage vessel 24 is at a maximum, i.e., the tank is full, and there is no excess water in storage vessel 24. Therefore, controller 134 can turn off electrolyzer 22 in this step by sending a stop hydrogen generation signal over control output line 304 to the electrolyzer source 138 to turn off. Control then proceeds to step 494, wherein the process returns control to the main procedure at step 412.

Figure 23:
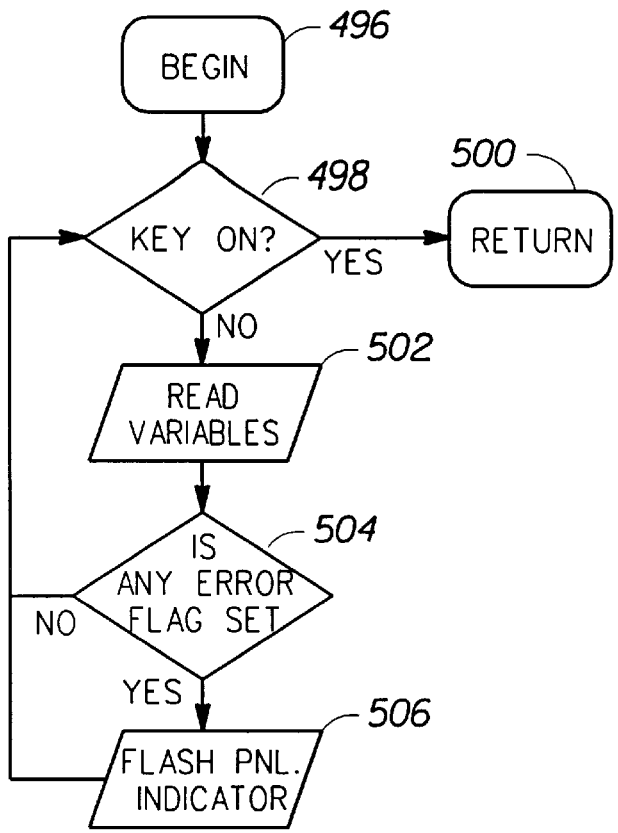
FIG. 23 is a flow chart showing the procedure that the system goes through to check whether any error flags are set.

FIG. 23 describes the test complete procedure in step 412 of the main procedure. Control enters this procedure at step 496, begin. Control then proceeds to step 498, wherein controller 134 checks whether the key-on signal is asserted. If so, then this signal indicates that the driver of the vehicle is either still trying to start the car or the car is actually running, so the procedure must continue to step 500, wherein control returns to the main procedure at step 402 in order to proceed with the above described routines.

If the key-on signal is not asserted in step 498, then control proceeds to step 502, wherein controller 134 reads the variables from the various sensors and flags.

Control then proceeds to step 504, wherein controller 134 checks whether any error flags are set. These flags may have been set by any of the other steps in the main procedure, or by an independently running thread that is monitoring system conditions. In either case, the indicated errors may not have required immediate shut-down of the system 10. If no error flag is set, then controller 134 continues looping back through step 498. If an error flag is set, then control proceeds to step 506 wherein controller 134 sends a signal to the panel indicator light to flash on and warn the driver of the vehicle that an error has occurred and the vehicle's hydrogen injection system may need servicing. The warning, however, may just be a low priority service warning. After the procedure has given this warning, control returns to step 498 to continue the loop. Thus, the system continues to monitor itself while the vehicle is turned off. The exact timing of when the panel indicator is activated and the mode of indication are variables that can be changed as desired.

Figure 24:
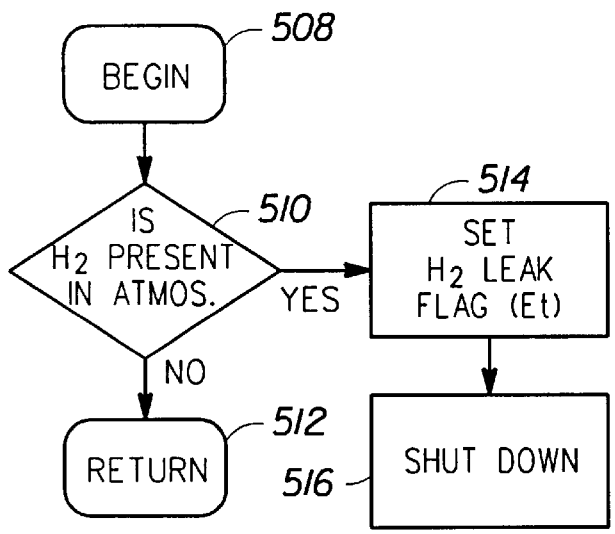
FIG. 24 is a flow chart showing the procedure that the system goes through in a check for a hydrogen leak from the system.

FIG. 24 shows the procedure that hydrogen delivery system 10 goes through in a check for a hydrogen leak from the system. This procedure is shown to be called by another procedure and to return to the other procedure; however, in an alternative embodiment, this procedure continues to run independently of any other procedures as an independent thread in the controller 134. Control is shown to enter this procedure at step 508, begin. Control proceeds to step 510, wherein controller 134 checks the signal from ambient hydrogen detector 337 to determine whether hydrogen is present in the atmosphere. If hydrogen is not detected in the atmosphere, then control proceeds to step 512, wherein the procedure returns control to whichever procedure called it.

If hydrogen is detected in step 510, then control proceeds to step 514, wherein controller 134 sets the hydrogen leak flag (Ef). Control then proceeds to step 516, wherein controller 134 calls the routine to shut down the hydrogen delivery system. The shut-down routine will be described in more detail below with reference to FIG. 29. Although this shut-down procedure shows the procedure returning to its calling procedure, there may be certain types of errors/flags that require a complete and immediate shut-down of the system 10, including the controller 134, so that no procedure continues running.

Figure 25:
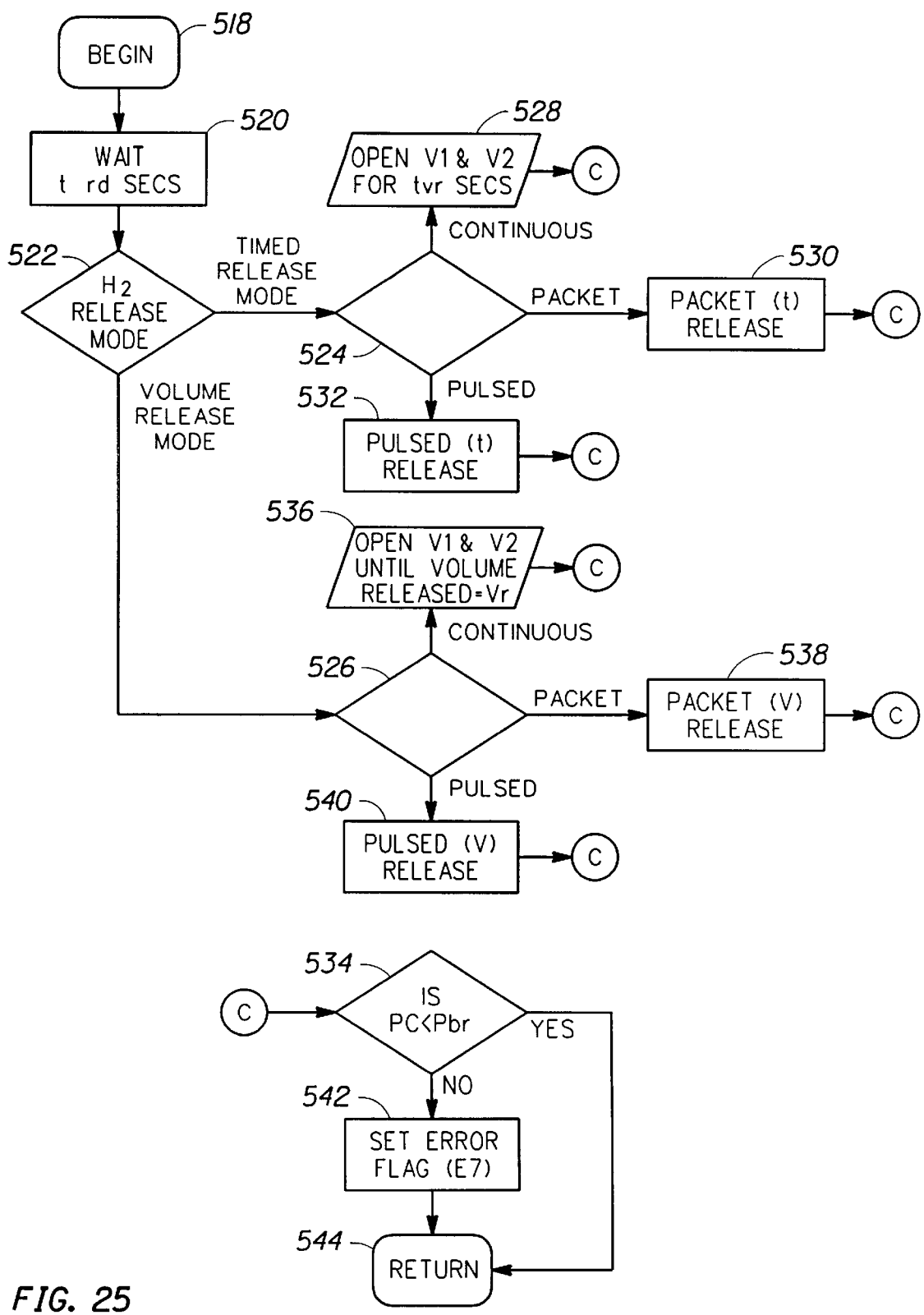
FIG. 25 is a flow chart showing the procedure that the system goes through to release hydrogen to the vehicle's exhaust system.

FIG. 25 shows the procedure that the hydrogen delivery system 10 goes through to release hydrogen to the vehicle's exhaust system. Control enters the procedure at step 518, begin. Control then proceeds to step 520, wherein controller 134 waits for a hydrogen release delay (trd) time period. Control then proceeds to step 522, wherein controller 134 determines which mode, either timed release mode or volume release mode, is requested. If a timed release mode is requested, then control proceeds to step 524. If a volume release mode is requested, then control proceeds to step 526. The mode may be programmed into the controller 134 such that controller 134 requests a mode based upon where this procedure was called. For example, controller 134 may be programmed to request one mode for the key trigger release step 442, and it may be programmed to request another mode for the post key trigger release step 446, or the crank trigger release step 466, or the post crank trigger release step 470. The choice of modes may even be reprogrammed through the data received from serial port 341, self tuning, or based on other parameters (such as ambient temperature, driving habits and preferences, etc.). Additional release modes, such as closed loop modes based on sensor data such as exhaust oxygen sensors, temperature sensors, optical temperature sensors, etc., are not fully described but may be easily envisioned and implemented.

In step 524, controller 134 determines which type of timed release method is requested; continuous release, packet release or pulsed release. As with the choice of modes, the choice of release methods is also programmed into controller 134 depending on where the hydrogen release procedure was called from.

For a timed continuous release, control proceeds to step 528, wherein both valves 46, 48 are held open for a certain amount of hydrogen release time (tvr). Afterwards, control proceeds to step 534. For a timed packet release, control proceeds to step 530, wherein packets of hydrogen are released over a period of time. This timed packet release method will be described in greater detail below with reference to FIG. 30. Afterwards, control proceeds to step 534. For a timed pulsed release, control proceeds to step 532, wherein pulses of hydrogen are released over a certain period of time. This timed pulsed release method will be described in greater detail below with reference to FIG. 31. Afterwards, control proceeds to step 534.

In step 526, controller 134 determines which type of volume release method is requested; continuous release, packet release or pulsed release. For a volume continuous release, control proceeds to step 536, wherein both valves 46, 48 are held open until a certain volume of hydrogen is release (Vr). This volume may be calculated by controller 134 based on the change in pressure in the storage vessel 24 as measured by hydrogen pressure sensor 144. Afterwards, control proceeds to step 534. For a volume packet release, control proceeds to step 538, wherein packets of hydrogen are released until a certain volume of hydrogen is released. This volume packet release method will be described in greater detail below with reference to FIG. 32. Afterwards, control proceeds to step 534. For a volume pulsed release, control proceeds to step 540, wherein pulses of hydrogen are released until a certain volume of hydrogen is released. This volume pulsed release method will be described in greater detail below with reference to FIG. 33. Afterwards, control proceeds to step 534.

In step 534, controller 134 reads the current tank pressure (Pc) and compares it to the tank pressure at the beginning of the hydrogen release (Pbr). If Pc is not less than Pbr, then controller 134 sets an error flag (E7) and control proceeds to step 544. If Pc is less than Pbr, then control proceeds to step 544. In step 544, controller 134 returns control to whichever procedure called for this hydrogen release procedure.

Figure 26:
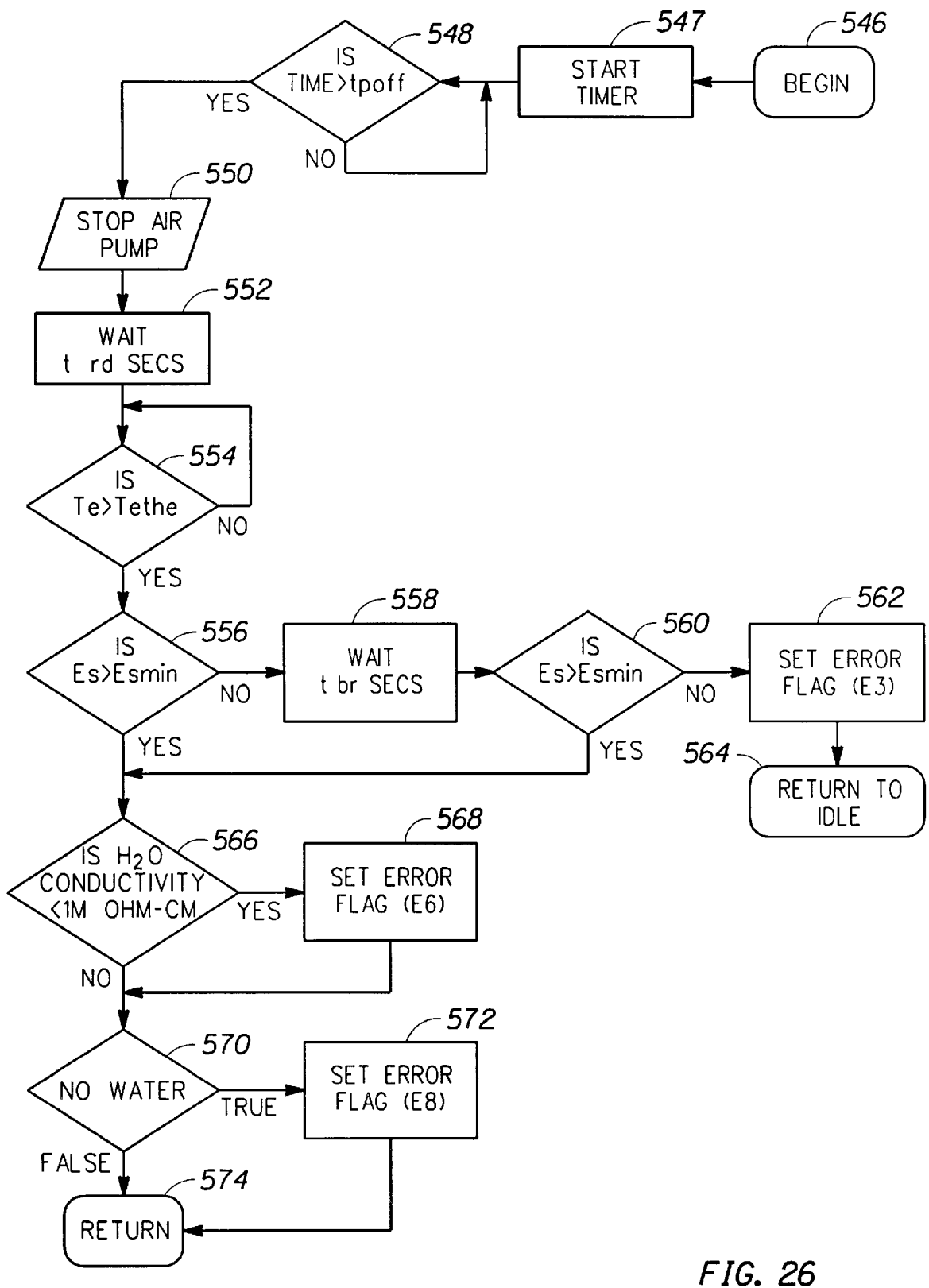
FIG. 26 is a flow chart showing the procedure that the system goes through to check certain parameters of the system prior to producing hydrogen.

FIG. 26 shows the preliminary checks procedure that hydrogen delivery system 10 goes through to check certain parameters of the system prior to producing hydrogen. Control enters the procedure at step 546, begin. Control proceeds to step 547, wherein a timer is started. Control proceeds to step 548, wherein controller 134 checks to see if the time elapsed (time) since starting the timer in step 547 exceeds a certain time period after which the air pump should be turned off (tpoff). If so, then control proceeds to step 550, wherein controller 134 can go ahead and turn off air pump 18 by sending a signal over output control line 316, and then control proceeds to step 552. If "time" is not greater than tpoff, then control returns back to step 548.

In step 552, controller 134 waits for a hydrogen release delay time (trd). Then control proceeds to step 554, wherein controller 134 checks to see if the temperature of the engine (Te) is greater than the engine threshold temperature for electrolyzing (Tethe). If Te is not greater than Tethe, then control loops back to this step to wait for the temperature to come up high enough for electrolyzer to begin production of hydrogen. If Te>Tethe, then control proceeds to step 556. In an alternative embodiment, if Te≦Tethe, then there may be an additional step wherein the procedure checks to see if the key turns off, so the procedure can jump out and go to idle.

In step 556, the controller 134 checks to see if the system volts (Es) of the vehicle's electrical system is greater than the minimum system volts (Esmin) required for operation of the electrolyzer. If not, then controller 134 waits for a battery recovery time (tbr) in step 558 and then checks to see if the system volts (Es) is still not greater than the minimum system volts (Esmin) in step 560. If Es is still not greater than Esmin, then controller 134 sets an error flag (E3) in step 562 and then returns to the idle state in step 564. The independently running procedure mentioned above for monitoring errors and flags may be able to take the appropriate action for this error flag, since the preliminary checks procedure is returning to idle. If Es was greater than Esmin in either step 556 or step 560, then control proceeds to step 566. In an alternative embodiment, if Es≦Esmin in step 560, then the procedure could loop back to step 558 and continue to wait for the system volts to come up. In the same loop, the procedure could monitor the key-on signal to see if the vehicle is ever turned off, so the procedure could go to idle.

In step 566, controller 134 checks to see if the resistivity of the water is less than 1 M ohm.cm, indicating that the water may be contaminated. If so, then controller 134 sets an error flag (E6) in step 568, and then control proceeds to step 570. If not, then control proceeds directly to step 570.

Figure 27:
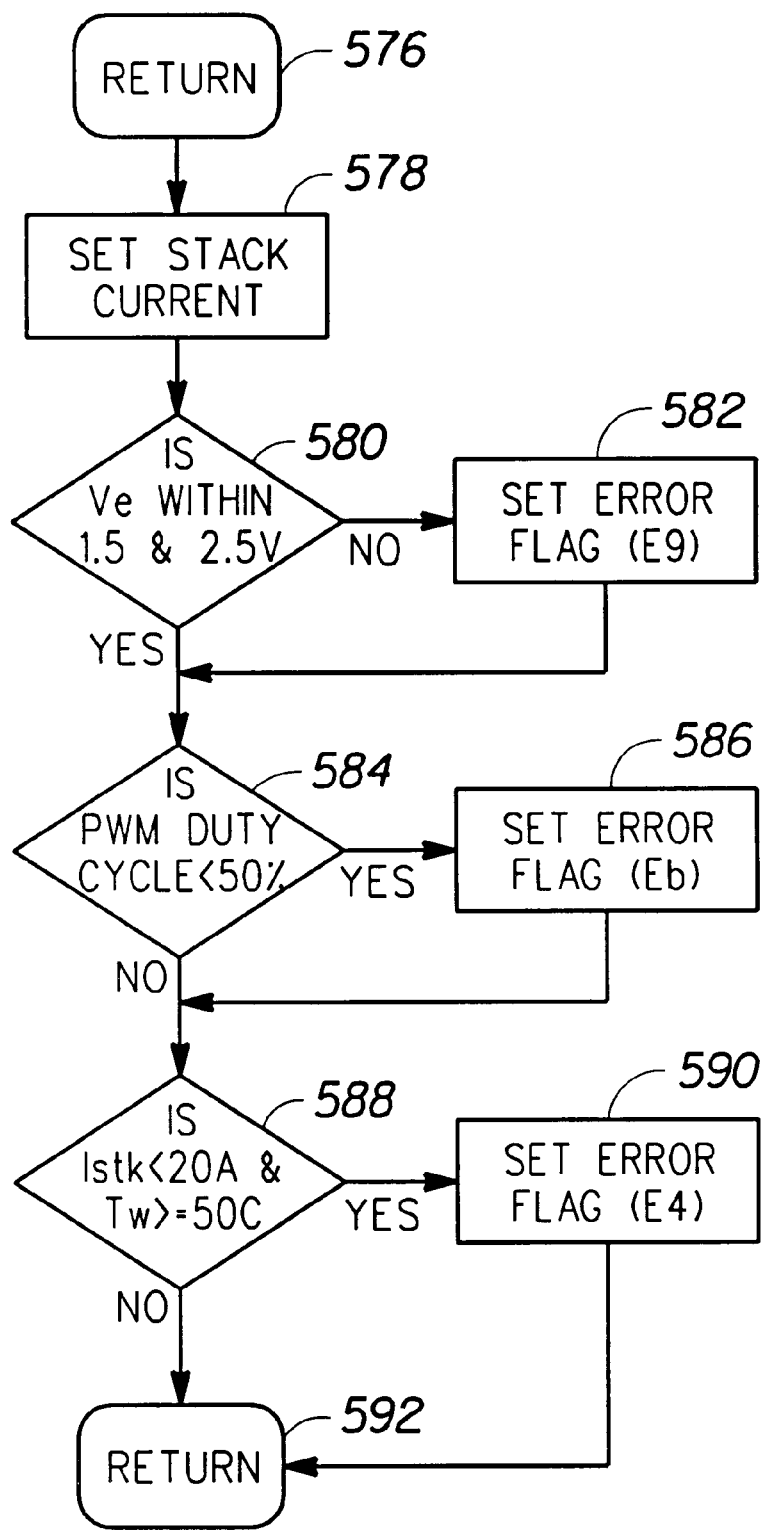
FIG. 27 is a flow chart showing the procedure that the system goes through to maintain the power to the stack of cells within the electrolyzer.

In step 570, controller 134 checks to see if there is water in the anode reservoir. If there is no water, then controller 134 sets an error flag (E8) in step 572, and control proceeds to step 574. If there is water, then controller 134 proceeds directly to step 574, wherein the procedure returns control to the procedure that called it, such as the electrolyze procedure in FIG. 22 at step 478. FIG. 27 shows the routine, or procedure, that hydrogen delivery system 10 goes through to maintain the power to the stack of cells 26 within electrolyzer 22. Control enters the procedure at step 576, begin, and proceeds to step 578, wherein controller 134 sets the current supplied to the stack of cells 26 by adjusting the duty cycle of the pulse width modulator (PWM). This procedure to set the stack current will be described in greater detail below with reference to FIG. 34.

Control then proceeds to step 580, wherein controller 134 checks to see if the individual cell voltages (Vc) are within a specified range, such as between about 1.5 volts and about 2.5 volts. If not, then controller 134 sets an error flag (E9) in step 582, and control proceeds to step 584.

In step 584, controller 134 checks to see if the duty cycle of the PWM is less than 50%, indicating that the stack current required some adjustment to get it to the proper level. If so, then controller 134 sets an error flag (Eb) in step 586, and control proceeds to step 588. If the PWM's duty cycle was not less than 50%, then control proceeds directly to step 588.

In step 588, controller 134 checks to see if the current of the stack (Istk) is less than 20 Amps and the temperature of the water (Tw) is greater than or equal to 50° C. If both conditions are true, then there is an efficiency problem in the stack because the water temperature should be closer to ambient temperature when the current is that low, so controller 134 sets an error flag (E4) in step 590, and control proceeds to step 592. If one condition is false, then control proceeds directly to step 592, wherein the procedure returns control to the electrolysis process in FIG. 22 at step 482.

Figures 28, 29:
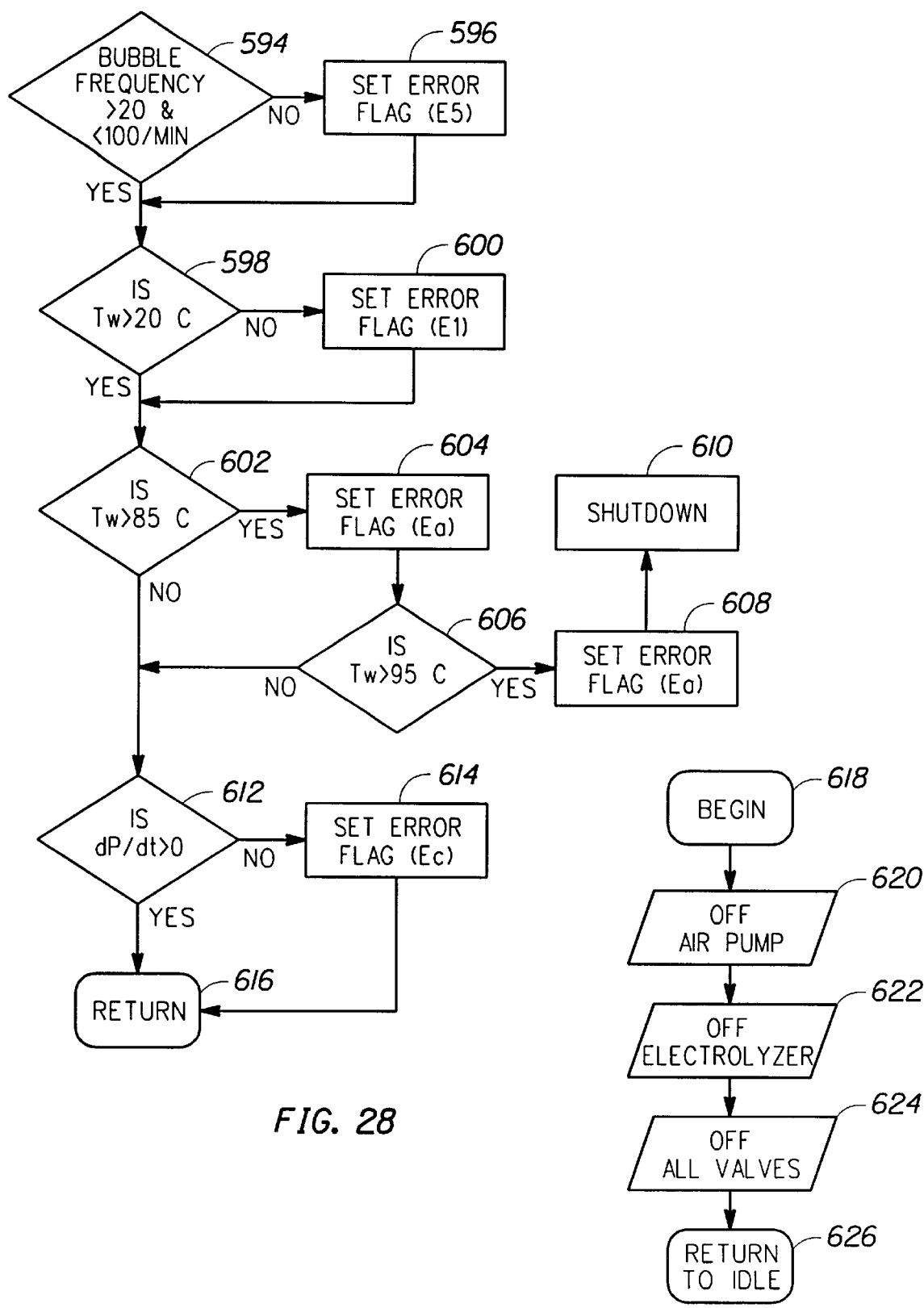
FIG. 28 is a flow chart showing the procedure that the system goes through to monitor certain parameters during the production of hydrogen.
FIG. 29 is a flow chart showing the procedure that the system goes through to shut down the electrolyzer and both oxygen and hydrogen delivery equipment.

FIG. 28 shows the procedure that hydrogen delivery system 10 goes through in step 482 of the electrolysis process in FIG. 22 to monitor certain parameters during the production of hydrogen. Control starts at step 594 with the monitoring of the gas bubble frequency in return line 34 through sensor input line 312. If the bubble frequency is not within the proper range, such as between about 20 and about 100 bubbles per minute, then controller 134 sets an error flag (E5) in step 596, and control proceeds to step 598. If the bubble frequency is within the proper range, then control proceeds to step 598.

In step 598, controller 134 checks to see if the temperature of the water (Tw) is greater than 20° C., and if not, then controller 134 sets an error flag (El) in step 600 indicating that the water is too cool considering that the temperature should rise during electrolysis, so something may not be working right if the temperature is too low. If the temperature of the water is greater than 20° C., or after flag E1 is set, control proceeds to step 602.

In step 602, controller 134 checks to see if the temperature of the water (Tw) is greater than 85° C., and if not then control proceeds to step 612. Otherwise, controller 134 sets an error flag (Ea) in step 604 and proceeds to check whether Tw is even greater than 95° C. in step 606, and if not, then the water is hot, but not too hot, so control can proceed on to step 612. Otherwise, the temperature of the water is too hot, so controller 134 sets error flag (Ea), which may be a different flag than the one set in step 604, in step 608 and then goes to the shut down procedure in step 610 since something must be wrong with the system if the water temperature is so high. This shut down procedure is described in greater detail below with reference to FIG. 29.

In step 612, controller 134 checks to see if the change in pressure over time (dP/dt) is greater than zero or within a window. Controller 134 may save the current pressure and time since the last reading in memory in order to calculate the change. If the pressure is not increasing, then controller 134 sets an error flag (Ec) in step 614. Afterwards or otherwise, the procedure returns in step 616 to step 484 in the electrolysis process in FIG. 22.

FIG. 29 shows the procedure that the hydrogen delivery system 10 goes through to shut down the system 10, usually in response to an error in the system 10 that could cause serious problems if the system 10 continued to operate. Control enters the procedure at step 618, begin, and then controller 134 proceeds to send a signal over output control line 316 to turn off (close) the air pump 18 in step 620, to send a signal over output control line 304 to turn off the electrolyzer 22 in step 622, and to send signals over output control lines 306, 300 and 302 to turn off all valves 38, 46 and 48 in step 624. Then in step 626, the procedure returns the system 10 to the idle state in the main procedure at step 402 in FIG. 17.

Figure 30:
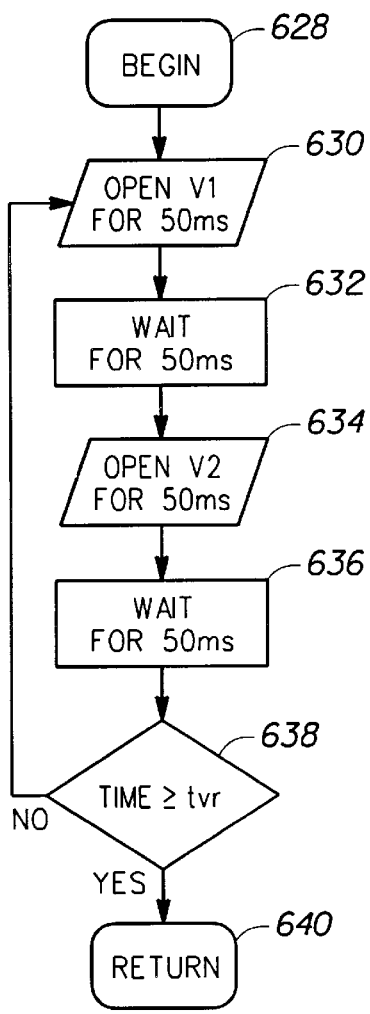
FIG. 30 is a flow chart showing the procedure that the system goes through to release hydrogen in timed packets for a specified time period.

FIG. 30 shows the procedure that the hydrogen delivery system 10 goes through to release hydrogen in timed packets for a specified time period in step 530 of FIG. 25. Control enters the procedure at step 628, begin, and controller 134 proceeds to open valve 46 for a time period, e.g. 50 ms, and then closes it in step 630. Then controller 134 waits for another time period, e.g. another 50 ms, in step 632. This extra wait step gives the valve a chance to close and become seated before opening valve 48 for a time period, e.g., 50 ms again, in step 634. Then controller 134 waits for another time period in step 636, another 50 ms is sufficient for the valve to become seated, and then checks in step 638 to see if the elapsed time (time) for the duration of this packet release procedure has reached the desired hydrogen release time (tvr). If not, then the procedure continues back at step 630 to release another packet. Otherwise, the procedure returns in step 640 to the hydrogen release procedure in FIG. 25 at step 534.

Figure 31:
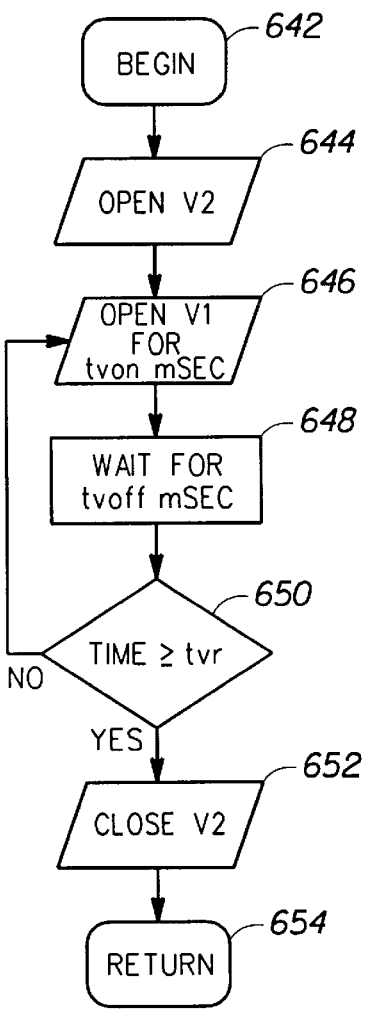
FIG. 31 is a flow chart showing the procedure that the system goes through to release hydrogen in timed pulses for a specified time period.

FIG. 31 shows the procedure that the hydrogen delivery system 10 goes through to release hydrogen in timed pulses for a specified time period in step 532 of FIG. 25. Control enters the procedure at step 642, begin, and controller 134 opens one of the valves 46, 48, e.g., valve 48, in step 644 and holds it open. Controller 134 then opens the other valve, e.g., valve 46, for valve on time (tvon) and closes it in step 646. Controller 134 waits for valve off time (tvoff) in step 648 before checking in step 650 to see if the elapsed time (time) during this entire timed pulsed release procedure has reached the desired hydrogen release time (tvr). If not, then the procedure continues back at step 646 to release pulses of hydrogen, until the hydrogen release time (tvr) has passed, and controller 134 can close valve 48 in step 652. In step 654, the procedure returns to the hydrogen release procedure at step 534 in FIG. 25.

Figure 32:
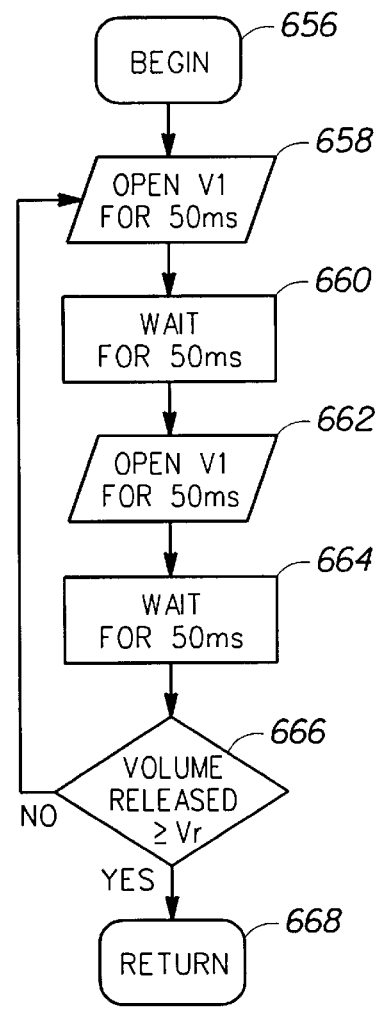
FIG. 32 is a flow chart showing the procedure that the system goes through to release hydrogen in timed packets for a specified volume of hydrogen.

FIG. 32 shows the procedure that hydrogen delivery system 10 goes through to release hydrogen in timed packets for a specified volume of hydrogen in step 538 of FIG. 25. Control enters the procedure at step 656, begin, and controller 134 proceeds to open valve 46 for a time period, e.g., 50 ms, and then closes it in step 658. Then controller 134 waits for another time period, e.g., another 50 ms to let the valve seat, in step 660 before opening valve 48 for a time period, e.g., 50 ms again, in step 662. Then controller 134 waits for another time period in step 664, another 50 ms is sufficient to let the valve seat, and then checks in step 666 to see if the volume of hydrogen released for the duration of this packet release procedure has reached the desired hydrogen release volume (Vr). The volume of hydrogen released may be calculated by the controller 134 from the pressure change of the storage vessel and summing the volume of each packet. If volume released<Vr, then the procedure continues back at step 658 to release another packet. Otherwise, the procedure returns in step 668 to the hydrogen release procedure in FIG. 25 at step 534.

FIG. 33 shows the procedure that the hydrogen delivery system 10 goes through to release hydrogen in timed pulses for a specified volume of hydrogen in step 540 of FIG. 25. Control enters the procedure at step 670, begin, and controller 134 opens one of the valves 46, 48, e.g., valve 48, in step 672 and holds it open. Controller 134 then opens the other valve, e.g., valve 46, for valve on time (tvon) and closes it in step 674. Controller 134 waits for valve off time (tvoff) in step 676 before checking in step 678 to see if the volume of hydrogen released during this entire volume pulsed release procedure has reached the desired hydrogen release volume (Vr). If not, then the procedure continues back at step 674 to release pulses of hydrogen, until the hydrogen release volume (Vr) has passed, and controller 134 can close valve 48 in step 680. In step 682, the procedure returns to the hydrogen release procedure at step 534 in FIG. 25.

FIG. 34 shows the procedure that hydrogen delivery system 10 goes through to set the current (Istk) delivered to the stack of cells 26. Control enters the procedure at step 684, begin, and controller 134 proceeds to set the duty cycle of the pulse width modulator (PWM) to 50% in step 686. Then controller 134 determines in step 690 whether the stack current (Istk) is less than, equal to, or greater than the maximum stack current (Istkma). The system prefers for Istk to be in a range fairly close to Istkma, so the controller 134 will increment the PWM's duty cycle by about 1% in step 692 if Istk is too low, or decrement the PWM's duty cycle by about 1% in step 696 if Istk is too high, and either way return to step 690. When Istk finally is close enough to Istkma, the procedure returns control in step 694 to the stack power maintenance procedure at step 580 in FIG. 27. Istkma may depend on the configuration of the stack, the condition of the battery or the ambient temperature. If Istk is too high, it could damage the vehicle's alternator. If Istk is too high or low, then there may be something wrong with the hydrogen delivery system and/or it will take too long to restore the hydrogen supply.

FIG. 35 shows the procedure, running as an independent thread, that the controller 134 may go through to periodically update data to send via the serial port 341 in case an off-board diagnostic device or computer is attached to the vehicle. A timer is started in step 698. Then in step 700, the controller 134 waits for a time period, e.g., 2 sec. Then in step 702, the controller 134 takes the current data and sends it on the serial port 341 to the off-board diagnostic device. Then the timer is reset in step 704, and the procedure returns to step 698 for a continuous loop through these steps, so the status of the sensors are captured every two seconds or so.

While the foregoing is directed to the preferred embodiment of the present invention, other and further embodiments of the invention may be devised without departing from the basic scope thereof, and the scope thereof is determined by the claims which follow.

What is claimed is:

1. An electrolyzer comprising:
   an anode compartment comprising a plurality of rigid components including an anode flowfield and a porous anodic electrocatalyst substrate molded into a cell frame;

a cathode compartment comprising a resilient member;

a flexible membrane disposed between the anode and cathode compartments.

2. An electrolyzer comprising:

an anode compartment comprising a plurality of rigid components including an anode flowfield and an anode product outlet in communication with an upper portion of the anode flowfield;

cathode compartment comprising a resilient member;

a flexible membrane disposed between the anode and cathode compartments; and an upwardly sloping passage in communication between the anode product outlet and a water reservoir.

3. An electrolyzer comprising:

an anode compartment comprising a plurality of components including an anode flowfield and anode product outlet communicating with an upper portion of the anode flowfield;

a cathode compartment;

a flexible membrane disposed between the anode and cathode compartments; and an upwardly sloping passage in communication between the anode product outlet and a water reservoir; and a bubble detector disposed adjacent to the upwardly sloping passage.

4. An electrolyzer comprising:

an anode compartment comprising a plurality of components including an anode flowfield and anode product outlet communicating with an upper portion of the anode flowfield;

a cathode compartment; and a flexible membrane disposed between the anode and cathode compartments; and an upwardly sloping passage in communication with the anode product outlet.

5. The electrolyzer of claim 4, further comprising a bubble detector disposed adjacent to the upwardly sloping passage.

6. An electrolyzer comprising:

an anode compartment comprising a plurality of components;

a cathode compartment comprising a cathode, a cathode flowfield and a cathode product outlet communicating with an upper portion of the cathode flowfield;

a flexible membrane disposed between the anode and cathode compartments; and an upwardly sloping passage in communication with the cathode product outlet.

7. The electrolyzer of claim 6, further comprising a bubble detector disposed adjacent to the upwardly sloping passage.

8. The electrolyzer of claim 6, further comprising:

a hydrogen storage vessel having an inlet in communication with the cathode product outlet.

9. The electrolyzer of claim 8, wherein the hydrogen storage vessel has an inlet that is elevated above the cathode product outlet.

10. The electrolyzer of claim 8, further comprising a check valve disposed in fluid communication between the cathode product outlet and the hydrogen storage vessel to prevent backflow from the hydrogen storage vessel to the cathode.

11. The electrolyzer of claim 8, further comprising:

a water reservoir in fluid communication with one of the electrode compartments; and a water recycle line communicating water from the hydrogen storage vessel to the water reservoir.

12. The electrolyzer of claim 8, further comprising:

a check valve disposed to prevent backflow from the hydrogen storage vessel to the cathode.

13. The electrolyzer of claim 6, further comprising:

a hydrogen storage vessel having an inlet in communication with the upwardly sloping passage.

14. An electrolyzer comprising:

a first electrode compartment comprising a rigid component;

a second electrode compartment comprising a resilient member;

a flexible membrane disposed between the first and second electrode compartments; and a water reservoir in fluid communication with one of the electrode compartments.

15. The electrolyzer of claim 14, wherein the water reservoir is a windshield wiper fluid reservoir.

16. The electrolyzer of claim 14, wherein the water reservoir communicates with an anode through an anode flowfield.

* * * * *